(12) United States Patent
Agehama et al.

(10) Patent No.: US 7,528,988 B2
(45) Date of Patent: May 5, 2009

(54) IMAGE PROCESSING SYSTEM AND METHOD

(75) Inventors: Ryo Agehama, Ebina (JP); Masao Seki, Ebina (JP); Seiji Iino, Ebina (JP); Naomi Yara, Ebina (JP); Kazunori Kurokawa, Ebina (JP)

(73) Assignee: Fuji Xerox Co., Ltd, Tokyo (JP)

( * ) Notice: Subject to any disclaimer, the term of this patent is extended or adjusted under 35 U.S.C. 154(b) by 950 days.

(21) Appl. No.: 10/670,569

(22) Filed: Sep. 26, 2003

(65) Prior Publication Data
US 2004/0184055 A1 Sep. 23, 2004

(30) Foreign Application Priority Data
Mar. 20, 2003 (JP) .............................. 2003-077020

(51) Int. Cl.
*G06F 15/00* (2006.01)
*G06K 1/00* (2006.01)
(52) U.S. Cl. ...................... 358/1.9; 358/1.13; 358/1.14; 358/1.15; 345/600
(58) Field of Classification Search ................ 358/1.15, 358/1.18, 1.13, 1.14, 1.9; 400/283; 347/143; 382/167
See application file for complete search history.

(56) References Cited

U.S. PATENT DOCUMENTS

| | | | | |
|---|---|---|---|---|
| 6,267,519 B1 * | 7/2001 | Otsuki et al. ................ | 400/283 |
| 6,525,721 B1 * | 2/2003 | Thomas et al. ............... | 345/600 |
| 6,629,753 B2 * | 10/2003 | Usui ............................. | 347/43 |
| 6,927,876 B1 * | 8/2005 | Kondo ......................... | 358/1.9 |
| 7,006,691 B2 * | 2/2006 | Muramoto ................... | 382/167 |
| 7,280,237 B2 * | 10/2007 | Komiya ....................... | 358/1.13 |
| 2002/0196455 A1 | 12/2002 | Ishizuka et al. | |
| 2002/0196464 A1 | 12/2002 | Kodama et al. | |
| 2003/0007173 A1 | 1/2003 | Nishide et al. | |
| 2003/0076523 A1 * | 4/2003 | Ito et al. ...................... | 358/1.14 |
| 2004/0075866 A1 * | 4/2004 | Thormodsen et al. ....... | 358/1.18 |

FOREIGN PATENT DOCUMENTS

| EP | 1 099 563 A2 | 12/2004 |
|---|---|---|
| EP | 1 946 937 A1 | 7/2008 |
| EP | 1 953 000 A1 | 8/2008 |
| JP | A-6-274296 | 9/1994 |
| JP | 2003-5343 A | 1/2000 |
| JP | A 2002-200837 | 7/2002 |
| JP | 2003-5931 | 1/2003 |
| JP | 2003-8870 | 1/2003 |
| JP | A 2003-029951 | 1/2003 |

* cited by examiner

*Primary Examiner*—Edward L Coles
*Assistant Examiner*—Satwant K Singh
(74) *Attorney, Agent, or Firm*—Oliff & Berridge, PLC

(57) ABSTRACT

First, a user who will try a service of a print system registers trial from a user system in the print system. When the trial of the print system from the user system is permitted and registered, the print system provides an RIP processing or a printing processing to a user in response to a processing request from the registered user system within a range set for the trial without charge or with a discount accounting.

34 Claims, 50 Drawing Sheets

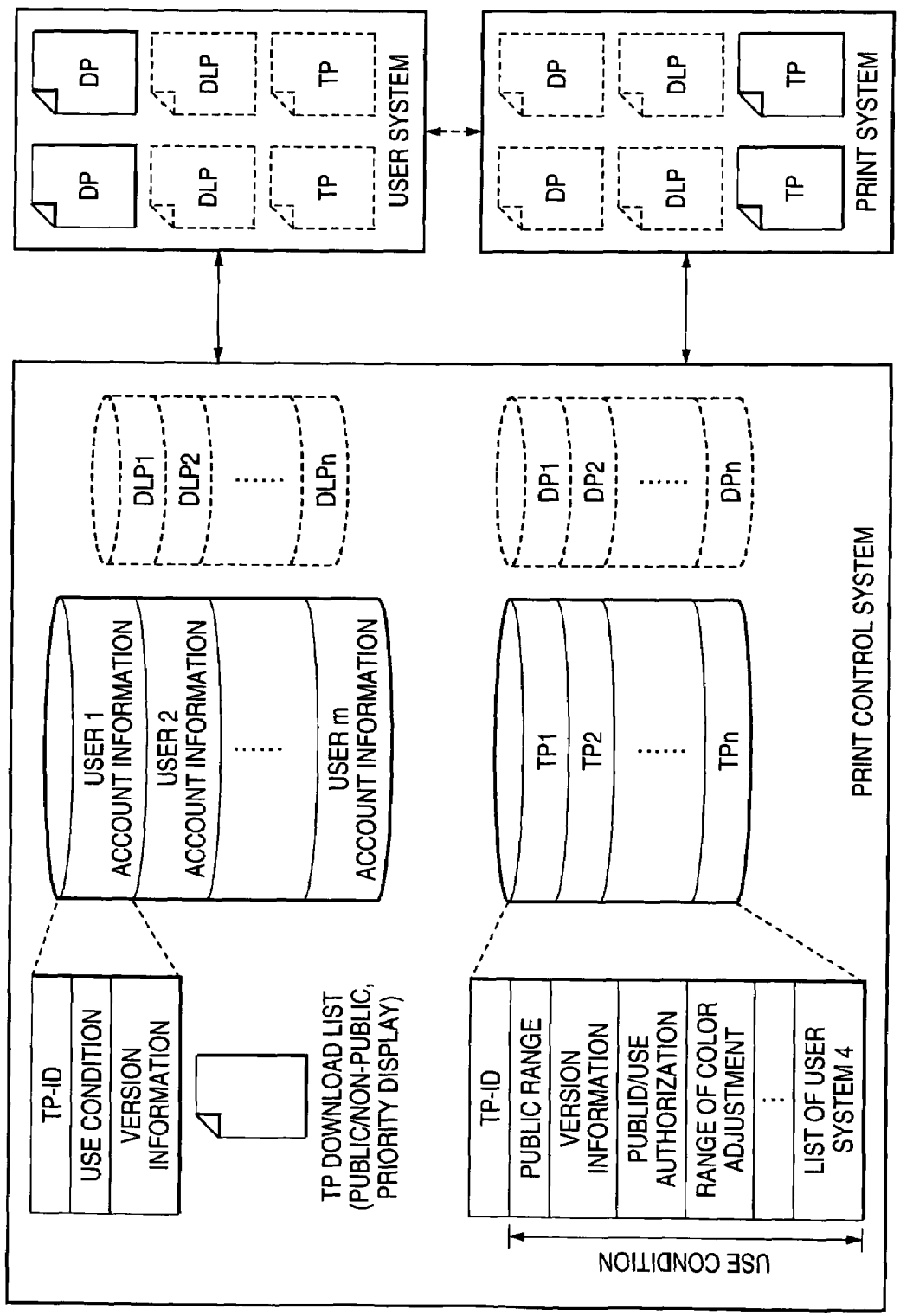

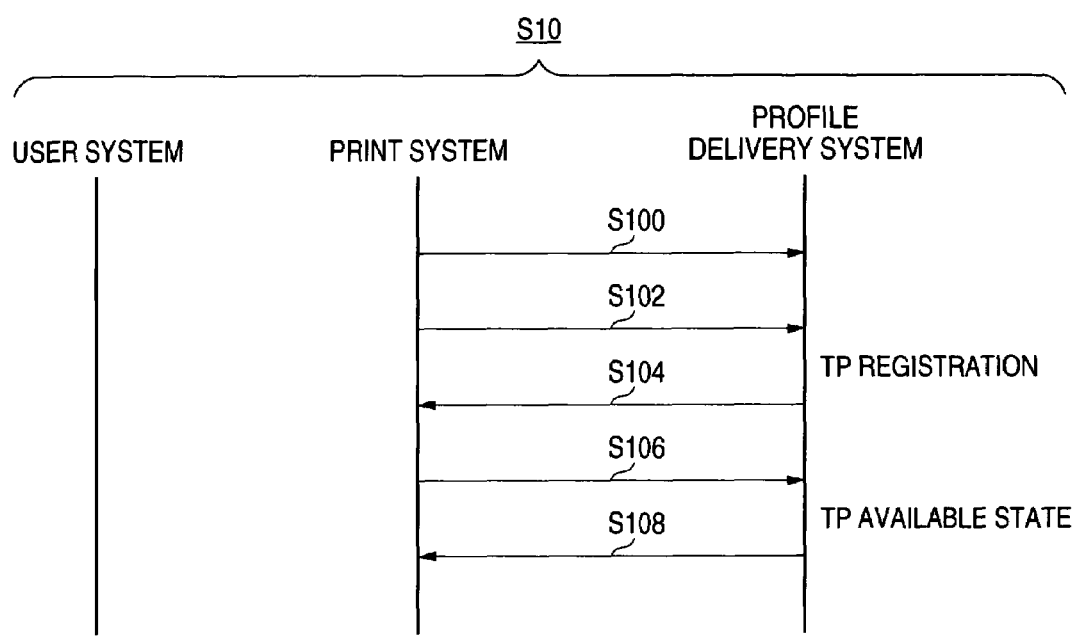
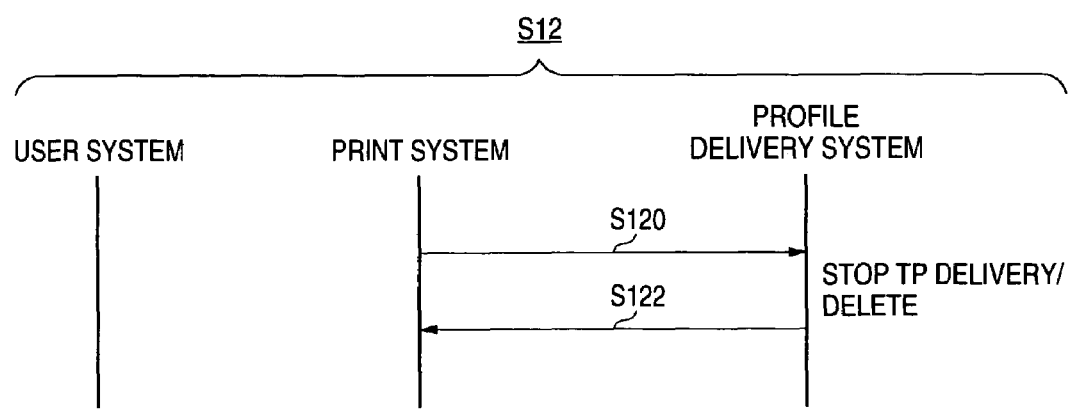

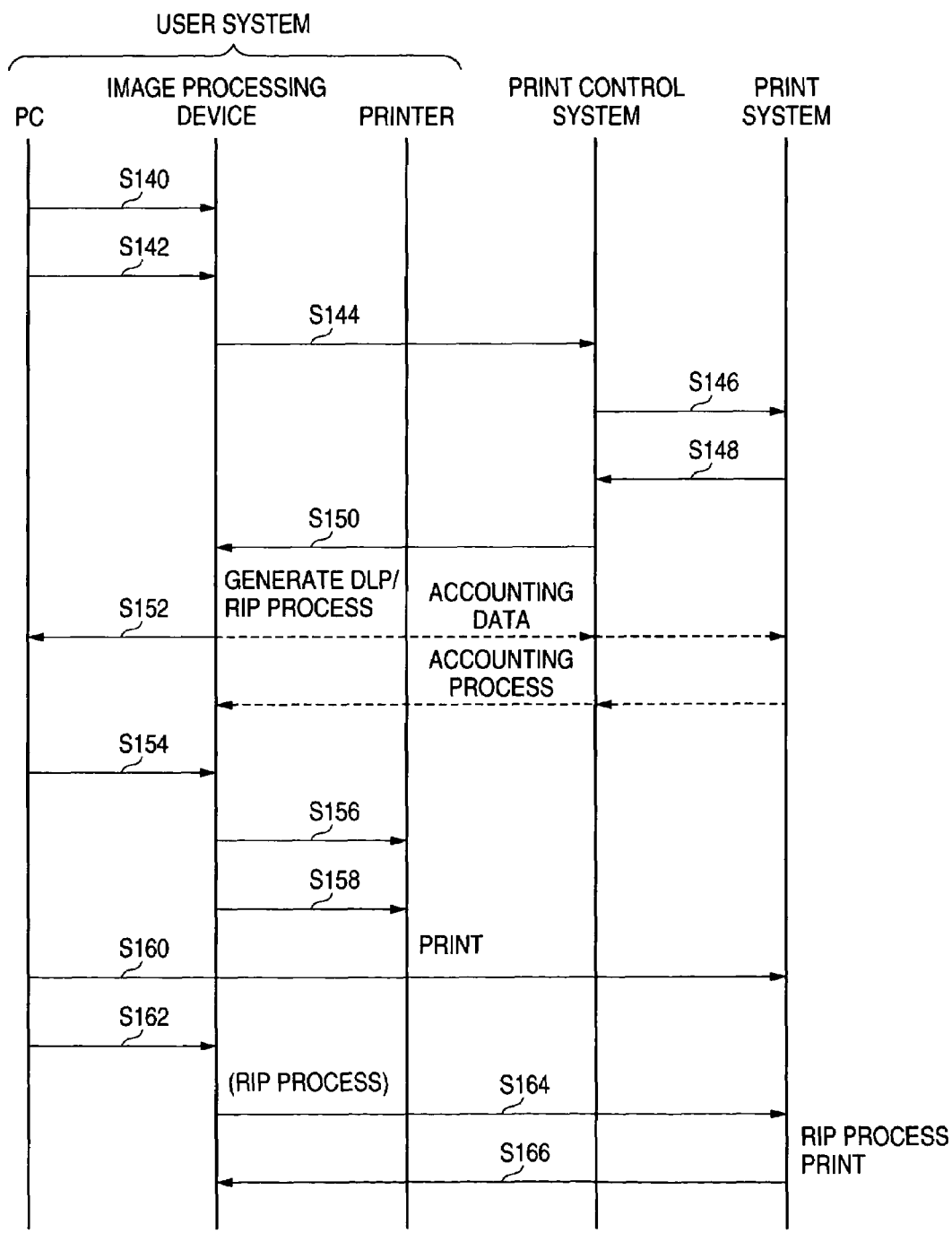

FIG. 22

| MACHINE NUMBER |
|---|
| CUSTOMER CODE |
| NETWORK SETTING |
| PUBLIC/PRIVATE OF IMAGE PROCESSING DEVICE |
| INITIAL SETTING OF PRINT OPTION |
| PROFILE REGISTERING PREFIX |
| DECENTRALIZED RIP POSSIBLE/IMPOSSIBLE |

FIG. 23

| REQUESTER |
|---|
| PAPER SIZE |
| COLOR/BLACK-AND-WHITE |
| PRINTED NUMBER |
| DOCUMENT TYPE |
| PICTURE QUALITY MODE |
| PRINTER MODE |
| COLOR CONVERSION MODE |
| SINGLE/DOUBLE SIDE |
| MAGNIFY/EQUAL/REDUCE |
| N-UP DESIGNATION |
| DESTINATION OF DISCHARGE |
| SPOOL OPTION |
| RIP PROCESSED DATA STORAGE |
| MERGING PRINT |
| COLOR CHANGE (PROFILE) DESIGNATION |
| COVER PAGE |
| PAPER KIND |
| OTHERS (TIME DESIGNATION) |

FIG. 24

| REQUESTER |
| --- |
| RIP STATUS |
| COLOR/BLACK-AND-WHITE |
| PICTURE QUALITY MODE |
| PRINTER MODE |
| PAPER SIZE |
| NUMBER OF PRINTS TO BE PROCESSED |
| RIP PAGE |
| RIP TIME |
| START TIME |
| FILE SIZE |
| PRESENCE/ABSENCE OF COVER PAGE |
| PRESENCE/ABSENCE OF RIP-PROCESSED DATA |
| COLOR CONVERSION (PROFILE) DESIGNATION |
| DECENTRALIZED RIP |

FIG. 25

| PROCESSING KIND (RIP/PRINT) |
| --- |
| ACCOUNTING TARGET (REQUESTER) |
| COLOR/WHITE-AND-BLACK |
| PAPER SIZE |
| NUMBER OF PRINTS TO BE PROCESSED |
| PAGE NUMBER |
| PRESENCE/ABSENCE OF COVER PAGE |
| PAPER KIND |
| SINGLE/DOUBLE SIDES |
| DECENTRALIZED RIP |

*FIG. 33*

| USER SYSTEM | ACCOUNTING INFORMATION | | |
|---|---|---|---|
| #1 | NORMAL RIP | | |
| | REQUESTED DECENTRALIZED RIP | | |
| | RECEIVED DECENTRALIZED RIP | JOB-ii | |
| | PRINT | | |
| #2 | NORMAL RIP | JOB-i | |
| | REQUESTED DECENTRALIZED RIP | JOB-ii, JOB-iii | ← TARGET OF EXTRA ACCOUNTING |
| | RECEIVED DECENTRALIZED RIP | | |
| | PRINT | JOB-i, JOB-ii, JOB-iii | |
| #3 | NORMAL RIP | | |
| | REQUESTED DECENTRALIZED RIP | JOB-iii | ← TARGET OF DISCOUNT |
| | RECEIVED DECENTRALIZED RIP | | |
| | PRINT | | |

IMAGE PROCESSING SYSTEM AND METHOD

The present disclosure relates to the subject matter contained in Japanese Patent Application No.2003-77020 filed on Mar. 20, 2003, which is incorporated herein by reference in its entirety.

BACKGROUND OF THE INVENTION

1. Field of the Invention

The present invention relates to an image processing system and a method for providing an image processing function to execute accounting.

2. Description of the Related Art

JP-A-2003-5343, JP-A-2003-5931, and JP-A-2003-8870 disclose a system in which a client requests a processing of image data to a server and the requested processing is executed.

Consider that the user prints image data by a printer on a client side and checks the print result and then prints by a printing device on a server side in large quantities. If the print result on the client printer differs from that on the server printer in color characteristic, a printed matter exactly as printed by the printer on the client side cannot be provided for the user from the printing device on the server side.

SUMMARY OF THE INVENTION

The invention was made in view of the following background. An object of the invention to provide an image processing system and a method in which even if different printer and printing device print image data, the same print result can be obtained.

[Print Control Apparatus]

In order to accomplish the above objects, a print control apparatus according to embodiments of the invention includes a parameter acceptance unit for accepting a parameter used for trial print for each mode of the trial print, and a trial print instruction unit for instructing a print unit to execute the trial print in each mode in accordance with the accepted parameter.

Preferably, the print control apparatus further includes an accounting unit. The parameter acceptance unit accepts a trial print parameter for a color print mode and a trial print parameter for a monochrome print mode. The trial print instruction unit instructs the print unit to execute trial print in the color print mode and trial print in the monochrome print mode in accordance with the accepted trial print parameter for the color print mode and the accepted trial print parameter for the monochrome print mode. The accounting unit performs an accounting processing on the basis of the trial print parameter for the color print mode when the trial print is executed in the color print mode. The accounting unit performs the accounting processing on the basis of the trial print parameter for the monochrome print mode when the trial print is executed in the monochrome print mode.

[Accounting Apparatus]

An accounting apparatus according to the embodiments of the invention, includes a parameter retention unit for retaining a trial print parameter for a color print mode and a trial print parameter for a monochrome print mode, and an accounting unit. The accounting unit performs an accounting processing on the basis of the trial print parameter for the color print mode when a trial print is executed in the color print mode. The accounting unit performs the accounting processing on the basis of the trial print parameter for the monochrome print mode when the trial print is executed in the monochrome print mode.

[Print Control Method]

A print control method according to the embodiments of the invention, includes accepting a parameter used for trial print for each mode of the trial print; and instructing the trial print to be executed in each mode in accordance with the accepted parameter.

Preferably, the print control method further includes executing an accounting processing. In the accepting of the parameter, a trial print parameter for a color print mode and a trial print parameter for a monochrome print mode are accepted. In the instructing of the trial print, trial print in the color print mode and trial print in the monochrome print mode are executed in accordance with the accepted trial print parameter for the color print mode and the accepted trial print parameter for the monochrome print mode. The accounting processing is executed on the basis of the trial print parameter for the color print mode when the trial print is executed in the color print mode. The accounting processing is executed on the basis of the trial print parameter for the monochrome print mode when the trial print is executed in the monochrome print mode.

[Accounting Method]

An accounting method according to the embodiments of the invention includes retaining a trial print parameter for a color print mode and a trial print parameter for a monochrome print mode, executing an accounting processing on the basis of the trial print parameter for the color print mode when a trial print is executed in the color print mode, and executing the accounting processing on the basis of the trial print parameter for the monochrome print mode when the trial print is executed in the monochrome print mode.

[Program]

A first program according to the embodiments of the invention causing a computer to execute the steps of accepting a parameter used for trial print for each mode of the trial print; and instructing the trial print to be executed in each mode in accordance with the accepted parameter.

Preferably, Preferably, the print control method further includes executing an accounting processing. In the accepting of the parameter, a trial print parameter for a color print mode and a trial print parameter for a monochrome print mode are accepted. In the instructing of the trial print, trial print in the color print mode and trial print in the monochrome print mode are executed in accordance with the accepted trial print parameter for the color print mode and the accepted trial print parameter for the monochrome print mode. The accounting processing is executed on the basis of the trial print parameter for the color print mode when the trial print is executed in the color print mode. The accounting processing is executed on the basis of the trial print parameter for the monochrome print mode when the trial print is executed in the monochrome print mode.

Also, a second program according to the embodiments of the invention, causing a computer to execute the steps of retaining a trial print parameter for a color print mode and a trial print parameter for a monochrome print mode, executing an accounting processing on the basis of the trial print parameter for the color print mode when a trial print is executed in the color print mode, and executing the accounting processing on the basis of the trial print parameter for the monochrome print mode when the trial print is executed in the monochrome print mode.

[Image Processing System]

An image processing system according to the embodiments of the invention includes a processing requesting device for requesting an image processing, and a processing execution device for executing the requested image processing. The processing requesting device includes a registration requesting unit for requesting the processing execution device to register the processing requesting device for a trial processing for trying the image processing of the processing execution device, and a processing requesting unit for requesting the processing execution device to perform the trial processing. The processing execution device includes a registration unit for executing the requested registration, and a trial processing execution unit for executing the trial processing requested by the registered processing requesting device.

Preferably, the trial processing is set to have the same processing range as that of the image processing. The processing execution device further includes a trial processing range setting unit for setting the processing range of the trial processing. The processing requesting unit of the processing requesting device requests the processing execution device to perform the trial processing included in the set processing range. Alternatively, the trial processing may be set to have a different processing range from that of the image processing;

Preferably, the processing requesting device further includes a display unit for displaying a message indicating that the requested trial processing is beyond the processing range.

Preferably, the trial processing execution unit of the processing execution device executes the requested trial processing within the set processing range.

Preferably, an additional image is set in the trial processing. The trial processing execution unit of the processing execution device adds the set additional image to image data provided as a result of the trial processing.

Preferably, the image processing system further includes a position designation unit for accepting designation of a position of the additional image. The trial processing execution unit adds the set additional image to the image data provided as the result of the trial processing at the designated position.

Preferably, the image processing system further includes a search unit for searching for an optimum position of the additional image. The trial processing execution unit adds the set additional image to the image data provided as the result of the trial processing at the position found as a result of the searching.

Preferably, first points are set to the trial processing. Second points are set to the registered processing requesting device. The processing execution device further includes a subtraction unit for subtracting the first points set to the executed trial processing from the second points set to the registered processing requesting device every time the requested trial processing is executed. The processing execution unit executes the trial processing requested by the processing requesting device corresponding to the second point during the second points are left.

[Processing Request Device]

A processing requesting device according to the embodiments of the invention is disposed in an image processing system including the processing requesting device for requesting an image processing and a processing execution device for executing the requested image processing. The processing requesting device includes a registration requesting unit for requesting the processing execution device to register the processing requesting device for a trial processing for trying the image processing of the processing execution device, and a processing requesting unit for requesting the processing execution device to perform the trial processing.

Preferably, the trial processing is set to have the same processing range as that of the image processing. The processing requesting unit of the processing requesting device requests the processing execution device to perform the trial processing included in the set processing range. Alternatively, the trial processing may be set to have a different processing range from that of the image processing.

Preferably, the processing requesting device further includes a display unit for displaying a message indicating that the requested trial processing is beyond the processing range.

[Processing Execution Device]

A processing execution device according to the embodiments of the invention is disposed in an image processing system including a processing requesting unit for requesting an image processing and the processing execution device for executing the requested image processing. The processing execution device includes a registration unit for registering the processing requesting device for a trial processing; and a trial processing execution unit for executing the trial processing requested by the registered processing requesting device.

Preferably, the trial processing is set to have the same processing range as that of the image processing. The trial processing execution unit executes the requested trial processing within the set processing range. Alternatively, the trial processing may be set to have a different processing range from that of the image processing.

Preferably, an additional image is set in the trial processing. The trial processing execution unit adds the set additional image to image data provided as a result of the trial processing.

Preferably, the processing execution device further includes a position designation unit for accepting designation of a position of the additional image. The trial processing execution unit adds the set additional image to the image data provided as the result of the trial processing at the designated position.

Preferably, the processing execution device further includes a search unit for searching for an optimum position of the additional image. The trial processing execution unit adds the set added image to image data provided as a result of the trial processing at a position found as the result of the searching.

Preferably, the processing execution device further includes a subtraction unit. First points are set to the trial processing. Second points are set to the registered processing requesting device. The subtraction unit subtracts the first points set to the executed trial processing from the second points set to the registered processing requesting device every time the requested trial processing is executed. The trial processing execution unit executes the trial processing requested by the processing requesting device corresponding to the second points during the second points are left.

[Image Processing Method]

An image processing method according to the embodiments of the invention includes requesting to register a first device for a trial processing for trying an image processing, requesting to execute the trial processing, register the requested first device, and executing the requested trial processing.

[Processing Requesting Method]

A processing requesting method according to the embodiments of the invention, in an image processing system including a processing requesting unit for issuing an image processing request and a processing execution unit for executing the requested image processing, the image processing method including the steps of registering trial use processing as requested and executing the trial use processing requested by the registered processing requesting unit by the processing execution unit; and issuing a request for registering trial use processing to make trial use of image processing of the processing execution unit by the processing requesting unit to the processing execution unit and requesting the processing execution unit to perform the trial use processing by the processing requesting unit.

[Processing Execution Method]

According to embodiments of the invention, there is provided a processing execution method in an image processing system including a processing requesting unit for issuing an image processing request and a processing execution unit for executing the requested image processing, the image processing method including the steps of issuing a request for registering trial use processing to make trial use of image processing of the processing execution unit by the processing requesting unit to the processing execution unit and requesting the processing execution unit to perform the trial use processing by the processing requesting unit; and registering the trial use processing as requested and executing the trial use processing requested by the registered processing requesting unit by the processing execution unit.

[Program]

According to the embodiments of the invention, there is provided a third program of an image processing system including a processing requesting unit having a computer for issuing an image processing request and a processing execution unit having a computer for executing the requested image processing, the third program for causing the computer of the processing requesting unit to execute the steps of issuing a request for registering trial use processing to make trial use of image processing of the processing execution unit to the processing execution unit and requesting the processing execution unit to perform the trial use processing and causing the computer of the processing execution unit to execute the steps of registering the trial use processing as requested and executing the trial use processing requested by the registered processing requesting unit.

According to the embodiments of the invention, there is provided a fourth program of an image processing system including a processing requesting unit having a computer for issuing an image processing request and a processing execution unit having a computer for executing the requested image processing, the fourth program for causing the computer of the processing execution unit to execute the steps of registering trial use processing as requested and executing the trial use processing requested by the registered processing requesting unit and causing the computer of the processing requesting unit to execute the steps of issuing a request for registering trial use processing to make trial use of image processing of the processing execution unit to the processing execution unit and requesting the processing execution unit to perform the trial use processing.

According to the embodiments of the invention, there is provided a fifth program of an image processing system including a processing requesting unit having a computer for issuing an image processing request and a processing execution unit having a computer for executing the requested image processing, the fifth program for causing the computer of the processing requesting unit to execute the steps of issuing a request for registering trial use processing to make trial use of image processing of the processing execution unit to the processing execution unit and requesting the processing execution unit to perform the trial use processing and causing the computer of the processing execution unit to execute the steps of registering the trial use processing as requested and executing the trial use processing requested by the registered processing requesting unit.

BRIEF DESCRIPTION OF THE DRAWINGS

FIG. 6 is a diagram illustrating the profile data to be stored in the print control system 2, the print system 3 and the user system of the print service system, as shown in FIG. 1 to FIG. 4, and the flows of the profile data;

FIG. 7 is a sequence diagram showing a first operation (S10) of the print service system, as shown in FIG. 1 and so on;

FIG. 8 is a sequence diagram showing a second operation (S12) of the print service system 1 shown in FIG. 1 and so on;

FIG. 9 is a sequence diagram showing a third operation (S14) of the print service system 1 shown in FIG. 1 and so on;

FIG. 11 is a sequence diagram showing a fourth operation (S22) of the print service system shown in FIG. 1 and so on;

FIG. 12 is a sequence diagram showing a fifth operation (S26) of the print service system shown in FIG. 1 and so on;

FIG. 13 is a sequence diagram showing a sixth operation (S28) of the print service system shown in FIG. 1 and so on;

FIG. 14 is a sequence diagram showing a seventh operation (S30) of the print service system shown in FIG. 1 and so on;

FIG. 15 is a sequence diagram showing an eighth operation (S32) of the print service system shown in FIG. 1 and so on;

FIG. 16 is a sequence diagram showing a ninth operation (S34) of the print service system shown in FIG. 1 and so on;

FIG. 22 is a diagram enumerating a format of the registration data, which are output by the user system to the image processing device (FIG. 2) of the print system;

FIG. 23 is a diagram enumerating a format of the print option, which is designated for the image processing device (FIG. 2) of the print system by the PC (FIG. 4) or the like of the user system;

FIG. 24 is a diagram enumerating the format of the RIP data, which is used by the image processing device (FIG. 2) of the print system for presenting the result of the RIP process to the image processing device (FIG. 4) of the user system;

FIG. 25 is a diagram enumerating the print data, which are output to the accounting device by the image processing device (FIG. 2) of the print system;

FIG. 33 is a diagram illustrating the form of the accounting information to be stored in the RIP accounting DB and the print accounting DB shown in FIG. 26;

DETAILED DESCRIPTION OF THE PREFERRED EMBODIMENTS

First Embodiment

A first embodiment of the invention will be described in the following.

[Print Service System 1]

Figure 1:
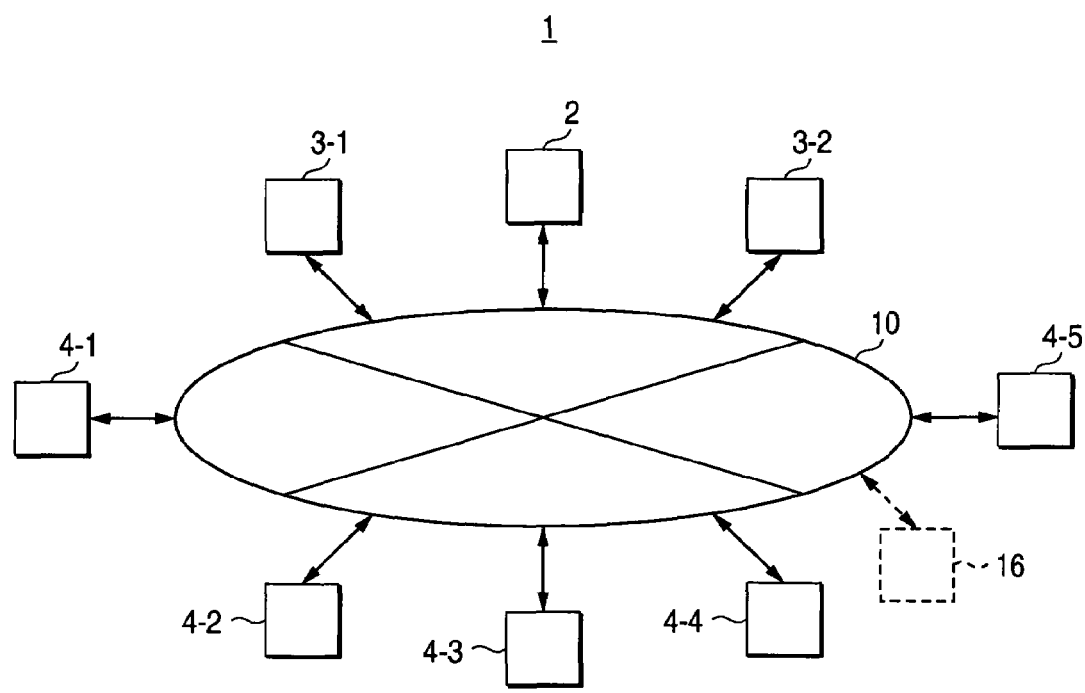
FIG. 1 is a diagram illustrating a construction of a print service system, to which an image processing method according to the invention is applied.

FIG. 1 is a diagram illustrating a construction of a print service system 1, to which an image processing method according to the invention is applied.

As shown in FIG. 1, the print service system 1 takes a construction, in which at least one print control system 2, at least one print system 3-1 to 3-n and at least one user system 4-1 to 4-n are connected through a network 10 such as the internet (FIG. 1 illustrates the case of n=4 and m=2).

When a trial process with an advertise is done, moreover, a system (i.e., an advertiser system) 16 of an advertiser is added to the print service system 1, as indicated by dotted lines in FIG. 1.

In the print service system 1 with those components, image data, which are generated in a user system 4 by using profile data provided by the print control system 2, are printed and output by a printing device of a print system 3.

Here in FIG. 1, there is illustrated a case, which is provided with four user systems 4, two print systems 3 and one print control system 2.

Moreover, the user systems 4-1 to 4-4 may be abbreviated into merely the user system 4, in case they are exemplified without specifying any of their components.

Moreover, the print control system 2, the print system 3 and the user system 4 in the print service system 1, and their function sharing are merely for illustrations.

Therefore: the print system 3 may contain the function of the print control system 2; any user system 4 and the print system 3 may be integrated; or any user system 4 may contain the print control system 2, for example.

[Print System 3]

Figure 2:
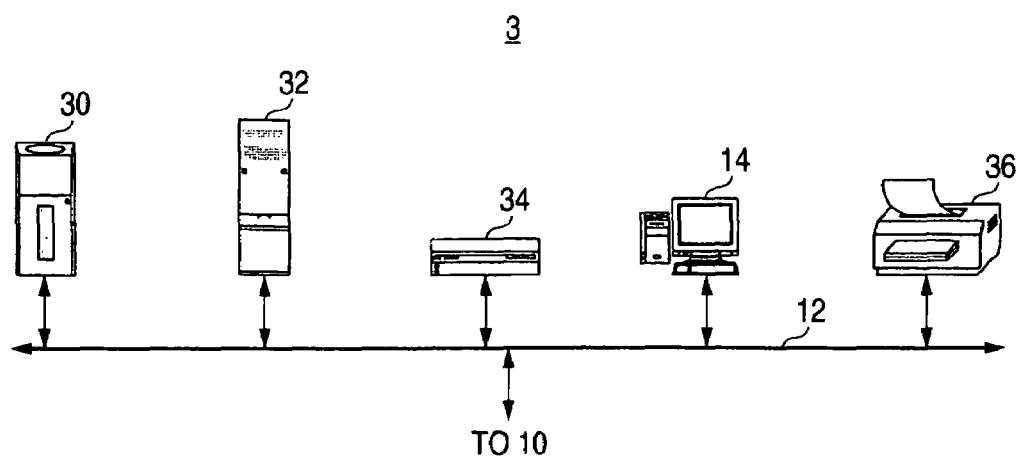
FIG. 2 is a diagram illustrating a construction of a print system shown in FIG. 1.

FIG. 2 is a diagram illustrating a construction of the print system 3 shown in FIG. 1.

As illustrated in FIG. 2, the print system 3 is constructed such that an image processing device 32, a colorimeter device 34, at least one printing device 36 and a computer (PC) 14 are connected through a LAN 12.

To the print system 3, moreover, an accounting device 30 is added, if necessary.

This print system 3 is used as a print system of a print company, for example. With those components, the image data sent from the print control system 2 or the user system 4 are printed.

Moreover, the print system 3 is used for generating the image data in the user system 4 so that it generates target profile data (i.e., TP data) indicating a relation between the print result in the user system 4 and the printed image data and outputs the TP data to the print control system 2 or the user system 4.

Here, the TP data, and later-described device profile data (i.e., DP data) and device link profile data (i.e., DLP data) maybe generally called the profile data in the following.

In the print system 3, the calorimeter device 34 scans and reads the print result of the printing device 36, to generate the TP data indicating the relation between the image data, which is a print target, and the printed matters obtained as the print result.

These TP data are used for color corrections considering the color characteristics of the printing device 36, at the time of performing a process (i.e., RIP (Raster Image Processing/Processor) processing) of expanding the drawing data described in the Post Script (i.e., the trade mark of Adobe System) languages into the bit-mapped data (i.e., the image data).

In the RIP process of the user system 4, the image data from the user system 4 are fitted to the characteristics of the output of the printing device 36 by the color corrections using the TP data, so that the desired print result can be obtained from the printing device 36.

When the drawing data before expanded to the bit-mapped data are sent from the user system 4, the image processing device 32 subjects the drawing data to the RIP process.

Moreover, the image processing device 32 performs the color corrections using the TP data or the DLP data, if necessary, in the aforementioned RIP process.

Thus, the RIP process while making the color correction using the TP data may be abbreviated in the following into merely the RIP process using the TP data.

The printing device 36 is, for example, a color printing device suited for massive printing at a high speed, and prints the image data, which are generated in the user system 4, massively at a high speed.

The PC 14 monitors/controls operations of the image processing device 32, the colorimeter device 34 and the printing device 36 in accordance with the operations of the user.

The accounting device 30 charges the user for the services (e.g., printing, RIP process and/or color corrections) provided for the user system 4.

[Print Control System 2]

Figure 3:
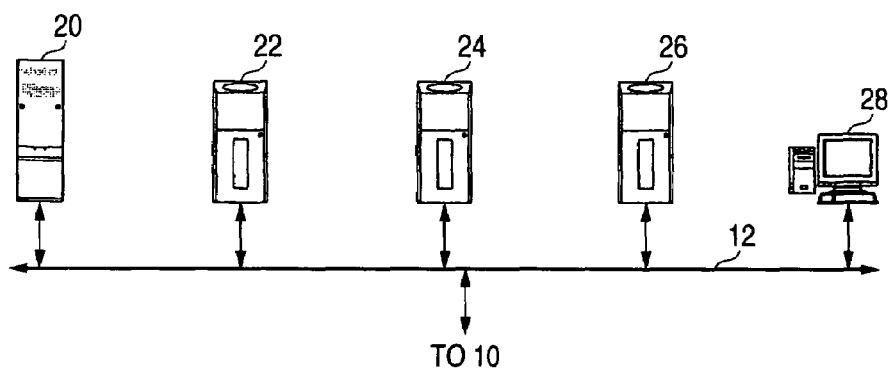
FIG. 3 is a diagram illustrating a construction of a print control system shown in FIG. 1.

FIG. 3 is a diagram illustrating a construction of the print control system 2 shown in FIG. 1.

As shown in FIG. 3, the print control system 2 is constructed such that a profile database (or profile DB) 20, a profile delivery device 22, an accounting device 24 having a function similar to that of the accounting device 30 shown in FIG. 2, a print control device 26 and a PC 28 are connected through the LAN 12.

Of the individual components shown in FIG. 3, those substantially identical to the individual components shown in FIG. 1 are designated by the common reference numerals.

The profile DB 20: acquires the (later-described) DP data of each user system 4, the TP data of each print system 3 and the (later-described) DLP data by a predetermined method and at a predetermined timing; stores/manages those profile data acquired; and outputs the same data to the profile delivery device 22.

Here in the print service system 1, the profile data to be stored by the profile DB 20 change depending on how functions are shared among the print control system 2, the print system 3 and the user system 4.

The timings, at which the profile DB 20 acquires the profile data from the user system 4 and the print system 3, are described in the following items (1-1) to (1-5).

(1-1) The profile DB 20 inquires the user system 4 and the print system 3 periodically, and acquires the profile data, which are returned in response to the queries from the user system 4 and the print system 3.

(1-2) The print system 3 and the user system 4 outputs the changed profile data automatically to the profile DB 20, when the printing device 36 and a (later-described) printer 44 are changed, so that the profile DB 20 acquires the profile data sent.

Here in this case, the user system 4 may also inquire the profile DB 20 to acquire the DLP data.

(1-3) The user system 4 requests, when it generates the DLP data, the print control system 2 for the TP data, which is requested to generate the DLP data, so that the profile DB 20 responds to the request to acquire the TP data from the print system 3.

(1-4) The profile delivery device 22 requests, when it generates the DLP data, the profile DB 20 for the DP data and the TP data, which are necessary for generating the DLP data.

In response to this request, the profile DB 20 requests the print system 3 for the output of the TP data and the user system 4 for the output of the DP data, and acquires the DP data and TP data returned in response to those requests.

Moreover, the profile DB 20 acquires the DLP data generated by the profile delivery device 22, if necessary.

(1-5) The profile DB 20 acquires the DLP data when these DLP data are sent from the print system 3 and the user system 4.

Here in this case, the user system 4 may hold the DP data.

The profile delivery device 22 responds to the requests of the print system 3 and the user system 4, and reads and returns the profile data requested by the profile DB 20.

Moreover, the profile delivery device 22 responds to the requests of the print system 3 and the user system 4, and returns the DP data and the DLP data by generating the DLP data from the DP data.

The print control device 26 accepts the delivery of the image data and the request for the processes such as the RIP process or the print process from the user system 4, and transfers these process requests to the print system 3 so that the processes may be executed.

In cooperation with the accounting device 24, moreover, the print control device 26 performs the process requested by the user system 4 and the accounting process for the profile data provided by the user system 4.

Moreover, the print control device 26 executes the communication sequences shown in FIG. 9 and subsequent Figures.

[User System 4]

Figure 4:
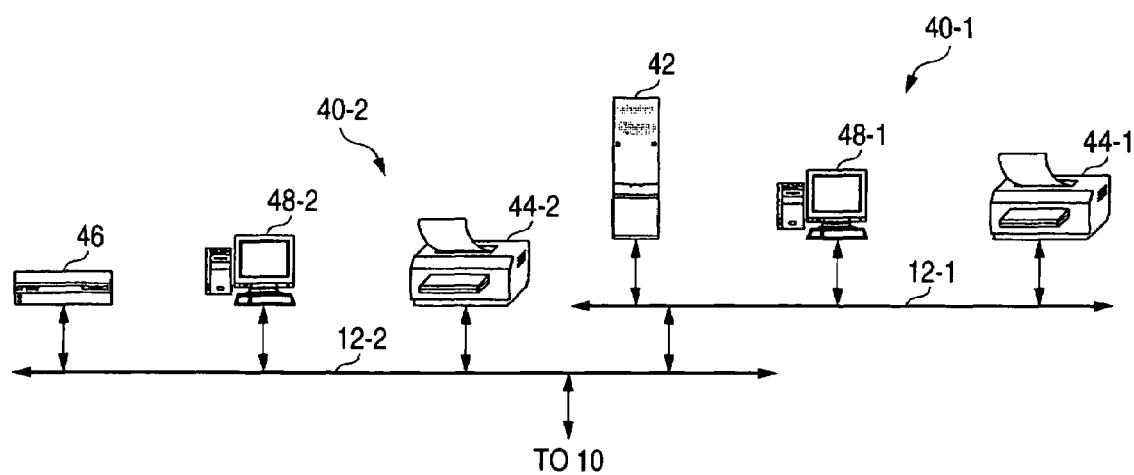
FIG. 4 is a diagram illustrating a construction of a user system shown in FIG. 1.

FIG. 4 is a diagram illustrating a construction of the user system 4 shown in FIG. 1.

As shown in FIG. 4, the user system 4 includes at least one branch system 40-1 and 40-2, which is provided for the individual branches of an enterprise.

The branch system 40-1 is constructed such that an image processing device 42, a PC 48-1and a printer 44-1 are connected through a LAN 12-1, and the branch system 40-2 is constructed such that a calorimeter device 46, a PC 48-2 and a printer 44-2 are connected through a LAN 12-2.

The LANs 12-1 and 12-2 are so connected as to communicate with each other.

Here, the advertiser system 16 shown in FIG. 1 takes a construction similar to that of the user system 4, for example.

Here in FIG. 4, there is illustrated the case, in which the user system 4 includes the two printers 44, two PCs 48, one image processing device 42 and one calorimeter device 46.

Of the individual components shown in FIG. 4, moreover, those substantially similar to the individual components shown in FIGS. 2 and 3 are designated by the common reference numerals.

With these components, the user system 4 generates the image data to be printed by the printing device 36 of the print system 3.

The printer 44 is, for example, a color printer, which is used in the office of a general company or a design company, for printing the image data input from the PC 48 or the image processing device 42.

In the user system 4, the calorimeter device 46 scans and reads the print result of the printer 44, and generates the DP data indicating the relation between the image data, which is a print target, and the printed matter obtained as the print result.

In short, this DP data indicates the print result on what color characteristic is obtained, when the printer 44 prints the image data.

In the user system 4, the image processing device 42 acquires the TP data of the user system 4 to request the print, if necessary, from the print control system 2, and generates the DLP data by using the TP data acquired and the DP data generated by the calorimeter device 46 of the user system 4.

These DLP data are used in the user system 4 for confirming the print result in the print system 3.

In other words, the image processing device 42 is used to print the image data with the printer 44 by using the DP profile and the TP profile, and to obtain the result of the print, as if this print were made by the printing device 36.

The image processing device 42 subjects the drawing data input from the PC 48, to the RIP process by using the DLP data thus generated or the DLP data acquired from the print control system 2, and generates and outputs the image data, which should be printed by the printer 44, to the printer 44.

Moreover, the image processing device 42 subjects the drawing data to the RIP process by using the TP data acquired from the print control system 2, and generates and outputs the image data to be printed by the printer 44, to the printer 44.

[Hardware]

Figure 5:
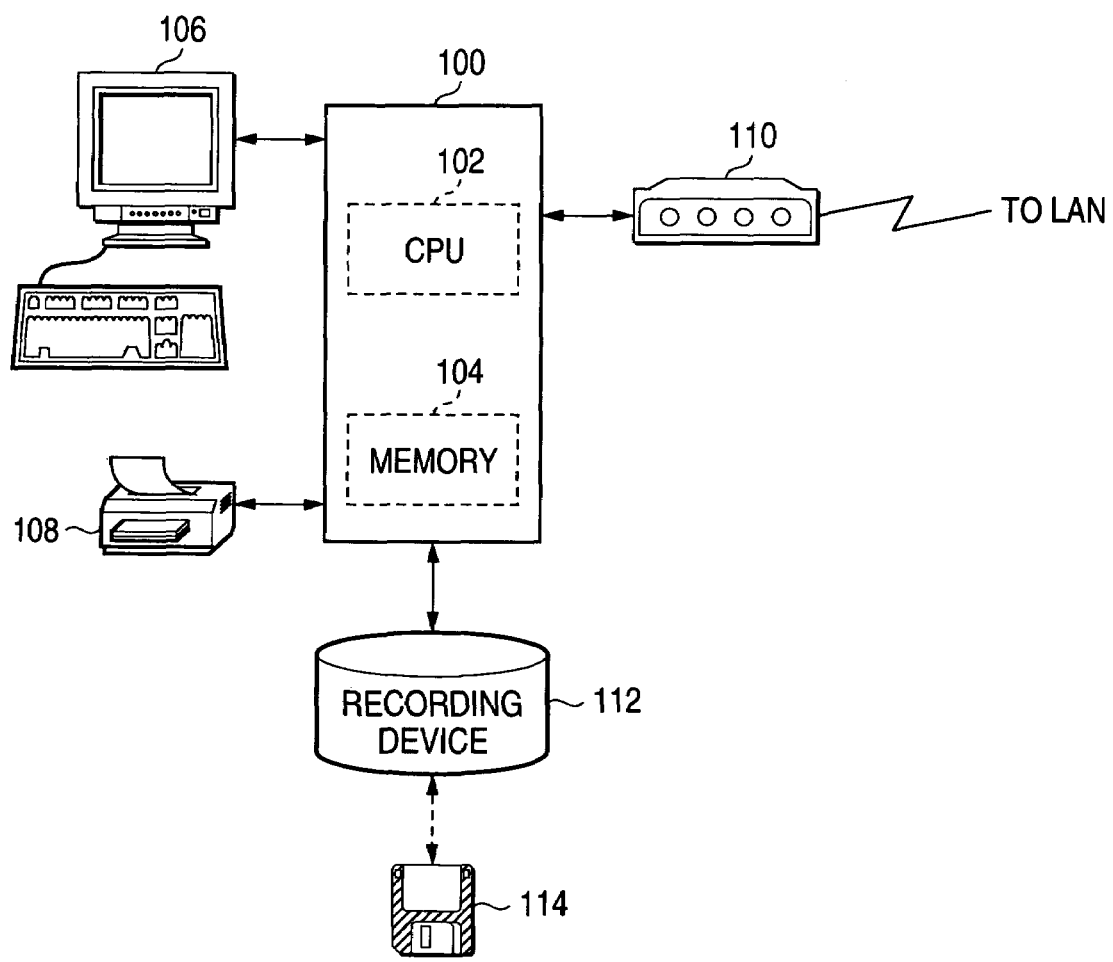
FIG. 5 is a diagram illustrating hardware constructions of the PCs, a profile DB, a profile delivery device, accounting devices, image processing devices, calorimeter devices, printing device and a printer.

FIG. 5 is a diagram illustrating hardware constructions of the PCs 14, 28 and 48, the profile DB 20, the profile delivery device 22, the accounting devices 24 and 30, the print control device 26, the image processing devices 32 and 42, the calorimeter devices 34 and 46, the printing device 36 and the printer 44.

As shown in FIG. 5, the PC 14 or the like is constructed to include: a body 100 of a control apparatus or a PC containing a CPU 102, a memory 104 and their peripheral circuits; a display/input device 106 containing a display device, a keyboard and a mouse; a function realizing unit 108 for realizing the functions peculiar to the individual devices such as the printer engine in the printer 16; a communication device 110 for realizing the communicating functions between the LAN 12 and the network 10; and a recording device 112 such as a HDD or a CD device.

In other words, the PC 14, the profile DB 20, the profile delivery device 22, the accounting devices 24 and 30, the image processing devices 32 and 42, the colorimeter devices 34 and 46, the printing device 36 and the printer 44 include the components as the computer for communicating with other devices through the network 10 and the LAN 12 (as will also called the nodes).

[Summary of Flows of Profile Data]

FIG. 6 is a diagram illustrating the profile data to be stored in the print control system 2, the print system 3 and the user system 4 of the print service system 1, as shown in FIGS. 1 to 4, and the flows of the profile data.

The profile DB 20 of the print control system 2 acquires the TP data of each print system 3 indicated by solid lines in FIG. 6, for example, from the print system 3, as described above, and stores/manages the TP data.

These TP data contain each ID (TP-ID), version information, a use condition such as public/use authorization, public range, and a range of color adjustment, and a list of the user system 4 using or authorized to use the TP data.

Moreover, the profile DB 20 stores the TP data authorized to be downloaded to the user system 4, and the list (i.e., the TP download list) indicating what TP data match each user system 4, and makes them public to each user system 4.

The TP data and the TP download list thus stored in the profile DB 20 are provided to the user system 4 in response to the request from the user system 4 so that they are used in the image processing device 42 of the user system 4 for DLP data generating processing, the RIP process using the DLP data and the RIP process using the TP data.

As indicated by dotted lines in FIG. 6, alternatively, the profile DB 20 of the print control system 2 acquires the DP data of the printer 44 of the user system 4, if necessary, from the user system 4, and stores/manages them.

The DP data thus stored in the profile DB 20 are used for generating the DLP data in the profile delivery device 22.

Here, in case that the DLP data are generated in the print system 3, the profile delivery device 22 may provide the DP data stored in the profile DB 20, to the print system 3.

As indicated by dotted lines in FIG. 6, alternatively, the profile DB 20 of the print control system 2 acquires the DLP data used to equalize the individual print results of the printing device 36 of the print system 3 with the individual print results of the printers 44 of the user system 4, if necessary, from the profile delivery device 22, the print system 3 and the image processing device 42 of the user system 4, and stores/manages them.

The DLP data thus stored in the profile DB 20 are provided, if necessary, to the print system 3 and the user system 4.

Between the user system 4 and the print system 3 of FIG. 6, moreover, the profile data maybe sent, if necessary, between the user system 4 and the print system 3 not through the print control system 2, as indicated by dotted lines in FIG. 6.

[Operations of Print Service System 1]

The operations of the print service system 1 will be described by enumerating a variety of specific examples.

Here, the following individual operations can be combined either so long as they are not contradictory to one another or by modifying them properly.

Moreover, the operating subjects in the individual operations are presented merely for exemplifications so that the operating subjects in the print control system 2, the print system 3 and the user system 4 can be suitably modified.

[TP Data Delivery Start]

FIG. 7 is a sequence diagram showing a first operation (S10) of the print service system 1 shown in FIG. 1 and so on.

In the operations shown in FIG. 7, in response to the operation of the user to the PC 48, the calorimeter device 34 (FIG. 2) of the print system 3 explicitly requests the profile delivery device 22 of the print control system 2 for the delivery of the TP data to the print system 3.

At Step 100 (S100), as shown in FIG. 7, the calorimeter device 34 of the print system 3 requests the profile delivery device 22 for the delivery of the TP data.

At Step 102 (S102), the calorimeter device 34 delivers the TP data of each printing device 36 to the profile DB 20 of the print control system 2.

At Step 104 (S104), the profile DB 20 of the print control system 2 receives that request and the TP data and returns the acknowledge (ACK) to the calorimeter device 34.

At Step 106 (S106), the calorimeter device 34 authorizes the profile delivery device 22 of the print control system 2 to use the TP data delivered to the profile DB 20 in the process of S102.

The profile delivery device 22 brings the TP data stored in the profile DB 20 into an available state, that is, into a state where the delivery to the profile delivery device 22 and the user system 4 is started.

At Step 108 (S108), the profile delivery device 22 returns the ACK to the calorimeter device 34 of the print system 3.

[TP Delivery Stop]

FIG. 8 is a sequence diagram showing a second operation (S12) of the print service system 1 shown in FIG. 1 and so on.

In the operations shown in FIG. 8, in response to the operation of the user to the PC 48, the calorimeter device 34 (FIG. 2) of the print system 3 explicitly requests the profile delivery device 22 (FIG. 3) of the print control system 2 for the stop of the delivery of the TP data to the print system 3.

At Step 120 (S120), as shown in FIG. 8, the calorimeter device 34 of the print system 3 designates the TP data and requests the profile delivery device 22 of the print control system 2 to inhibit the use of the TP data and to delete the TP data.

At Step 122 (S122), in accordance with the request, the profile delivery device 22 stops the delivery of the TP data designated, deletes the TP data stored in the profile DB 20, and returns the ACK to the calorimeter device 34 of the print system 3.

[Print Process]

FIG. 9 is a sequence diagram showing a third operation (S14) of the print service system 1 shown in FIG. 1 and so on.

In the operations shown in FIG. 9, the image processing device 42 (FIG. 4) of the user system 4 requests the print control system 2 for the TP data, and generates the DLP data in response to the TP data so that the RIP process is done with the DLP data and output from the printer 44.

Moreover, the image processing device 42 of the user system 4 performs the RIP process with the TP data and causes the printing device 36 (FIG. 2) of the print system 3 to print.

Here, in the individual Figures of and subsequent to FIG. 9, the sequences for transmitting the ACK and so on are suitably omitted.

On the other hand, the sequence shown in FIG. 9 can also be applied to the RIP process using the DLP data in the image processing device 42.

At Steps 140 and 142 (S140 and 142), in accordance with the operations of the user, the PC 48 (FIG. 4) of the user system 4 outputs the request for the RIP process using the DLP data and the drawing data, which a target of the RIP process, to the image processing device 42.

At Step 144 (S144), the image processing device 42 of the user system 4 requests the print control system 2 for the delivery of the TP data.

At Step 146 (S146), the profile delivery device 22 of the print control system 2 inquires the calorimeter device 34 (FIG. 2) of the print system 3 whether or not the TP data of the printing device 36 have changed.

At Step 148 (S148), the profile delivery device 22 (FIG. 3) retrieves the profile DB 20, and when the TP data inquired has not changed, the profile delivery device 22 answers to the print control system 2 the fact.

At Step 150 (S150), the profile delivery device 22 reads the TP data stored in the profile DB 20, and outputs the TP data to the image processing device 42 (FIG. 4) of the user system 4.

At Step 152 (S152), the image processing device 42 (FIG. 4) of the user system 4 generates the DLP data from the TP data received from the print control system 2 and the DP data obtained by the calorimeter device 46 of the user system 4.

Moreover, the image processing device 42 performs the RIP process using the DIP data, and generates and outputs the image data to be output from the printer 44 to the PC 48.

At this time, the image processing device 42 may inform the print system 3 of the generation of the DLP data, and the accounting device 30 of the print system 3 may charge the image processing device 42 for the TP data provided at the process of S150.

At Step 154 (S154), the user of the PC 48 (FIG. 4) of the user system 4 displays and confirms the image from the image processing device 42 on the display/input device 106 (FIG. 5), and requests the image processing device 42 for the print.

At Steps 156 and 158 (S156 and S158), the image processing device 42 (FIG. 4) of the user system 4 requests the printer 44 to print, and outputs the image data, which have been subjected to the RIP process with the DLP data.

At Step 160 (S160), the user who has confirmed the print result of the printer 44 operates the PC 48 and issues the request for the print to the printing device 36 of the print system 3.

At Steps 162 and 164 (S162 and S164), when the PC 48 of the user system 4 requests the image processing device 42 for the output of the image data to the printing device 36, the image processing device 42 outputs either the drawing data input from the PC 48 or the image data obtained by subjecting the drawing data to the RIP process without using the profile data, to the image processing device 32 (FIG. 2) of the print system 3.

Alternatively, the image processing device 42 of the user system 4 outputs the image data obtained by subjecting the drawing data to the RIP process by using the TP data, to the printing device 36 of the print system 3.

At Step 166 (S166), the image processing device 32 (FIG. 2) of the print system 3 either subjects the drawing data sent from the image processing device 42 (FIG. 4) of the user system 4, to the RIP process using the TP data of the printing device 36 thereby to generate the image data, or corrects the image data using the TP data, and outputs the image data to the printing device 36, so that the printing device 36 prints this image data.

Alternatively, the printing device 36 of the print system 3 prints the image data sent from the image processing device 42 (FIG. 4) of the user system 4.

The image processing device 32 of the print system 3 informs the image processing device 42 of the print result (e.g., the print success) of the printing device 36.

A portion of the print process of the print service system 1 shown in FIG. 9, will be further described with reference to FIG. 10.

Figure 10:
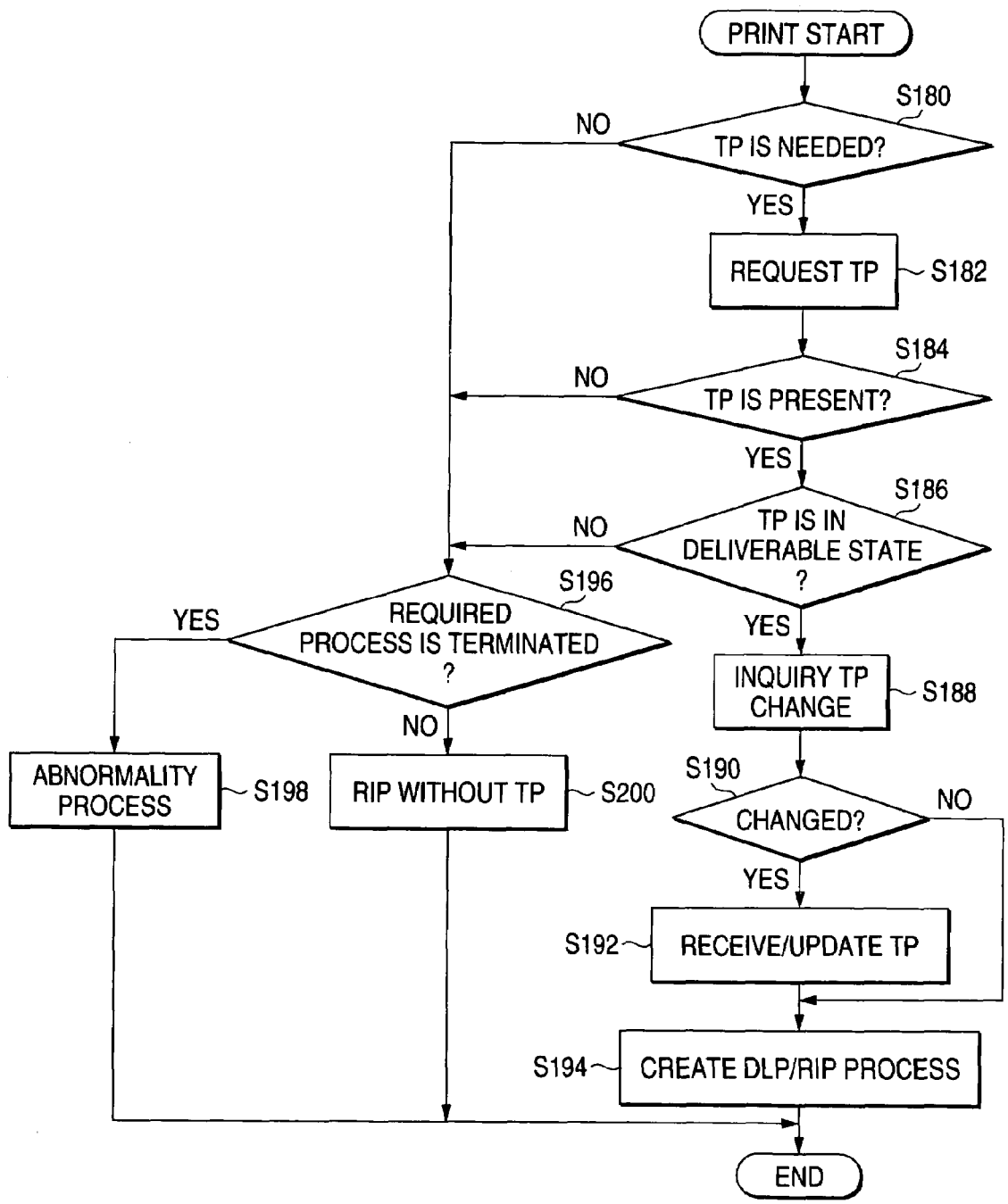
FIG. 10 is a flow chart showing a portion of the print processes shown in FIG. 9.

FIG. 10 is a flow chart showing a portion of the print processes shown in FIG. 9.

At Step 180 (S180), as shown in FIG. 10, the image processing device 42 (FIG. 2) of the user system 4 decides whether or not the TP data are needed in the RIP process requested by the PC 48.

The image processing device 42 advances to the process of Step 182, in case the TP data are needed, but to the process of S204 in other cases.

At Step 182 (S182), the image processing device 42 requests the profile delivery device 22 of the print control system 2 for the delivery of the TP data.

At Step 184 (S184), the profile delivery device 22 (FIG. 3) of the print control system 2 decides whether or not the TP data requested exist in the print service system 1 (FIG. 1).

The profile delivery device 22 advances to the process of S186, in case the TP data requested by the image processing device 42 exist in the print service system 1, but to the process of S204 in other cases.

At Step 186 (S186), the profile delivery device 22 decides whether or not the requested TP data in the profile DB 20 are in a deliverable state.

The profile delivery device 22 advances to the process of S188, in case the requested TP data are deliverable, but to the process of S196 in other cases.

At Step 188 (S188), the profile delivery device 22 inquires the print system 3 for the change of the TP data, and the calorimeter device 34 (FIG. 2) of the print system 3 responds to that inquiry and returns the time when the TP data was finally changed.

At Step 190 (S190), it is decided whether or not the update time returned from the calorimeter device 34 (FIG. 2) of the print system 3 is before the time when the TP data in the profile DB 20 was finally updated, that is, whether or not the TP data stored in the profile DB 20 have changed in the print system 3.

The profile delivery device 22 advances to the process of S192, in case the TP data changed, but to the process of S194 in other cases after outputting the TP data stored in the profile DB 20 to the image processing device 42 (FIG. 4) of the user system 4.

At Step 192 (S192), the profile delivery device 22 requests the colorimeter device 34 of the print system 3 for the TP data, and receives the TP data returned in response to that request thereby to update the TP data stored in the profile DB 20.

At Step 194 (S194), the image processing device 42 (FIG. 4) of the user system 4 or the profile delivery device 22 (FIG. 2) generates the DLP data from the DP data and the TP data.

Alternatively, the image processing device 42 of the user system 4 or the image processing device 32 (FIG. 2) of the print system 3 performs the RIP process with the TP data (or the DLP data).

At Step 196 (S196), the individual components of the print service system 1 decide whether or not the requested processing has been terminated.

The individual components of the print service system 1 advances to the process of S200, in case the process is terminated, but to the process of S198 in other cases.

At Step 198 (S198), the individual components of the print service system 1 performs an abnormality process and then terminates the process.

At Step 200 (S200), the image processing device 42 (FIG. 4) of the user system 4 or the profile delivery device 22 (FIG. 3) performs the RIP process without using the TP data.

Figure 11:
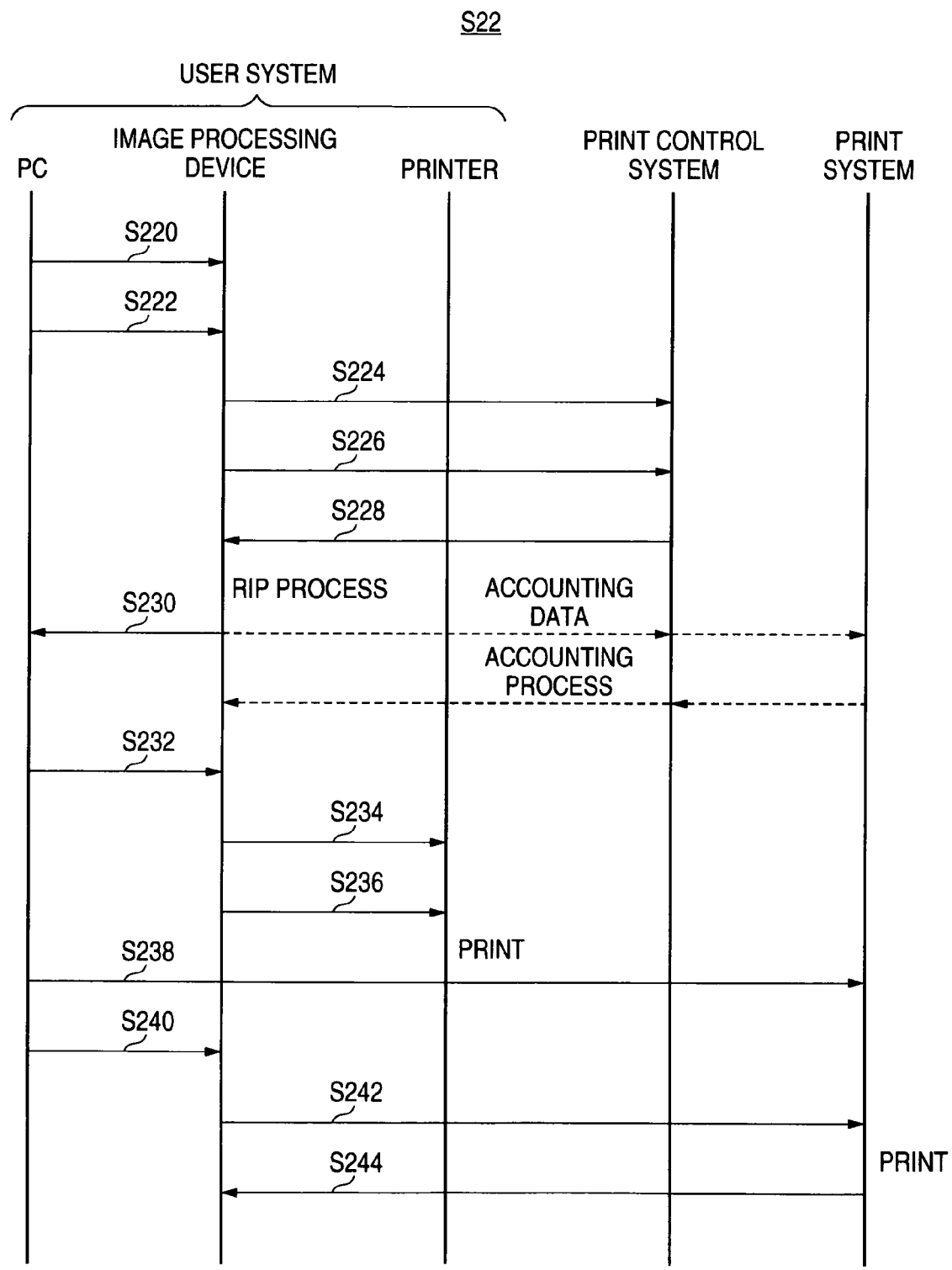

FIG. 11 is a sequence diagram showing a fourth operation (S22) of the print service system 1 shown in FIG. 1 and so on.

In the operations shown in FIG. 11, the profile delivery device 22 of the print control system 2 generates the DLP data.

At Steps 220 and 222 (S220 and S222), in accordance with the operations of the user, the PC 48 of the user system 4 outputs the request for the RIP process using the DLP data and the drawing data for the RIP process, to the image processing device 42.

At Steps 224 and 226 (S224 and S226), the image processing device 42 of the user system 4 requests the print control system 2 for the generation of the DLP data, and outputs the DP data of the printer 44.

At Step 228 (S228), the profile delivery device 22 (FIG. 3) of the print control system 2 generates the DLP data from the TP data stored in the profile DB 20 or acquired from the print system 3, and the DP data received at the process of S226, and outputs the DLP data to the image processing device 42 (FIG. 4) of the user system 4.

At Step 230 (S230), the image processing device 42 of the user system 4 generates the image data by performing the RIP process with the DLP data received from the profile delivery device 22, and outputs the image data to the PC 48.

At this time, as indicated by dotted lines, the image processing device 42 may inform the print control system 2 of the generation of the DLP data, and the accounting device 24 of the print control system 2 may charge the image processing device 42 for the DLP data provided at the process of S228.

At Step 232 (S232), the user who has confirmed the print result by the printer 44 operates the PC 48 to request the printing device 36 of the print system 3 for the print.

At Steps 234 and 236 (S234 and S236), the image processing device 42 (FIG. 4) of the user system 4 requests the printer 44 for the print, and outputs the image data, which have been subjected to the RIP process with the DLP data thereto.

At Step 238 (S238), the user who has confirmed the print result by the printer 44 operates the PC 48 and requests the printing device 36 of the print system 3 for the print.

At Steps 240 and 242 (S240 and S242), when the PC 48 of the user system 4 requests the image processing device 42 for the output of the image data to the printing device 36, the image processing device 42 outputs either the drawing data input from the PC 48 or the image data obtained by subjecting the drawing data to the RIP process without using the profile data, to the image processing device 32 (FIG. 2) of the print system 3.

Alternatively, the image processing device 42 of the user system 4 outputs the image data obtained by subjecting the drawing data to the RIP process by using the TP data, to the printing device 36 of the print system 3.

At Step 244 (S244), the image processing device 32 (FIG. 2) of the print system 3 either generates the image data by subjecting the drawing data sent from the image processing device 42 (FIG. 4) of the user system 4 to the RIP process using the TP data of the printing device 36, or corrects the image data with the TP data, and outputs the image data to the printing device 36, so that the printing device 36 prints the image data.

Alternatively, the printing device 36 of the print system 3 prints the image data sent from the image processing device 42 (FIG. 4) of the user system 4.

The image processing device 32 of the print system 3 informs the image processing device 42 of the print result (e.g., the print success) of the printing device 36.

[Automatic DLP Data Generation]

Here will be described a method for generating the DLP data automatically in the print service system 1.

Figure 12:
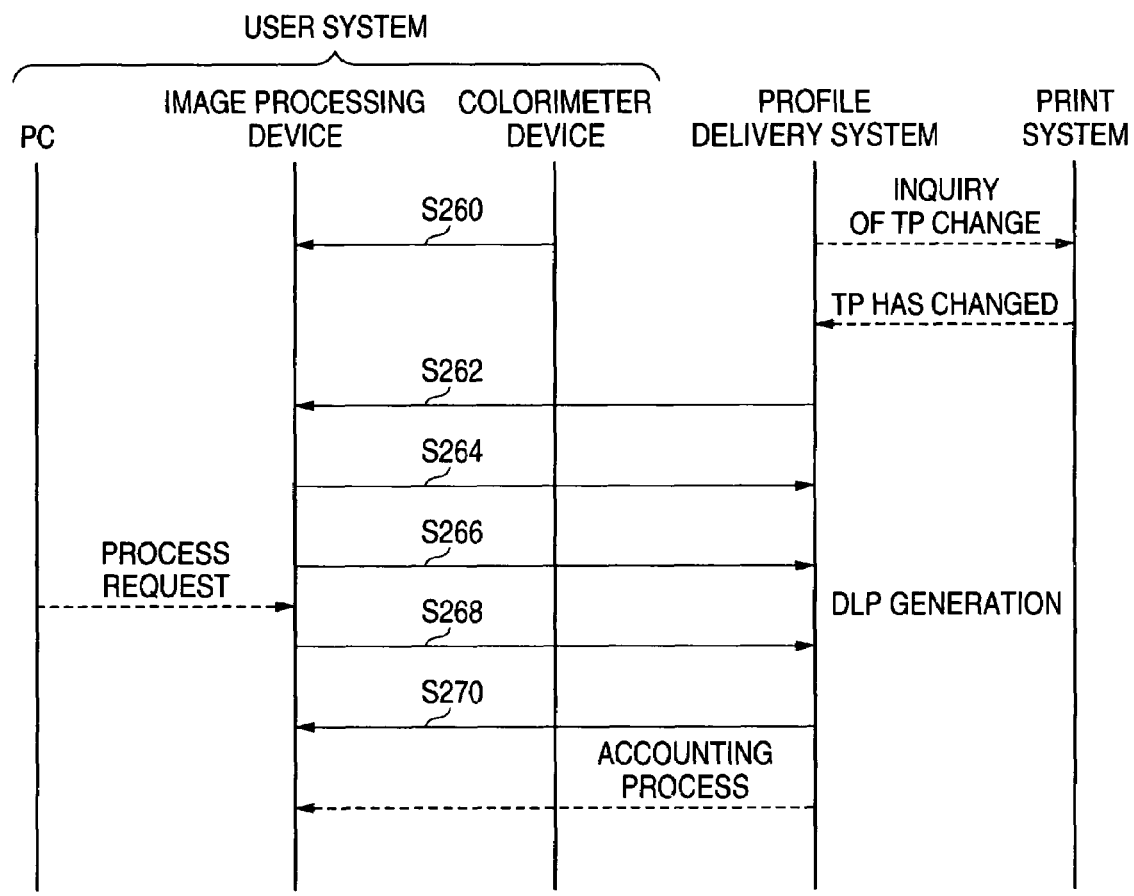

FIG. 12 is a sequence diagram showing a fifth operation (S26) of the print service system 1 shown in FIG. 1 and so on.

In the operations shown in FIG. 12, in the user system 4 (FIG. 4), the calorimeter device 46 informs the image processing device 42 of the change of the DP, and the print control system 2 acquires the DP data from the image processing device 42 of the user system 4 thereby to generate the DLP data automatically.

At Step 260 (S260), as shown in FIG. 12, the calorimeter device 46 (FIG. 4) of the user system 4 informs the colorimeter device 46 of the changed DP data when the DP data of the printer 44 are changed by replacing or changing the setting of the printer 44.

At Step 262 (S262), when the TP data changes in the print system 3 as indicated by dotted lines in FIG. 12, the profile delivery device 22 (FIG. 3) of the print control system 2 inquires the image processing device 42 of the user system 4 whether or not the DP data have changed.

At Steps 264 and 266 (S264 and S266), in response to the inquiry, the image processing device 42 (FIG. 4) of the user system 4 informs the change of the DP data and returns the DP data.

The profile delivery device 22 (FIG. 3) of the print control system 2, which has received the DP data, generates the DLP data from the DP data and the TP data and stores the DLP data in the profile DB 20.

At Steps 268 and 270 (S268 and S270), when the image processing device 42 (FIG. 4), which has received the process request from the PC 48 of the user system 4, requests the profile delivery device 22 (FIG. 3) of the print control system 2 for the DLP data as indicated by dotted lines in FIG. 12, the profile delivery device 22 reads the DLP data from the profile DB 20 and returns the DLP data to the image processing device 42.

At this time, the accounting device 24 of the print control system 2 may charge the user system 4 for the DLP data output as indicated by dotted lines.

The sum of the charge for the DLP data may be determined, for example, with reference to the quality of the DLP data generated, by evaluating the quality.

Here, the quality of the DLP data is defined, for example, with reference to what range the correction can be made on the color space or what accuracy/resolution the color can be mapped (in detail) in, when the color correction is made by using those DLP data.

Moreover, the sum of the charge for the color correction may also be changed according to the quality of the DLP data used for the color correction.

Figure 13:
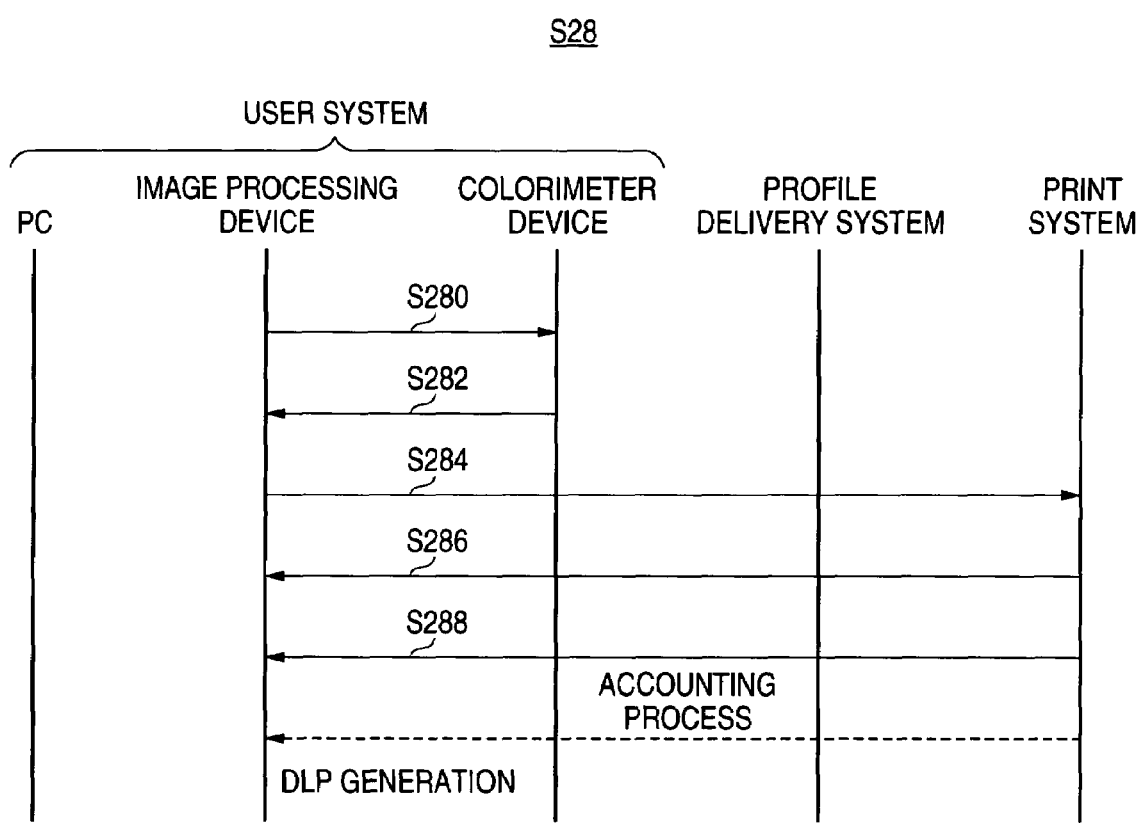

FIG. 13 is a sequence diagram showing a sixth operation (S28) of the print service system 1 shown in FIG. 1 and so on.

In the operations shown in FIG. 13, the image processing device 42 of the user system 4 (FIG. 4) generates the DLP data automatically, when the DP data and the TP data change.

At Step 280 (S280), as shown in FIG. 13, the image processing device 42 (FIG. 4) of the user system 4 periodically inquires the calorimeter device 46 whether or not the DP data have changed.

At Step 282 (S282), the calorimeter device 46 of the user system 4 informs the image processing device 42 of the change of the DP data, and outputs the changed DP data to the image processing device 42.

At Step 284 (S284), the image processing device 42 (FIG. 4) of the user system 4 inquires the colorimeter device 34 (FIG. 2) of the print system 3 whether or not the TP data has changed.

At Steps 286 and 288 (S286 and S288), the colorimeter device 34 (FIG. 2) of the print system 3 informs the image processing device 42 of the user system 4 of the change of the TP data, and outputs the changed TP data to the image processing device 42 of the user system 4.

The image processing device 42 (FIG. 4) of the user system 4 generates the DLP data automatically by using the DP data and the TP data received from the calorimeter device 42 (FIG. 3) of the user system 4 and the calorimeter device 34 (FIG. 2) of the print system 3.

At this time, the accounting device 30 of the print system 3 may account the TP data output to the user system 4 as indicated by dotted lines.

Figure 14:
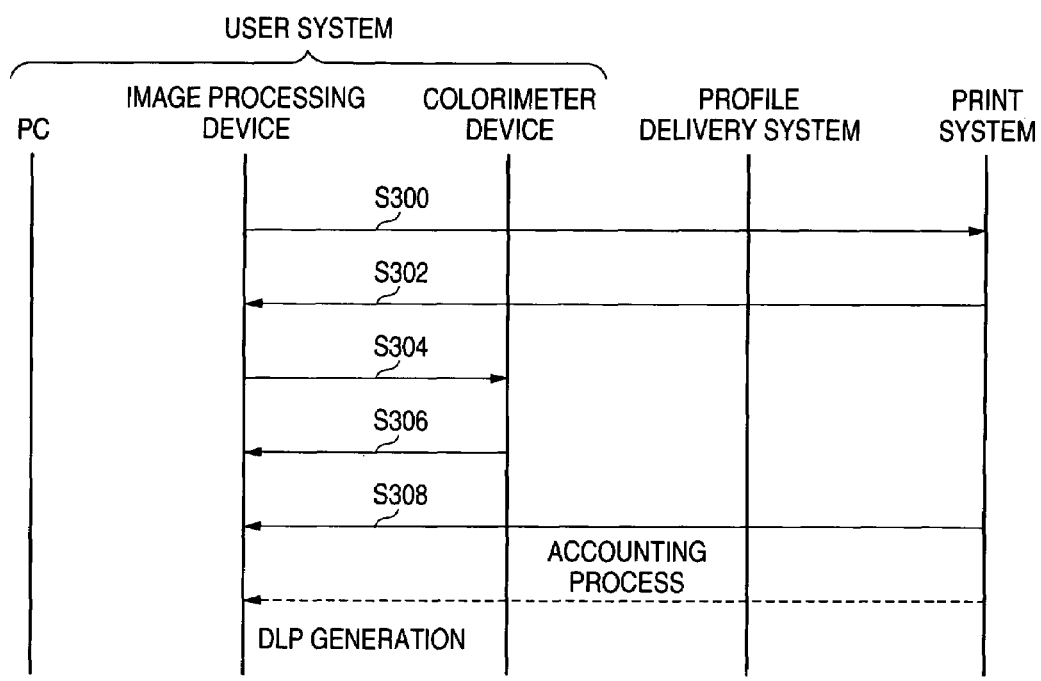

FIG. 14 is a sequence diagram showing a seventh operation (S30) of the print service system 1 shown in FIG. 1 and so on.

The operations shown in FIG. 14 are identical to those of the processes shown in FIG. 13 excepting that the chance of the DLP generation by the user system 4 is the change of the TP data of the print system 3.

At Step 300 (S300), as shown in FIG. 14, the image processing device 42 (FIG. 4) of the user system 4 periodically inquires the calorimeter device 34 (FIG. 2) of the print system 3 whether or not the TP data have changed, for example.

At Step 302 (S302), the colorimeter device 34 of the print system 3 informs the image processing device 42 of the change of the TP data, and outputs the changed TP data to the image processing device 42 at step 308 (S308).

At Step 304 (S304), the image processing device 42 (FIG. 4) of the user system 4 inquires the colorimeter device 46 whether or not the DP data have changed.

At Steps 306 (S306), the colorimeter device 46 (FIG. 4) of the user system 4 informs the image processing device 42 of the change of the DP data, and outputs the changed DP data to the image processing device 42 of the user system 4.

The image processing device 42 (FIG. 4) of the user system 4 generates the DLP data automatically by using the DP data and the TP data received from the colorimeter device 46 (FIG. 4) of the user system 4 and the calorimeter device 34 (FIG. 2) of the print system 3.

At this time, the accounting device 30 of the print system 3 may account the TP data output to the user system 4.

Figure 15:
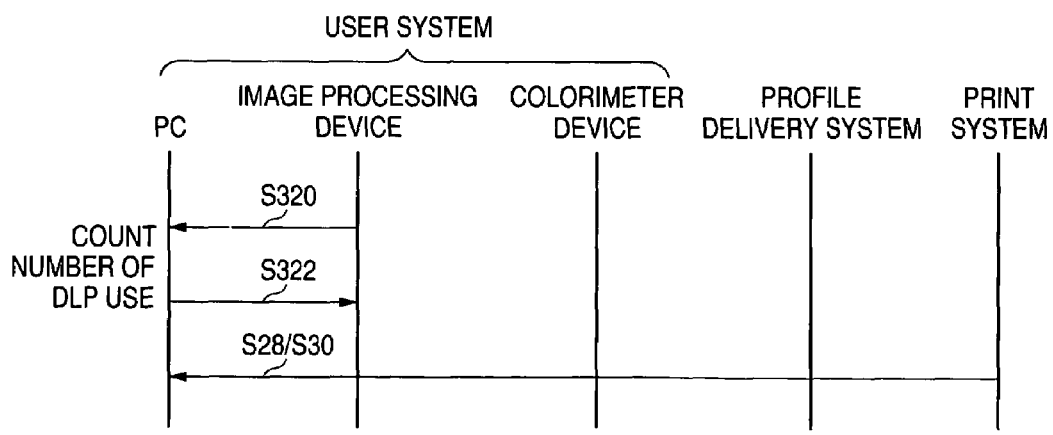

FIG. 15 is a sequence diagram showing an eighth operation (S32) of the print service system 1 shown in FIG. 1 and so on.

In the operations shown in FIG. 15, the PC 48 of the user system 4 (FIG. 4) sets the automatic generation processing of the DLP data, which is used highly frequently, for the image processing device 42.

At Step 320 (S320), as shown in FIG. 15, the image processing device 42 informs the PC 48 of the use of the DLP data each time the DLP data are used in the user system 4 (FIG. 4).

At Step 322 (S322), the PC 48 of the user system 4 sets the execution of the DLP automatic generation (S28/S30) shown in FIG. 13 and FIG. 14, for the image processing device 42, when the use frequency or the number of use of the DLP data exceeds a predetermined reference.

Figure 16:
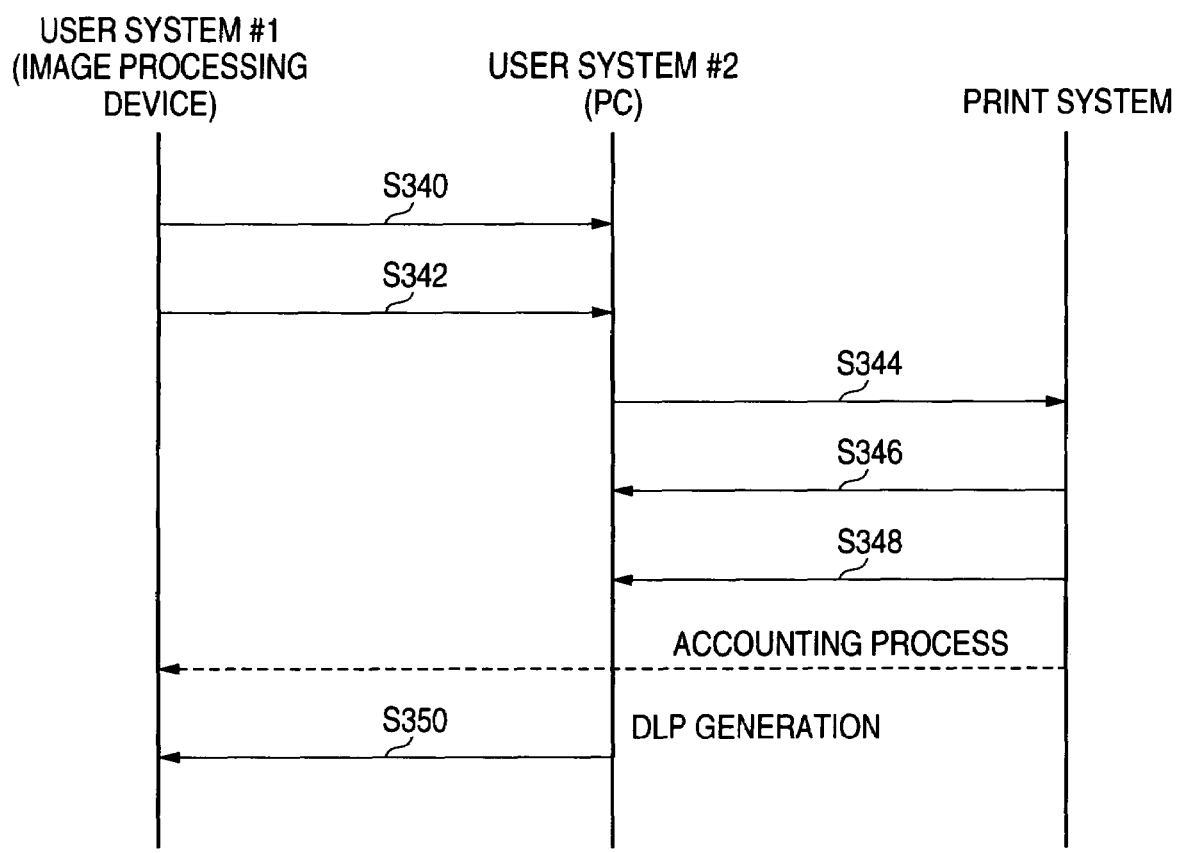

FIG. 16 is a sequence diagram showing a ninth operation (S34) of the print service system 1 shown in FIG. 1 and so on.

In the operations shown in FIG. 16, the first user system (e.g., the user system 4-1: the user system #1 in the figure) requests the second user system (e.g., the user system 4-2: the user system #2 in the figure) to generate the DLP data.

At Step 340 (S340), as shown in FIG. 16, the first user system requests the second user system to generate the DLP data.

At Step 342 (S342), the first user system outputs the DP data of the printer 44 to the second user system.

At Steps 344 to 348 (S344 to S348), the second user system inquires the print system 3 of the change of the TP data. The print system 3 accordingly informs the second user system of the change of the TP data and outputs the changed TP data.

At this time, the accounting device 30 of the print system 3 may account the TP data output to the second user system as indicated by dotted lines.

At Step 350 (S350), the second user system generates the DLP data by using the DP data received in the process of S342 and the TP data received from the print system 3, and outputs the DLP data to the first user system.

The generation of the DLP data thus shown in FIG. 12 to FIG. 16 is useful for holding the DLP data always in the optimum state and for quickening the print by the printer 44.

Moreover, the generation of the DLP data shown in FIG. 12 to FIG. 16 is useful for utilizing the excess machine power, for example, while the RIP process/print process are not done in the user system 4 or while the RIP process/the print process are not done in the print system 3.

Moreover, the generation of the DLP data shown in FIG. 12 to FIG. 16 is useful for decentralizing the load among the individual systems contained in the print service system 1.

Second Embodiment

Here will be described a second embodiment of the invention.

When the printing device 36 itself is replaced in the print system 3 (FIGS. 1 and 2) or when the firmware of the printing device 36 is replaced, the TP data of the printing device 36 changes.

In this case, inconsistency occurs between the TP data stored in the profile DB 20 (FIG. 3) of the print control system 2 and the real TP data of the printing device 36, which is generated by the colorimeter device 34 of the print system 3.

Assuming that the TP data of the printing device 36 and the TP data stored in the print control system 2 aren't coincident. In this case, even if the DLP data are then generated from the TP data and DP data stored in the print control system 2 so that the image data having its colors corrected with the DLP data are output from the printer 44, the result of this image output is different from the result of the image output, which is obtained by correcting the colors of the same image data with the TP data generated by the calorimeter device 34 and outputting the corrected image data from the printing device 36.

If those TP data have a small difference although they are not consistent, on the other hand, no substantial problem may arise when the difference between the two image output results is sufficiently small.

In case the versions of the TP data and the DP data are managed with the kinds, manufacturing dates and firmware of the printing device 36 and the printer 44 (FIG. 2 and FIG. 4), moreover, it can be easily decided by comparing the version of the TP data and the version of the DP, data that the TP data stored in the print control system 2 and the DP data of the printer 44 do not match.

By comparing the color characteristics of the printing device 36, which are indicated by the TP data, and the color characteristics of the DP data of the printer 44, moreover, it can be judged whether or not the print result of the image data having its colors corrected with the generated DP data by the printer 44 is identical to the image data having its colors corrected with the TP data.

In short, the print result of the printing device 36 can be confirmed by using the printer 44, in case that the color characteristics of the printing device 36 and the color characteristics of the printer 44 are similar to some extent.

In case that the color characteristics of the printing device 36 and the printer 44 are seriously different, on the contrary, the confirmation of the print result of the printing device 36 using the printer 44 may be impossible even with performing the color corrections using the TP data and the DP data.

Noting these points, the second embodiment of the invention is devised to use proper TP data in the user system 4 by judging the individual compatibilities between the TP data stored in the print control system 2 and the individual user systems 4.

Figure 17:
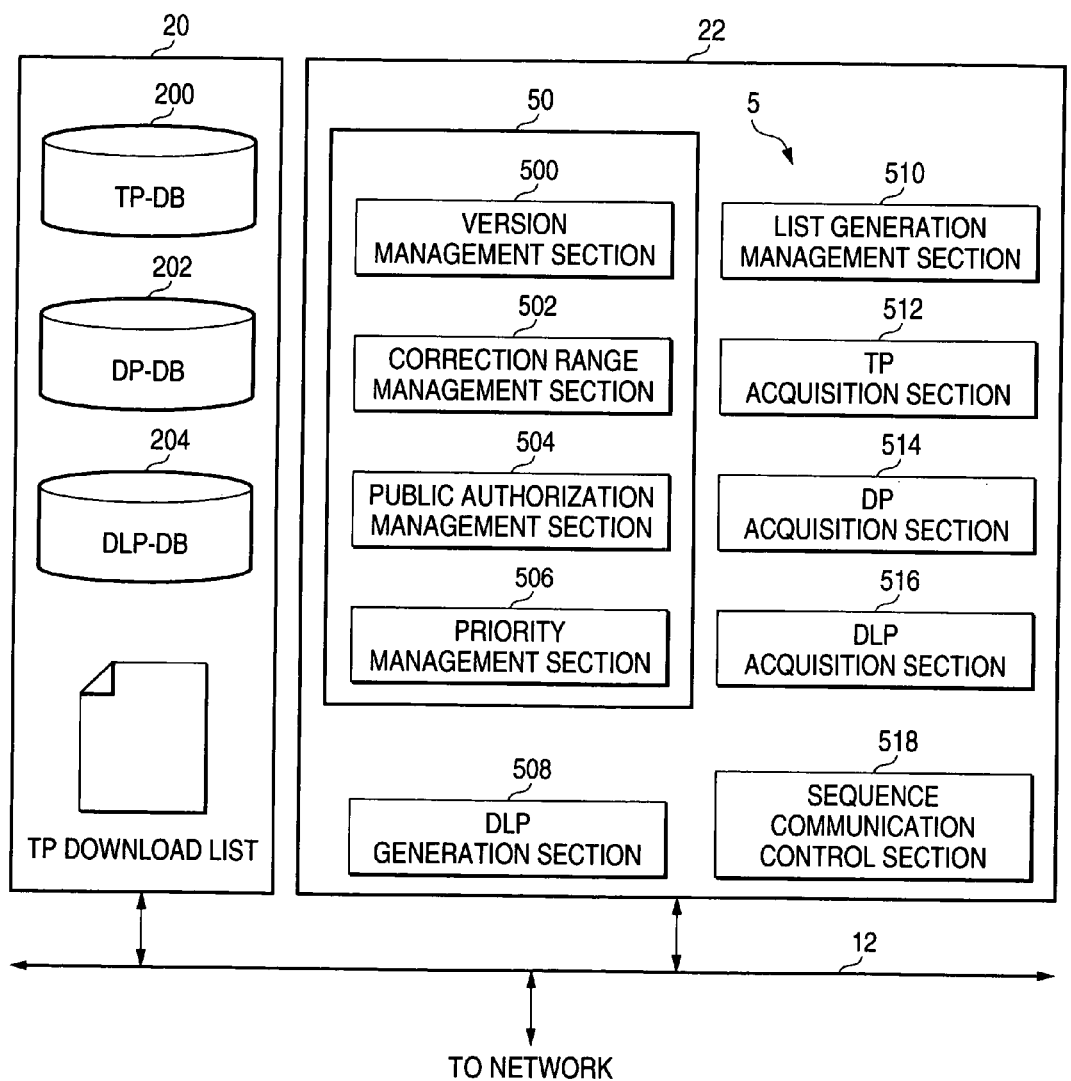
FIG. 17 is a diagram showing the software construction of the profile DB and the profile delivery device of the print control system shown in FIG. 1 and FIG. 3.

FIG. 17 is a diagram showing the software construction of the profile DB 20 and the profile delivery device 22 of the print control system 2 shown in FIG. 1 and FIG. 3.

As shown in FIG. 17, the profile DB 20 is constructed to include a TP-DB 200 for storing/managing the TP data, a DP-DB 202 for storing/managing the DP data, and a DLP-DB 204 for storing/managing the DLP data.

[Profile Delivery Program 5]

Over the profile delivery device 22, as shown in FIG. 17, the profile delivery program 5 is fed through a recording medium 114 (FIG. 5), for example, and is loaded for execution in the memory 104.

The profile delivery program 5 is constructed to include a profile management section 50, a list generation management section 510, a TP acquisition section 512, a DP acquisition section 514, a DLP acquisition section 516, a sequence/communication control section 518, and a DLP generation section 508.

The profile management section 50 is constructed to include a version management section 500, a correction range management section 502, a public authorization management section 504 and a priority management section 506.

With these components, the profile delivery program 5 decides the matching between the TP data of each printing device 36 of the print system 3 and each user system 4, and delivers the DP data on the basis of the decision result.

Moreover, the profile delivery program 5 decides the possibility of the delivery of the TP data for each user system 4, and delivers the TP data on the basis of the decision result.

Moreover, the profile delivery program 5 generates the list (e.g., the TP download list: FIG. 6) of the TP data, which can be delivered to each the user system 4, and stores the list in the profile DB 20 for providing the list to the utilizations of the user system 4 and the user.

The TP acquisition section 512 acquires the TP data from the print system 3 in the processes, which have been described with reference to FIG. 7 to FIG. 16.

The DP acquisition section 514 acquires the DP data from the user system 4 in the processes, which have been likewise described.

In the processes, which have been likewise described, the DLP acquisition section 516 acquires the DLP data from the DLP generation section 508, the user system 4 or the print system 3.

The sequence/communication control section 518 controls the communications with the nodes in the processes, which have been likewise described.

Moreover, the sequence/communication control section 518 realizes the communication sequences with the remaining nodes shown in FIG. 9 and subsequent Figures.

The DLP generation section 508 generates the DLP data in the processes, which have been likewise described.

In the profile management section 50, the version management section 500 manages the versions (FIG. 6) of the TP data, the DP data and the DLP data, which are stored in the TP-DB 200, the DP-DB 202 and the DLP-DB 204 of the profile DB 20.

On the basis of the version of the TP data stored in the TP-DB 200 or the relation between the version of the TP data of each printing device 36 and the version of the DP data of each printer 44, the version management section 500 decides which user system 4 uses the TP data stored in the TP-DB 200 can be used for generating the DLP data or for performing the RIP process, and then, manages the delivery of the TP data in accordance with that decision.

On the basis of the color characteristics of the printer 44 (FIG. 4) indicated by the individual DP data stored/managed by the DP-DB 202 and the color characteristics of the printing device 36 (FIG. 3) indicated by the TP data stored/managed by the TP-DB 200, the correction range management section 502 decides whether or not the color characteristics of the printing device 36 and the color characteristics of the printer 44 are so similar that the print result of the printing device 36 can be confirmed with the printer 44, or whether or not the color characteristics of the printing device 36 and the printer 44 are so different that the print result of the printing device 36 can be confirmed with the printer 44.

In short, the correction range management section 502 decides what range the TP data can be used for generating the DLP data in the user system 4 in, or whether or not the TP data can be used for the RIP process, and manages the delivery of the TP data in accordance with that decision.

The public authorization management section 504 manages the delivery of the TP data on the basis of what user system 4 the print system 3 makes the TP data public to by the processes, which have been described with reference to FIG. 7 and FIG. 8, for example.

In case a plurality of TP data are stored for a printing device 36 (FIG. 2) in the TP-DB 200, as described above, the priority management section 506 what of the TP data is to be delivered in priority to a user system 4, on the basis of the explicit setting of the user of the print system 3 or the user system 4, or the matching (e.g., the matching degree between the color space corresponding to the TP data and the color space corresponding to the DP data) between the DP data of each printer 44 and the TP data of each printing device 36.

For example, the priority management section 506 can either can count how many identical functions the two printing devices/printers share, with reference to the table, in which the two devices are made to have corresponding names and functions, or can judge the matching properties of the TP data between the printing devices 36, with reference to the table in which the device names matching each other are correlated.

To the user, alternatively, the priority management section 506 either displays the TP data given the higher priority for the higher matching properties, if set or needed, in the priority in the input/display device 106, or displays the TP data having a higher priority than the preset priority of a threshold value in the input/display device 106.

In accordance with this operation of the user on the TP data, the priority management section 506 attaches the highest priority to the TP data selected by the user.

In accordance with the aforementioned decision result or the selected result of the user, the priority management section 506 manages the delivery of the TP data.

Figure 18:
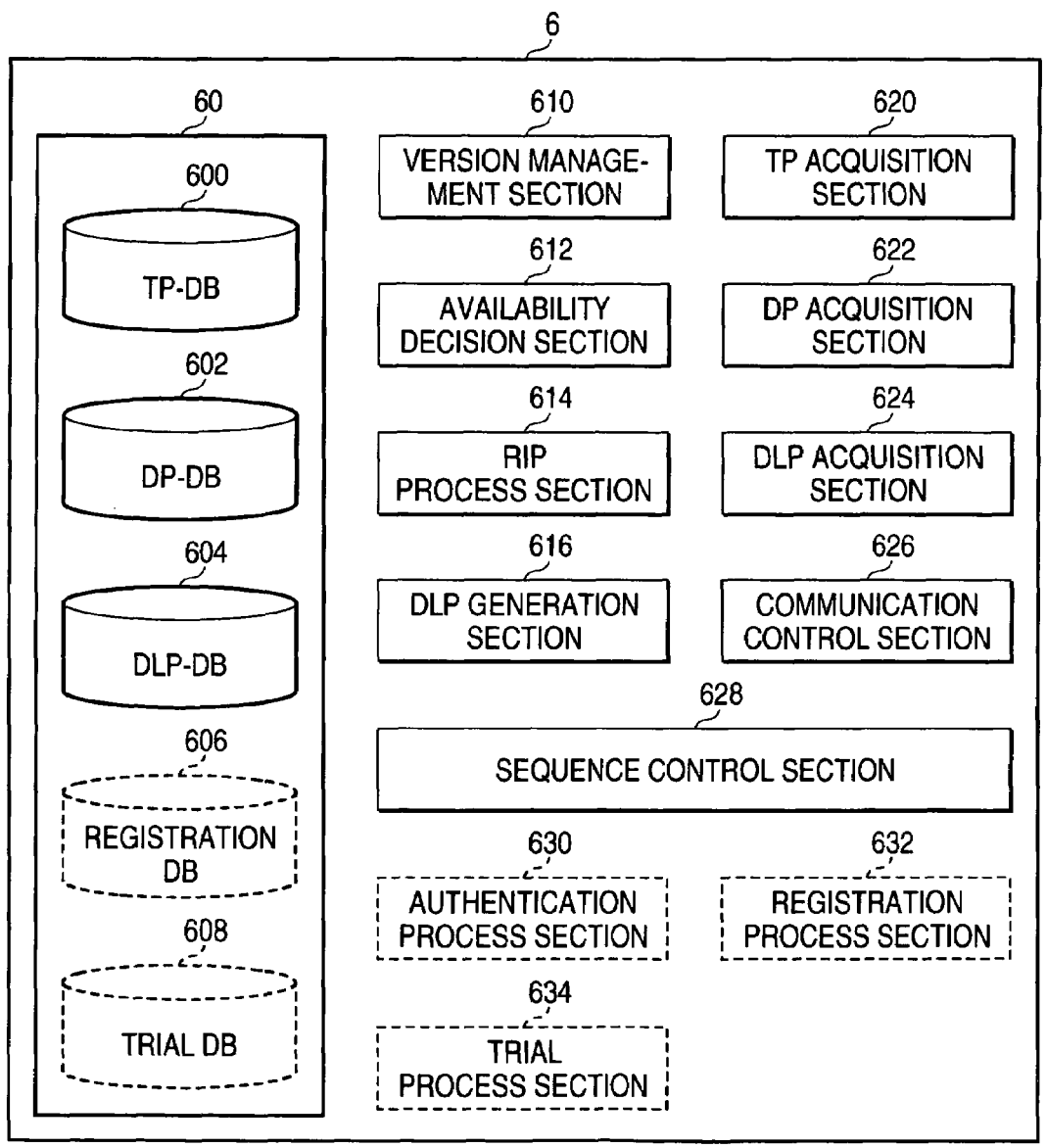
FIG. 18 is a diagram showing a software construction of the image processing device of the user system 4 shown in FIG. 1 and FIG. 4.

FIG. 18 is a diagram showing a software construction of the image processing device 42 of the user system 4 shown in FIG. 1 and FIG. 4.

Over the image processing device 42, as shown in FIG. 18, the image processing program 6 is fed through the recording medium 114 (FIG. 5) and is loaded for execution in the memory 104.

The image processing program 6 is constructed to include a profile DB 60, a version management section 610, an availability decision section 612, a RIP process section 614, a DLP generation section 616, a TP acquisition section 620, a DP acquisition section 622, a DLP acquisition section 624, a communication control section 626 and a sequence control section 628.

The profile DB 60 is constructed to include a TP-DB 600 for storing the TP data, a DP-DB 602 for storing the DP data and a DLP-DB 604.

In the image processing device 32 (FIG. 2) of the print system 3, too, the components of the image processing program 6 are optioned, if necessary, and the image processing program 6 having a registration process section 632, an authentication process section 630, a trial control section 634, a registration DB 606 and a trial DB 608 added thereto is executed, as indicated by dotted lines.

Here, the registration process section 632 performs the later-described registrations of the user system 4.

The authentication process section 630 performs the authentication of the user system 4.

The trial control section 634 performs the process for the later-described trial of the print system 3.

The registration DB 606 stores/manages the data necessary for the registrations and authentications.

The trial DB 608 stores/manages the data necessary for the trial process.

With those components, the image processing program 6 judges the matching properties between the TP data of the individual printing devices 36 of the print system 3 and the individual printers 44, and acquires the TP data based on the decision result.

Moreover, the image processing program 6 generates the DLP data with the TP data judged to match the printer 44 and the DP data of the printer 44, and performs the RIP process with those DLP data.

On the basis of the relation between the version of the TP data acquired from the pint control system 2 or the print system 3 or the version of the TP data and the version of the DP data of each printer 44, the version management section 610 decides whether or not the TP data stored in the TP-DB 600 can be used for generating the DLP data in the DLP generation section 616 or for the RIP process in the RIP process section 614.

On the basis of this decision result, the version management section 610 utilizes the TP data stored in the TP-DB 600, for the RIP process section 614 and the DLP generation section 616.

On the basis of the color characteristics of the printer 44 (FIG. 4), which are indicated by each DP data stored/managed by the DP-DB 602, and the color characteristics of the printing device 36 (FIG. 3), which are indicated by each TP data stored/managed by the TP-DB 600, the availability decision section 612 decides either whether or not the color characteristics of the printing device 36 and the color characteristics of the printer 44 are so similar that the print result of the printing device 36 can be confirmed with the printer 44, or whether or not the color characteristics of the printing device 36 and the printer 44 are so different that the print result of the printing device 36 cannot be confirmed with the printer 44.

In short, the availability decision section 612 decides whether or not each TP data stored in the DP-DB 602 can be used for generating the DLP data in the DLP generation section 616 or for the RIP process in the RIP process section 614.

In accordance with this decision, the availability decision section 612 provides the TP data stored in the TP-DB 600, for use in the RIP process section 614 and the DLP generation section 616.

The DLP generation section 616 generates the DLP data with the TP data, as decided to be suitable for the DLP generation by the version management section 610 and the availability decision section 612, and the DP data of the printer 44.

On the other hand, the RIP process section 614 generates the image data by performing the RIP process using the TP data, as decided to be suitable for the RIP process by the version management section 610 and the availability decision section 612, and outputs the generated image data to the printing device 36 (FIG. 2) of the print system 3.

In the processes described with reference to FIG. 7 to FIG. 16, the TP acquisition section 620 acquires the TP data or the like authorized to be delivered, from the print control system 2 or the print system 3, with reference to the TP download list generated by the list generation management section 510 of the profile delivery program 5 and stored in the profile DB 20.

In the processes, which have been likewise described, the DP acquisition section 622 acquires the DP data from the printer 44 and stores them in the DP-DB 602.

In the processes, which have been likewise described, the DLP acquisition section 624 acquires the DLP data generated by the DLP generation section 616 or the print control system 2, and stores them in the DLP-DB 604.

In the processes, which have been likewise described, the communication control section 626 controls the communications with the nodes.

The sequence control section 628 executes the communication sequences shown in FIG. 9 and subsequent Figures.

[DLP Data Generation]

Here will be described the DLP generation processes according to the profile delivery program 5 and the image processing program 6, which are shown in FIG. 17 and FIG. 18.

First of all, the DLP generation processing by the image processing program 6 will be described on the specific case, in which the matching properties of the TP data for the user system 4 are not judged in the profile delivery device 22 (FIG. 3) so that the user system 4 receives the delivery of the TP data through the print control system 2.

Figure 19:
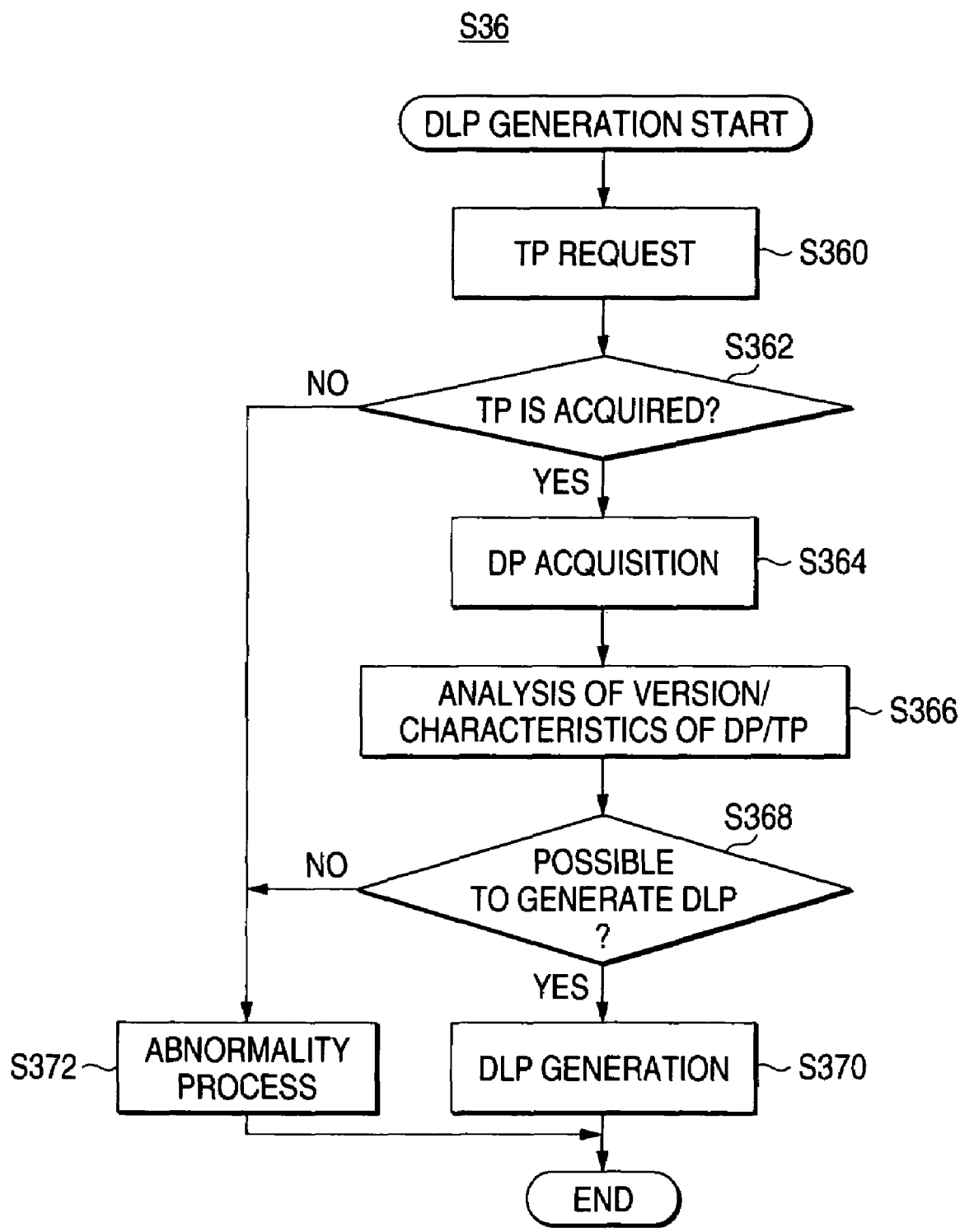
FIG. 19 is a diagram showing the DLP generation processing at the user system by the image processing program shown in FIG. 18.

FIG. 19 is a diagram showing the DLP generation processing at the user system 4 by the image processing program 6 shown in FIG. 18.

In the processes shown in FIG. 9, for example, the generation of the DLP data is started at the image processing device 42.

At Step 360 (S360), the TP acquisition section 620 of the image processing program 6 acquires the TP data, which is indicated in the TP download list (FIG. 6) generated by the list generation management section 510 of the profile delivery program 5, from the profile DB 20, and stores them in the TP-DB 600 (FIG. 18).

At Step 362 (S362), the TP acquisition section 620 judges whether or not the TP data could be normally acquired from the profile DB 20.

The image processing program 6 advances to the process of S364, in case the TP data could be acquired, but to the process of S372 in other cases.

At Step 364 (S364), the DP acquisition section 622 acquires the DP data from the calorimeter device 46 (FIG. 4) of the user system 4, and stores them in the DP-DB 602 (FIG. 18).

At Step 366 (S366), on the basis of the versions (FIG. 6) of the TP data and the DP data acquired, the version management section 610 decides whether or not the TP data acquired match the generation of the DLP data by the DLP generation section 616 and the RIP process by the RIP process section 614.

On the basis of the characteristics of the printing device 36 (FIG. 2) indicated by the TP data and the characteristics of the colorimeter device 46, which are indicated in the DP data, on the other hand, the availability decision section 612 decides whether or not the acquired TP data match the generation of the DLP data by the DLP generation section 616 and the RIP process by the RIP process section 614.

At Step 368 (S368), the DLP generation section 616 judges it in the process of S366 whether or not the acquired TP data match the generation of the DLP data.

The image processing program 6 advances to the process of S370, in case the acquired data match the generation of the DLP data, but to the process of S372 in other cases.

At Step 370 (S370), the DLP generation section 616 generates the DLP data from the TP data and the DP data acquired, and stores them in the DLP-DB 604 (FIG. 18).

Moreover, the RIP process section 614 performs the RIP process using the generated DLP data or the acquired TP data.

At Step 372 (S372), the image processing program 6 performs an abnormality by displaying an error message on the display/input device 106 (FIG. 5) of the PC 48 of the user system 4.

Here will be described the DLP generation processing by the profile delivery program 5.

Figure 20:
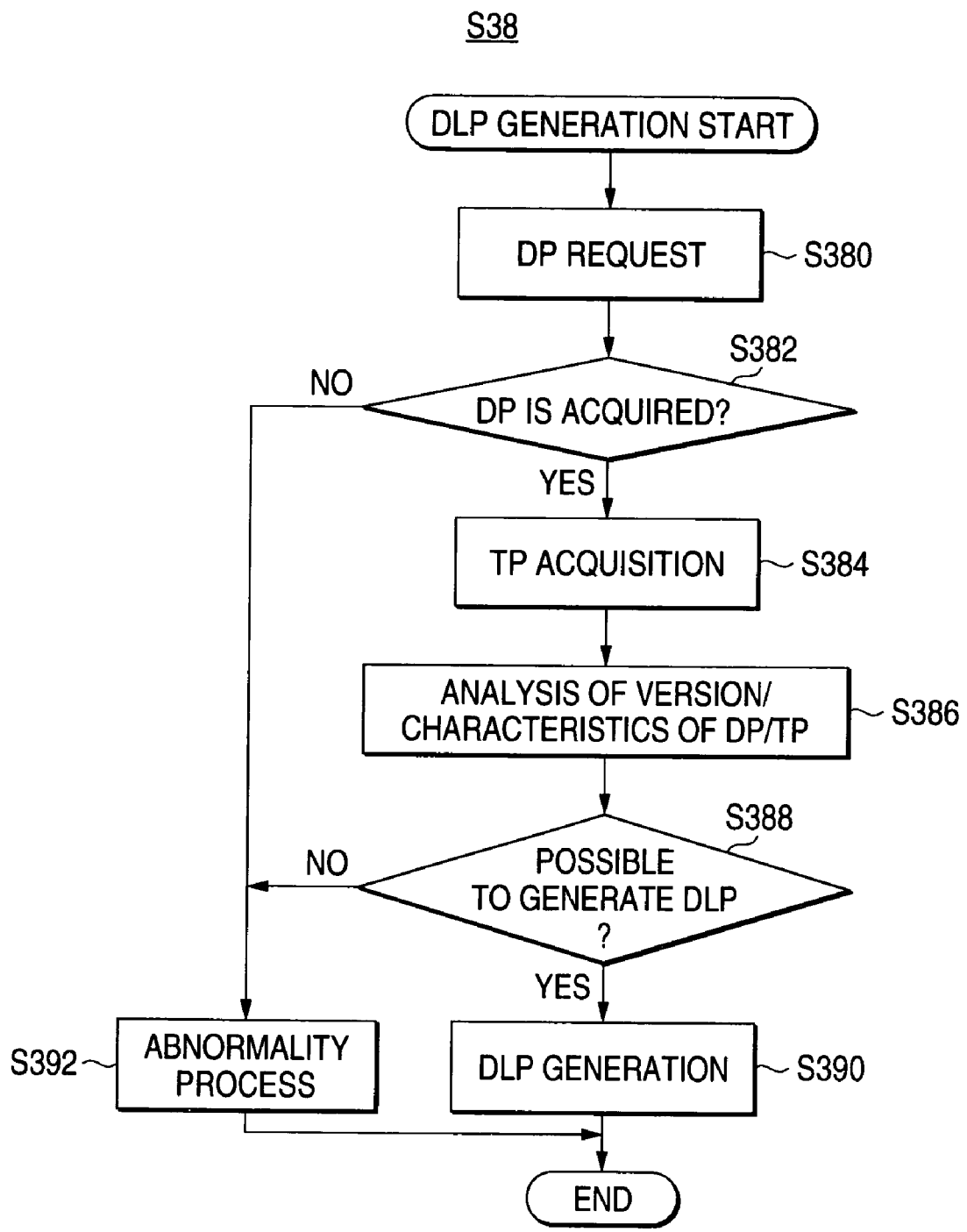
FIG. 20 is a diagram showing the DLP data generation processing (S38) by the profile delivery program shown in FIG. 17.

FIG. 20 is a diagram showing the DLP data generation processing (S38) by the profile delivery program 5 shown in FIG. 17.

In the processes shown in FIG. 11, for example, when the generation of the DLP data is requested for the profile delivery program 5 by the image processing device 42 (FIG. 4), the DP acquisition section 514 requests the colorimeter device 46 of the user system 4 for the delivery of the DP data at Step 380 (S380).

At Step 382 (S382), the DP acquisition section 514 judges whether or not the DP data could be normally acquired.

The profile delivery program 5 advances to the process of S384, in case the DP data could be normally acquired, but to the process of S390 in other cases.

At Step 384 (S384), the TP acquisition sections 12 acquires the TP data stored in the TP-DB 200.

At Step 386 (S386), the version management section 500, the correction range management section 502 and the public authorization management section 504 analyze the versions of the DP data and the TP data, and decides whether or not the TP data acquired at the process of S384 match the generation of the DLP data.

On the other hand, the priority management section 506 decides what TP data are to be used in priority for the generation of the DLP data, when it is decided by the version management section 500 that a plurality of TP data match the user system 4.

Alternatively, the priority management section 506 displays the TP data with the priority on the input/display device 106, and gives the highest priority to the TP data selected by the user, in accordance with the operation of the user for that display.

At Step 388 (S388), the DLP generation section 508 judges whether or not the DLP data can be generated, when it is decided at the process of S386 that the TP data are suitable for the generation of the DLP data.

When the user selects the TP data at the process of S386, the DLP generation section 508 judges whether or not the DLP data can be generated for the TP data selected.

The profile delivery program 5 advances to the process of S390, in case the DLP data can be generated, but to the process of S392 in other cases.

At Step 390 (S390), the DLP generation section 508 generates the DLP data and stores them in the DLP-DB 204.

At Step 392 (S392), the profile delivery program 5 performs an abnormality process to return an error message to the image processing device 42.

[DB Update/List Generation]

Here will be described the DB updating processing and the list generation processing by the profile delivery program 5.

Figure 21:
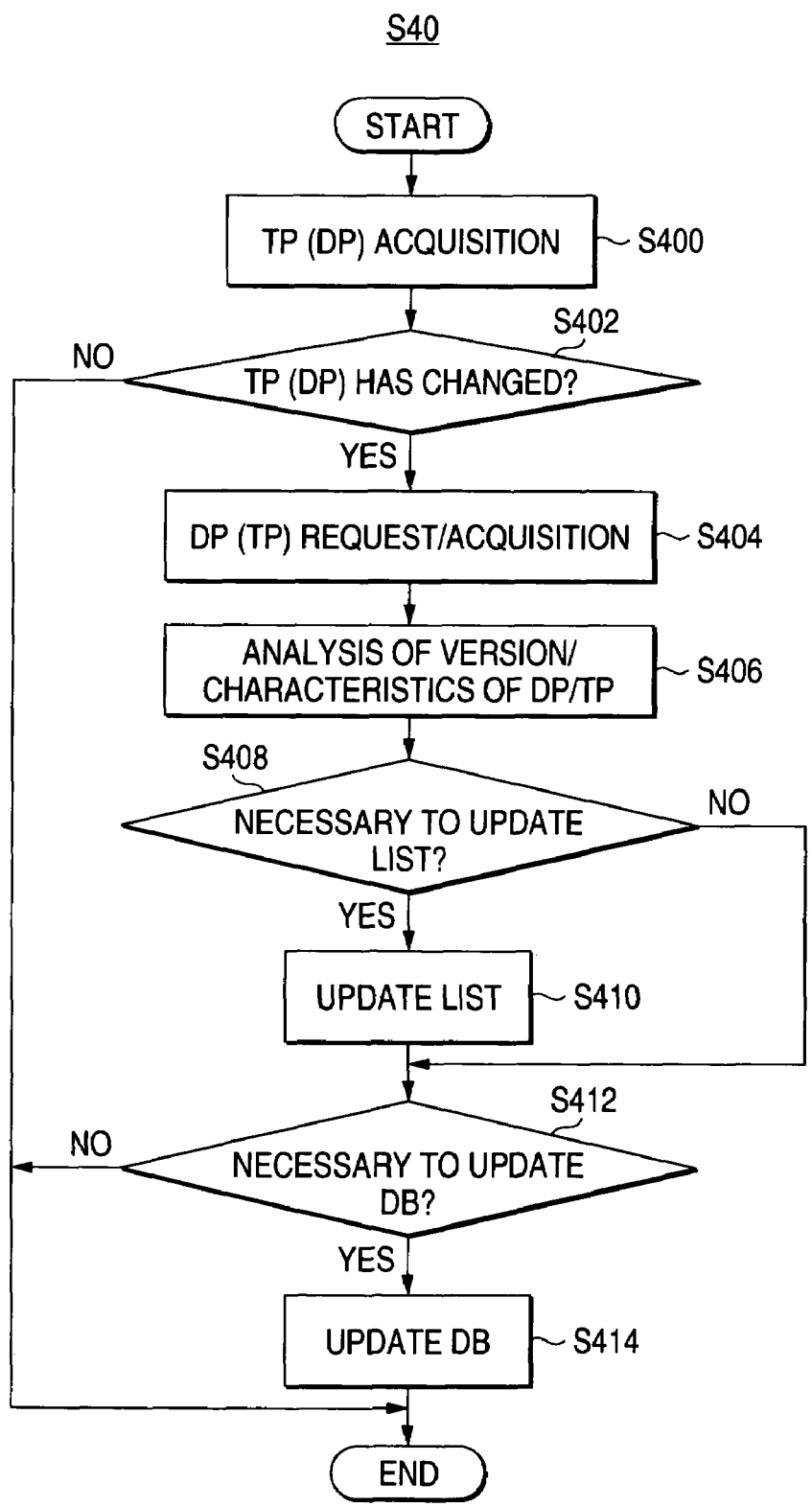
FIG. 21 is a flow chart showing the list generating and DB updating processing (S40) by the profile delivery program, as shown in FIG. 17.

FIG. 21 is a flow chart showing the list generating and DB updating processing (S40) by the profile delivery program 5 shown in FIG. 17.

The profile delivery program 5 requests the TP data in the processes shown in FIG. 9 or acquires the DP in the processes shown in FIG. 11.

At Step 400 (S400), the TP acquisition section 512 acquires the TP data from the print system 3, or the DP acquisition section 514 acquires the DP data from the user system 514.

At Step 402 (S402), the version management section 500, the correction range management section 502, the public authorization management section 504 and the priority management section 506 individually judge whether or not the versions or the like of the TP data and the DP data acquired have changed in comparison with the TP data stored in the TP-DB 200 or the DP data stored in the DP-DB 202.

The profile delivery program 5 advances to S404, in case the TP data or the DP data have changed, but the procedure is ended in other cases.

At Step 404 (S404), the DP acquisition section 514 acquires the DP data from the user system 4, or the TP acquisition section 512 acquires the TP data from the print system 3.

At Step 406 (S406), the version management section 500, the correction range management section 502, the public authorization management section 504 and the priority management section 506 individually analyze the versions or the like of the TP data or the DP data acquired.

At Step 408 (S408), the list generation management section 510 judges whether or not the TP data individually matching the user systems 4 have changed as a result of the analysis of the process of S406.

The profile delivery program 5 advances to the process of S410, in case the TP data individually matching the user systems 4 have changed, but to the process of S412 in other cases.

At Step 410 (S410), the list generation management section 510 updates, if necessary, the list of the user system 4, which is contained in the TP data shown in FIG. 6, and the TP download list (FIG. 6), which is stored in the profile DB 20.

At Step 412 (S412), the version management section 500 judges whether or not it is necessary to update the TP-DB 200 or the DP-DB 202.

The profile delivery program 5 advances to the process of S414, in case it is necessary to change those DBs, but the procedure is ended in other cases.

At Step 414 (S414), the TP acquisition section 512 updates the TP-DB 200 with the acquired TP data, or the DP acquisition section 514 updates the DP-DB 202 with the acquired DP data.

Moreover, the version management section 500, the correction range management section 502, the public authorization management section 504 and the priority management section 506 individually update, if necessary, the versions of the TP data or the DP data, which are stored in the TP-DB 200 and DP-DB 202.

Here, the processes exemplified in the second embodiment can be arbitrarily combined (like the processes to be exemplified by the following individual embodiments) either so long as they are not contradictory to those exemplified in the first embodiment or if they are properly modified.

Third Embodiment

A third embodiment of the invention will be described in the following.

If the license fee for the RIP process program of the image data is high, for example, it raises the price for the device to install the RIP process section 614 (FIG. 18) in the image processing device 42 (FIG. 4) of each user system 4 of the print service system 1 (FIG. 1).

In this case, the RIP process section 614 is installed on not all the user systems 4 but on some of the user systems 4 so that the remaining user systems 4 may utilize the RIP process section 614 and may pay the charge (e.g., the RIP charge) for the RIP to the software maker. Then, a plurality of user systems 4 can reduce their running cost to a low level.

Here, the process quantity is different between the case, in which the color image data are to be subjected to the RIP process, and the case, the black-and-white image data are to be subjected to the RIP process.

In case a user system 4 thus subjects another user system 4 to the RIP process, it is convenient that the charge for the user system 4 requesting the RIP process can be finely done according to the process quantity.

The third embodiment of the invention to be described in the following is made on the background described above and is so devised that the user systems 4 may provide the RIP process function to each other and may perform the fine accounting for the RIP function provided.

From this premise, the print service system 1 is exemplified in the following description by the construction, in which only the image processing program 6 (FIG. 18) operating over the image processing device 42 of some user systems 4 contain the RIP process section 614.

[Operations of Image Processing Device 32 or the Like]

First of all, here will be described the operations of the image processing device 32 of the print system 3 in the third embodiment and the individual components related to the image processing device.

Here, the image processing device 32 of the print system 3 may request, when the load of the process being executed is excessive, the user system 4, in which another RIP process section 614 (FIG. 18) is executed, for the RIP process from another user system 4.

In the following, it will be called the decentralized RIP process that the image processing device 32 requests another node of the user system 4 for the processes such as the RIP process.

[Registration to User System 4]

FIG. 22 is a diagram indicating a format of the registration data, which are output by the user system 4 to the image processing device 32 (FIG. 2) of the print system 3.

Before requesting the print system 3 for the RIP process and the print process, the user of the user system 4 (FIG. 4) uses the PC 48 to make a registration in the print system 3 and to output the registration data, as enumerated in FIG. 22, to the image processing device 32.

As shown in FIG. 22, the registration data include the data covering: a machine number of the PC 48/the image processing device 42 to request the print system 3 for the process; a customer code to be applied from the print system 3 to the user system 4; a setting of the network between the user system 4 and the network 10 (FIG. 1) and the print system 3; a public/private of the image processing device 42 or the like; an initial setting of the print option; a profile registering prefix; and data indicating a decentralized RIP possible/impossible.

In the registration data shown in FIG. 22, "public/private of the image processing device 42" indicates whether or not the image processing device 42 of the user system 4 maybe opened to another user system 4 and used for the decentralized RIP process requested by another user system 4.

On the other hand, the "print option" is used for designating the manner/print number/paper kind when the user system 4 requests the print system 3 for the print, and the "initial setting of the print option" is the initial setting to be used in case the print option is not designated.

On the other hand, the "profile registering prefix" is a prefix for registering the DP data of the printer 44 in the profile DB 20 (FIG. 3) or the like of the print control system 2, and this prefix may be used as an identifier of the user system 4 in the image processing device 32.

The image processing device 32 registers, when it receives registration data from the user system 4, this user system 4 as the user system 4 capable of requesting the image processing device 32 for the RIP process, and issues a managing ID to that user system 4.

In principle, the image processing device 32 does not accept the process request from the user system 4 before that registration.

Exceptionally, however, the image processing device 32 may accept the request for the testing processing of the user system 4 so as to determine the set value of the later-described print option with reference to FIG. 23.

FIG. 23 is a diagram indicating a format of the print option, which is designated for the image processing device 32 (FIG. 2) of the print system 3 by the PC 48 (FIG. 4) or the like of the user system 4.

After the registration in the print system 3, the PC 48 or the like of the user system 4 can request the print system 3 for the RIP process and the print process.

For example, the PC 48 of the user system 4 sends the print option shown in FIG. 23 together with the image data to be printed, to the print system 3, and requests the print process by designating the printing method or the like.

As shown in FIG. 23, the print option includes: the ID of the user system 4 of a requester; the size of print paper; the designation of color print/black-and-white print; the designation of printed number; the document type; the picture quality mode; the printer mode; the color conversion mode; the single/double sides; the magnify/equal/reduce and the magnification at the magnify/reduce; the N-up for printing N-images on one printing paper; the designation of discharge; the spool option; whether or not the RIP image data are to be stored; whether or not the print is to merge; the designation of the color change; the cover page; the kind of print sheet; and the data for designating the process time.

Of these, the "document type" designates the quality of the document paper and is used for obtaining an image approximate the document by the print.

The "picture qualitymode" designates the picture quality of the printed matter such as the standard or the graphics.

The "printer mode" designates the operation modes of the printing device 36 such as the continuous gradation or the screen.

The "color conversion mode" designates the process mode of the RIP processes such as the RGB color correction or not, the sRGB color correction/not or the YMCK color correction/not.

The "designation of discharge" designates what discharge tray the printed result is to be discharged to, when the printing device 36 has a plurality of discharge trays for the printed paper.

The "spool option" designates the process at the time when the RIP process and the print process are spooled by the image processing device 32.

When the decentralized RIP is authorized in the "spool option", for example, the image processing device 32 in an excessive load state transfers this print option and the image data of the print object to the user system 4 other than the requester so that the decentralized RIP process is executed.

The "color change (profile) designate" is used for designating the TP data for the RIP process in the image processing device 32.

In case the TP data are not designated in the print option, the image processing device 32 uses the TP data of the highest use frequency, for example, for the RIP process.

The "cover page" designates whether or not the cover page is to be attached to the print result.

FIG. 24 is a diagram enumerating the format of the RIP data, which is used by the image processing device 32 (FIG. 2) of the print system 3 for presenting the result of the RIP process to the image processing device 32 (FIG. 4) of the user system 4.

When the RIP process is ended in response to the print option, the image processing device 32 outputs the RIP data shown in FIG. 24 to the PC 48 or the like of the user system 4, and informs the result of the RIP process.

The RIP data include: the RIP status; the color image/the black-and-white image; the picture quality mode; the printer mode; the paper size; the number of prints to be processed; the number of pages to be RIP processed; the time for the RIP process; the start time of the RIP process; the size of the image data obtained by the RIP process; the existence of the cover page; whether or not the RIP processed image data are saved; and whether or not the decentralized RIP process has been done.

Here, the RIP data are output to the accounting device 30, too, and are used for the accounting process in the accounting device 24 or 30.

Moreover, the sum of the charge for the RIP process (or the color correction processing) may change according to the quality of the DLP data used in the color collection processing.

FIG. 25 is a diagram enumerating the print data, which are output to the accounting device 30 by the image processing device 32 (FIG. 2) of the print system 3.

When the print by the printing device 36 is ended, the image processing device 32 outputs the print data shown in FIG. 25, to the accounting device 30.

As shown in FIG. 25, the print data cover: the color image/the black-and-white image of the print result; the paper size; the number of prints to be processed; the number of pages; the existence of the cover page; the paper kind; the single/double sides; whether or not the decentralized RIP process has been done; and what user system 4 the decentralized RIP process has been done by.

[Accounting Program 70]

Figure 26:
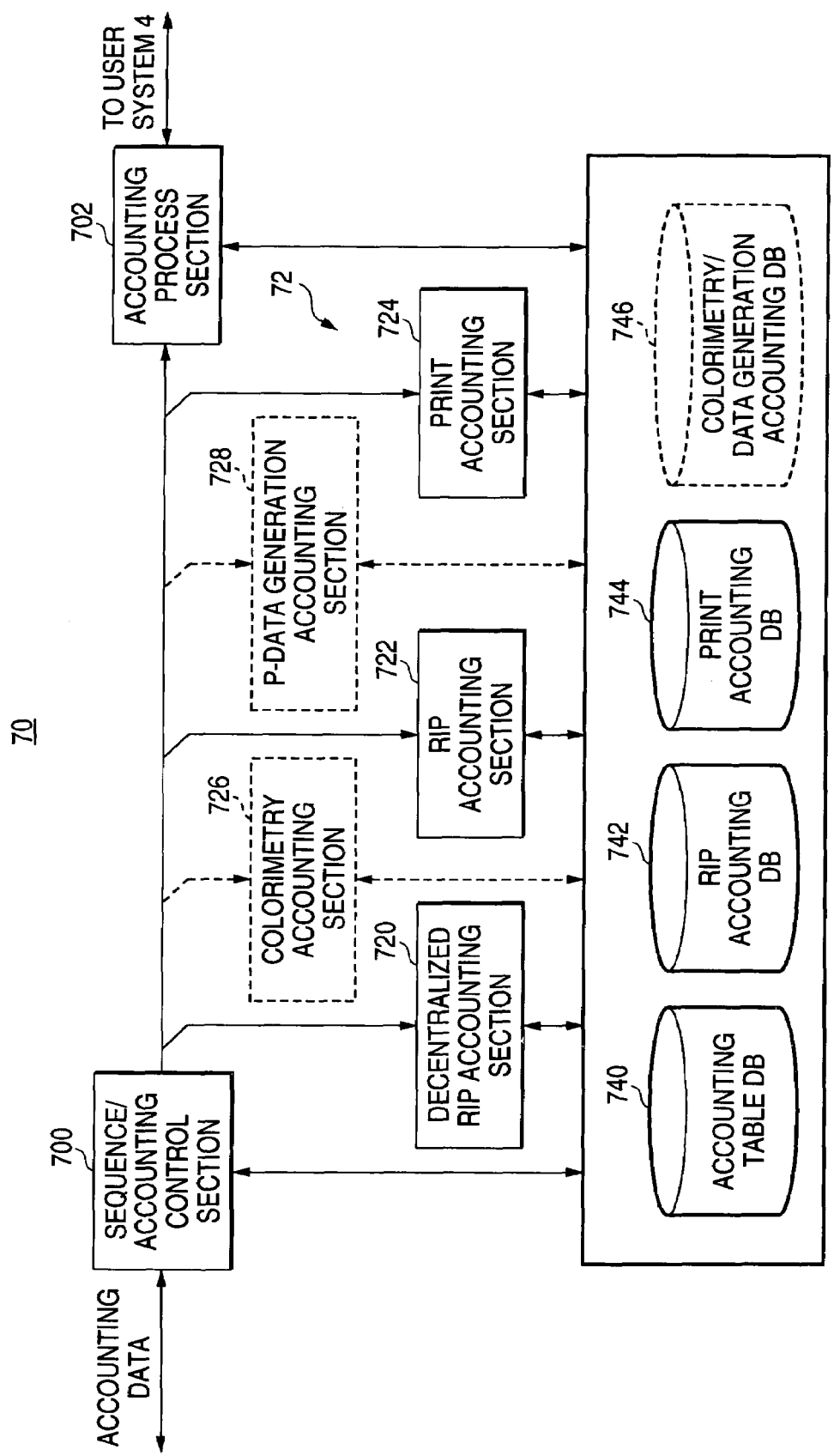
FIG. 26 is a diagram showing a construction of an accounting program to be run in the accounting device of the print system shown in FIG. 2.

FIG. 26 is a diagram showing a construction of an accounting program 70 to be run in the accounting device 30 of the print system 3 shown in FIG. 2.

As shown in FIG. 26, the accounting program 70 is constructed to include a sequence/accounting control section 700, an accounting process section 702, an accounting calculation section 72 and an accounting DB 74.

The accounting program 70 includes an accounting table DB 740, an RIP accounting DB 742 and a print accounting DB 744.

The accounting calculation section 72 includes a decentralized RIP accounting section 720, a RIP accounting section 722 and a print accounting section 724.

To the accounting program 70, as indicated by dotted lines in FIG. 26, there can be suitably added, if necessary: a colorimetry accounting section 726 for calculating the charges for the colorimetry by the calorimeter device 34 and for generating the TP data/the DLP data; a profile data generation accounting section (or P-data generation accounting section) 728, a colorimetry/data generation accounting DB 746 to be used for those accounting operations.

The accounting program 70 is fed through the recording medium 114 (FIG. 5) to the accounting device 30 (FIG. 2), for example, and is loaded for execution in the memory 104.

With those components, the accounting program 70 accounts the individual processes such as the RIP process or the print process to be executed in the print system 3.

Moreover, the accounting program 70 changes the charges according to the modes and contents of the RIP process, for example, and charges the user of the user system 4 having requested the RIP process.

In the accounting program 70, the sequence/accounting control section 700 accepts the accounting data (e.g., the RIP data/the print data: FIG. 24 and FIG. 25) from the image processing device 32, and stores those data, if necessary, in the RIP accounting DB 742 and the print accounting DB 744 of the accounting DB 74.

Moreover, the sequence/accounting control section 700 accepts the accounting table, which is either generated by the operation of the user on the display/input device 106 (FIG. 5) or separately generated in advance and fed through the recording medium 114, and stores the table in the accounting table DB 740.

Here in the accounting table, the individual items contained in the RIP data and the print data (FIG. 24 and FIG. 25) and the unit prices of the charges of every combinations of those items are stored in a table format.

On the other hand, the sequence/accounting control section 700 controls the process of the individual components of the accounting program 70 according to the accounting data from the image processing device 32 and the operations of the PC 48 and so on of the image processing device 32 and the user system 4 upon the display/input device 106.

Moreover, the sequence/accounting control section 700 executes the communication sequences shown in FIG. 9 and subsequent Figures.

In accordance with the control of the sequence/accounting control section 700, the decentralized RIP accounting section 720 processes the RIP data (FIG. 24) stored in the RIP accounting DB 742, with reference to the accounting table stored in the accounting table DB 740. In case the decentralized RIP process is executed, the decentralized RIP accounting section 720 calculates the sum of the extra charge on the user system 4 having requested the RIP process and the sums of the discount charge on the user system 4 having undertaken the decentralized RIP process, and stores the sums in the RIP accounting DB 742.

In accordance with the control of the sequence/accounting control section 700, the RIP accounting section 722 processes the RIP data (FIG. 24) stored in the RIP accounting DB 742, with reference to the accounting table stored in the accounting table DB 740, and calculates and stores the sum of the charge for the ordinary RIP process in the RIP accounting DB 742.

In accordance with the control of the sequence/accounting control section 700, the print accounting section 724 processes the print data (FIG. 25) stored in the print accounting DB 744, with reference to the accounting table stored in the accounting table DB 740, and calculates and stores the sum of the charge for the print process in the print accounting DB 744.

On the basis of the RIP data and the print data (FIG. 24 and FIG. 25) stored in the RIP accounting DB 742 and the print accounting DB 744 and the calculation results of the decentralized RIP accounting section 720, the RIP accounting section 722 and the print accounting section 724, the accounting process section 702 charges the user system 4, which has requested the print system 3 (e.g., the image processing device 32 and the printing device 36: FIG. 2) for the RIP process and the print process.

[Registration/RIP/Print/Accounting]

Here will be described the registration processing, the RIP process, the print process and the accounting process for these processes in the print service system 1 (FIG. 1 and so on).

In order to specify the description and to aid in the understanding, the processes in the following individual Figures will be specific ones. However, these specific examples should not be intended to limit the technical scope of the invention.

Moreover, the accounting process could be executed not only by the accounting device 30 of the user system 4 but also by the accounting device 24 (FIG. 3) of the print control system 2, as indicated by dotted lines in the individual Figures. In the following description, however, the example is specified by the case, in which the accounting device 30 of the user system 4 executes the accounting process.

[Registration Processing]

First of all, here will be described the process, in which the user system 4 is registered for the print system 3 in the print service system 1 (FIG. 1).

Figure 27:
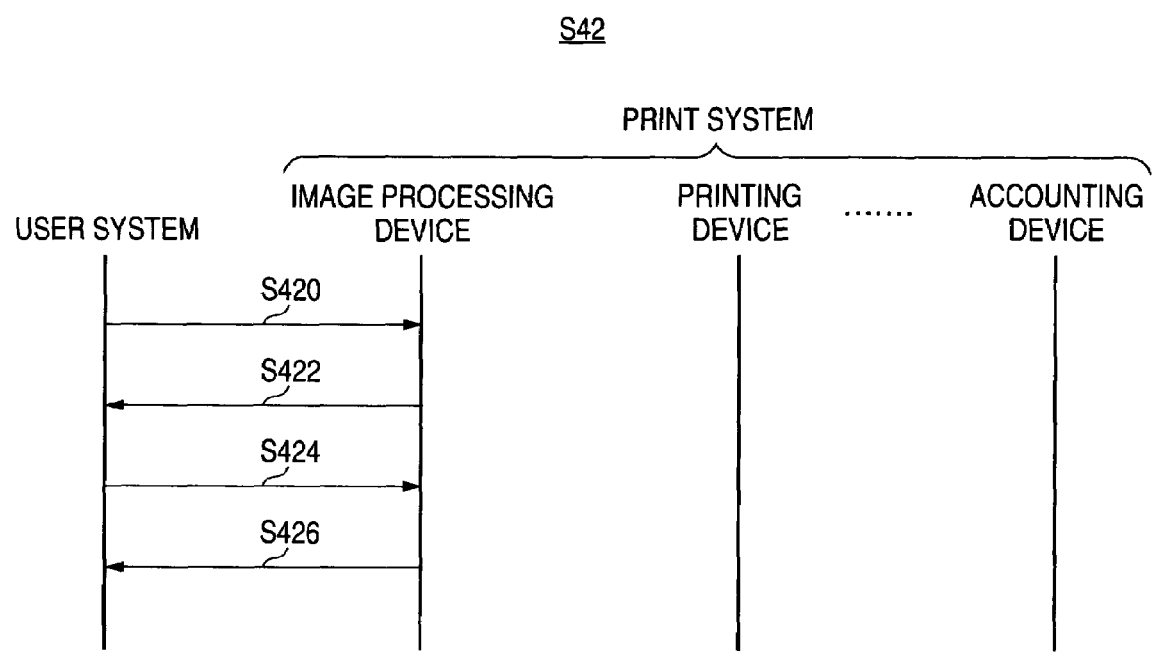
FIG. 27 is a sequence diagram showing a registration processing (S42) for the print system of the user system.

FIG. 27 is a sequence diagram showing a registration processing (S42) for the print system 3 of the user system 4.

At Step 420 (S420), as shown in FIG. 27, the PC 48 (FIG. 4) or the like of the user system 4 requests the registration of the user system 4 for the print system 3.

At Step 422 (S422), the registration process section 632 (FIG. 18) of the image processing device 32 to operate over the image processing device 32 of the print system 3 requests the user system 4 for the output of the registration data.

At Step 424 (S424), the PC 48 of the user system 4 returns the registration data to the image processing device 32.

Then, the registration process section 632 accepts the registration data, registers the user system 4 in the registration DB 606 and stores the registration data of the user system 4.

At Step 426 (S426), the registration process section 632 generates an identification ID for the user system 4.

The registration process section 632 identifies the user system 4 with the generated ID and stores the ID in the registration DB 606.

[RIP/Print/Accounting]

Here will be described the processes in the print service system 1 of the case, in which the image processing device 32 (FIG. 2) is requested for the RIP process and the print process by the user system 4 (FIG. 4), in which these processes are executed by the image processing device 32 and the printing device 36 and in which the processes are charged by the accounting device 30.

Figure 28:
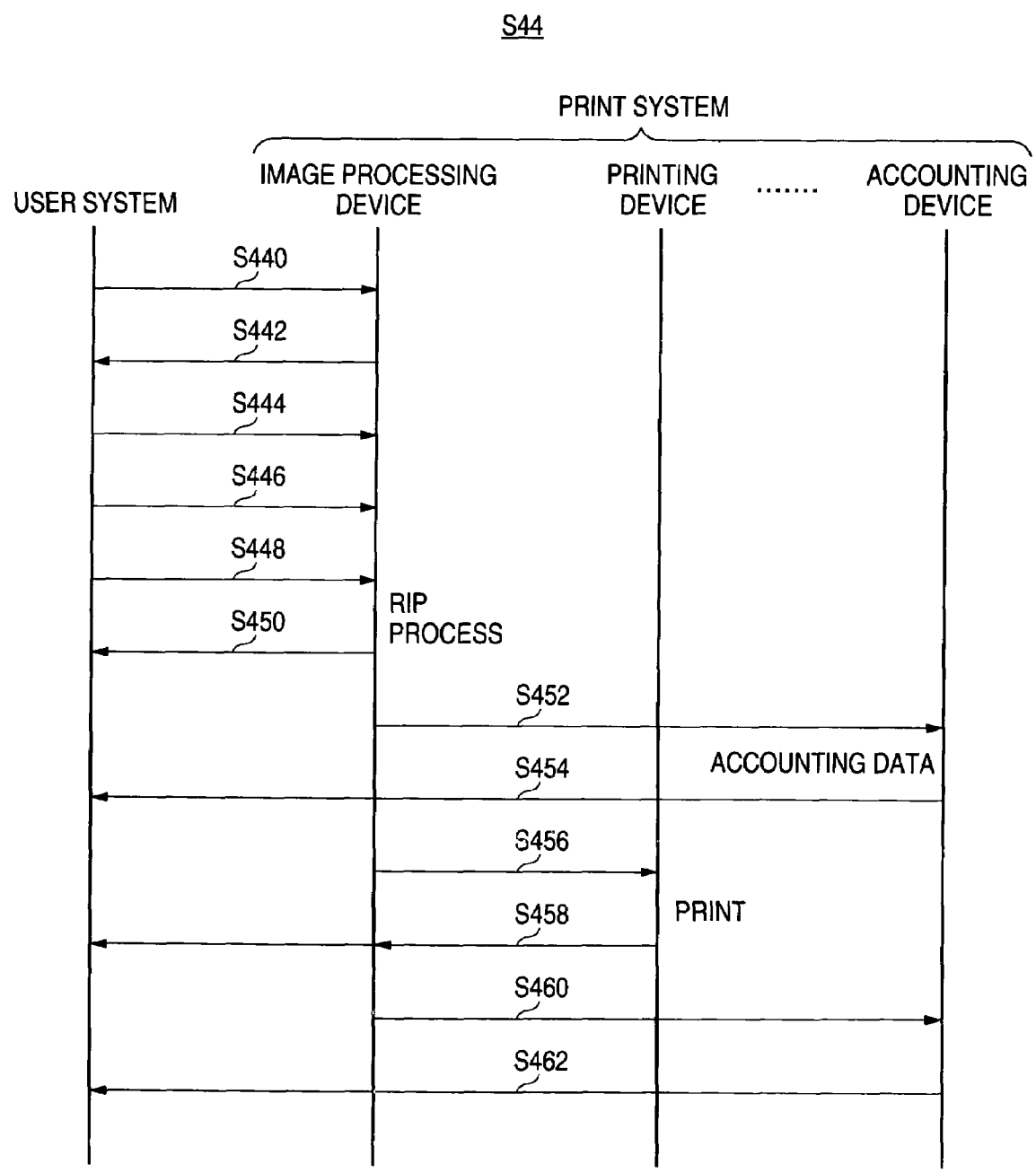
FIG. 28 is a sequence diagram illustrating the ordinary RIP process, print process and accounting process (S44) in the print service system (FIG. 1)

FIG. 28 is a sequence diagram illustrating the ordinary RIP process, print process and accounting process (S44) in the print service system 1.

At Step 440 (S440), as shown in FIG. 28, the PC 48 (FIG. 4) or the like of the user system 4 outputs a RIP/Print request to the image processing device 32 (FIG. 2) of the print system 3, and requests the RIP process and the print of the image data obtained by the RIP process.

At Step 442 (S442), the authentication process section 630 of the image processing program 6 to act over the image processing device 32 sends an authentication request to the PC 48 of the user system 4.

At Step 444 (S444), the PC 48 of the user system 4 returns the authentication response containing the identification ID and its password, and the authentication process section 630 checks the correctness of the ID and the password thereby to authenticate the user system 4.

Here, the authentication processes shown at S442 and S444 may be executed either at every RIP process/print process or periodically, e.g., once at the beginning of a month.

In the latter case of the periodic authentication processing, the processes S442 and S444, as shown in FIG. 28, are omitted excepting those periodic authentication processes.

At Step 446 (S446), the PC 48 of the user system 4 outputs the drawing data or the image data, which are described in a predetermined image describing language, to the image processing device 32.

The communication control section 626 (FIG. 18) of the image processing device 32 receives those drawing data.

At Step 448 (S448), the PC 48 of the user system 4 outputs the print option (FIG. 23) to the image processing device 32.

The communication control section 626 receives this print option.

In response to these data, the communication control section 626 controls the RIP process section 614 and subjects the drawing data received at the process of S446 to the RIP process according to the print option received at the process of S448.

At Step 450 (S450), after the RIP process, the communication control section 626 (FIG. 18) of the image processing device 32 sends the RIP data (FIG. 24) shown in FIG. 24 to the PC 48 of the user system 4.

At Step 452 (S452), the communication control section 626 (FIG. 18) of the image processing device 32 outputs the accounting data including the RIP data (FIG. 24) to the accounting device 30.

In response to these accounting data, the sequence/accounting control portion 700 (FIG. 26) of the accounting device 30 controls the RIP accounting section 722 to calculate the sum of the charge for the RIP process.

At Step 454 (S454), the accounting process section 702 charges the sum calculated at the process of S452 against the PC 48 of the user system 4.

Here in the foregoing processes, in case the profile data are provided for the user system 4 by the print control system 2 or the print system 3, the accounting processes may be done for not only the RIP process but also the provision of the profile data.

At Step 456 (S456), the communication control section 626 of the image processing device 32 outputs the image data obtained by the RIP process and the print option received at the process of S448 to the printing device 36, and requests the printing device 36 for the print process of the image data.

In response to these image data and print option, the printing device 36 prints the image data in accordance with the request of the image processing device 32.

At Step 458 (S458), when the print process of the image data received at the process of S456 is normally ended, the printing device 36 informs the image processing device 32 of the print success, and the image processing device 32 outputs the RIP data (FIG. 24) to the PC 48 of the user system 4 thereby to inform the print success.

At Step 460 (S460), the communication control section 626 (FIG. 18) of the image processing device 32 outputs the accounting data including the print data (FIG. 25) to the accounting device 30.

In response to these accounting data, the sequence/accounting control section 700 (FIG. 26) of the accounting device 30 controls the print accounting section 724 to calculate the sum of charge for the print process.

At Step 462 (S462), the accounting device 30 charges the user system 4 for the sum calculated at the print accounting section 724.

[Decentralized RIP/Print/Accounting]

Next in the print service system 1, here will be described the process of the cases, in which the image processing device 32 (FIG. 2) is requested for the RIP process and the print process by the first user system 4 (e.g., the "user system #1" in FIG. 4 and FIG. 29 to FIG. 32), in which the decentralized RIP process is executed by the image processing device 32, in which these processes are executed by the printing device 36 and in which these processes are charged by the accounting device 30.

Figure 29:
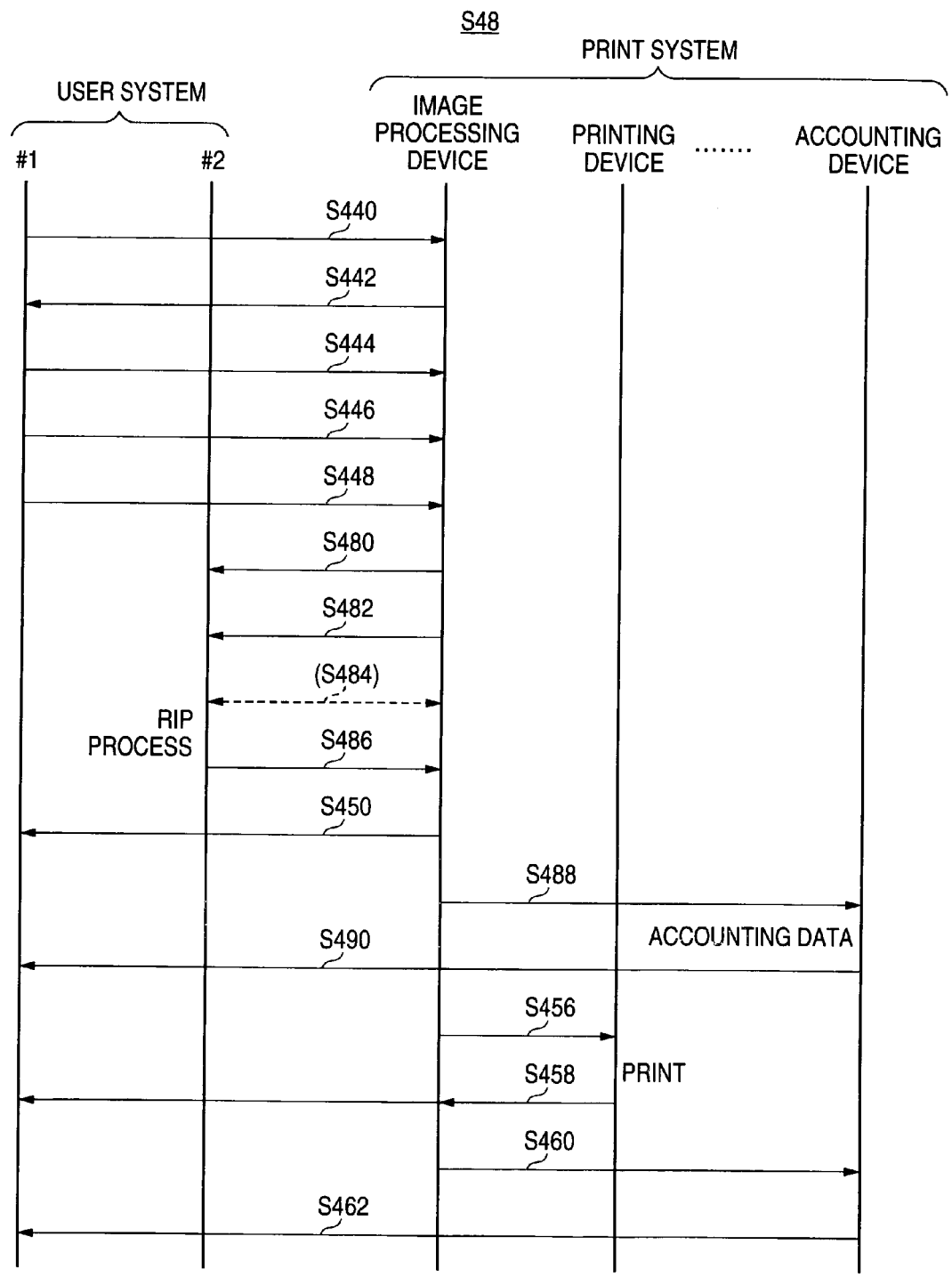
FIG. 29 is a sequence diagram illustrating the decentralized RIP process, the print process and the accounting process (S48) in the print service system (FIG. 1)

FIG. 29 is a sequence diagram illustrating the decentralized RIP process, the print process and the accounting process (S48) in the print service system 1.

Of the individual processes shown in FIG. 29, those substantially identical to the individual processes shown in FIG. 28 are designated by the common reference numerals.

At Steps 440 (S440) to 448 (S448), as shown in FIG. 29, the requests of the RIP process and the print process, the authentication processing, the drawing data and the print option are output with the PC 48 of the first user system 4.

At Step 480 (S480), for example, when the first user system 4 having requested the process authorizes the decentralized RIP process in the registration data (FIG. 22) so that the image processing device 32 requested for the process is in an overload state or so that the process time designated by the print option is not sufficient, the communication control section 626 (FIG. 18) of the image processing device 32 transfers the RIP process requested at the process of S440, to the second user system 4 (e.g., the "user system #2" in FIG. 29 to FIG. 32) making the image processing device 42 public in the registration data, thereby to execute the decentralized RIP process.

At S482 (S482), the communication control section 626 of the image processing device 32 transfers the print option received at the process of S448 to the second user system 4.

At Step 484 (S484), an authentication processing is done, if necessary, between the image processing device 32 and the image processing device 42 of the second user system 4.

At Step 486 (S486), the image processing device 42 of the second user system 4 returns the RIP processed image data to the image processing device 32.

At Step 488 (S488), the image processing device 32 outputs the accounting data containing the RIP data shown in FIG. 24 for the decentralized RIP, to the accounting device 30.

In response to the accounting data, the sequence/accounting control section 700 (FIG. 26) of the accounting device 30 controls the decentralized RIP accounting section 720 thereby to calculate the sum of charge for the decentralized RIP process.

At Step 490 (S490), the accounting process section 702 charges the first user system 4 for the sum calculated by the decentralized RIP accounting section 720.

Here in the aforementioned processing, in case the profile data are provided for the user system 4 from the print control system 2 or the print system 3, the charge may be made for the RIP process and for the provision of the profile data.

At Steps 456 (S456) to 462 (S462), the print process and the accounting process for the print are done.

Here in the decentralized RIP process, the print system 3 not only can request the user system 4 for the decentralized RIP process but also can request another print system 3 for the decentralized RIP process.

[Decentralized RIP/Print/Extra Account]

Next in the print service system 1, here will be described the process of the cases, in which the image processing device 32 (FIG. 2) is requested for the RIP process and the print process from the first user system 4 (FIG. 4), in which the decentralized RIP process is executed by the image processing device 32, in which these processes are executed by the printing device 36 and in which the extra account is done for the RIP process.

This extra account covers the increase in the process quantity accompanying the decentralized RIP process, the increase in the traffic of the network 10, and the cost to be paid to the second user system 4 having accepted the RIP process.

Figure 30:
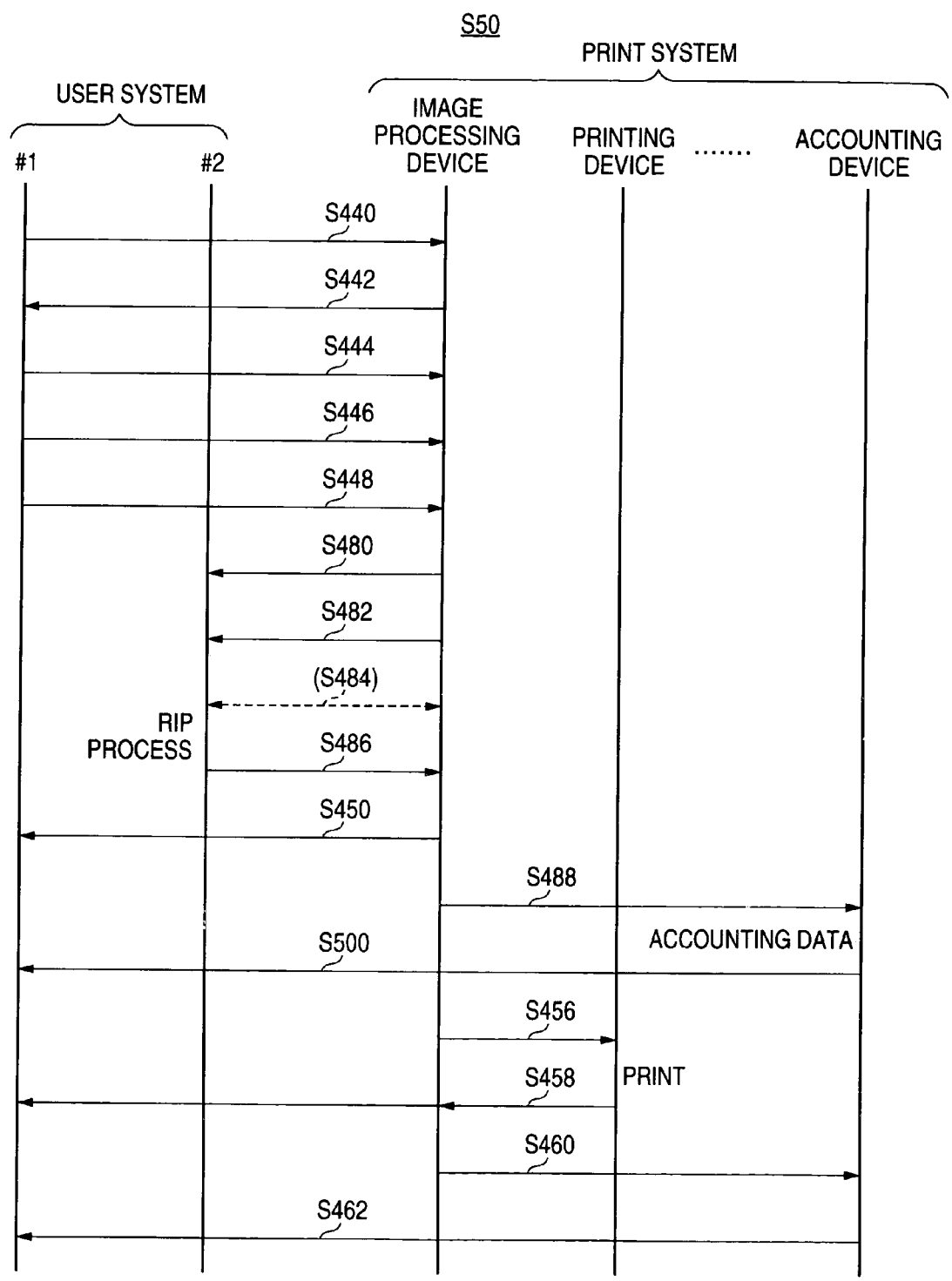
FIG. 30 is a sequence diagram illustrating the decentralized RIP process, the print process and the extra accounting process (S50) in the print service system (FIG. 1)

FIG. 30 is a sequence diagram illustrating the decentralized RIP process, the print process and the extra accounting process (S50) in the print service system 1.

Of the individual processes shown in FIG. 30, those substantially identical to the individual processes shown in FIG. 28 and FIG. 29 are designated by the common reference numerals.

At Steps 440 (S440) to 488 (S488), as shown in FIG. 30, the RIP process and the request for the print process to the output of the accounting data on the decentralized RIP process are done between the image processing device 32 and the PC 48 of the first user system 4.

At Step 500 (S500), the decentralized RIP accounting section 720 of the accounting device 30 calculates the sum, which is the addition of the sum of charge for the ordinary RIP process and the cost for the decentralized RIP process.

The accounting process section 702 charges the sum calculated by the decentralized RIP accounting section 720, against the first user system 4 having requested the process.

Here in the aforementioned processes, in case the profile data are provided for the user system 4 from the print control system 2 or the print system 3, the charge may be done for the RIP process and for the provision of the profile data.

At Steps 458 (S458) to 462 (S462), there are done the print process of the image data obtained by the decentralized RIP process, and the accounting process for the print process.

[Decentralized RIP/Print/Discount]

Next in the print service system 1, here will be described the process of the cases, in which the RIP process and the print process are requested for the image processing device 32 (FIG. 2) by the second user system 4 having received the decentralized RIP process of the first user system 4 (FIG. 4) from the image processing device 32 (FIG. 2), in the decentralized RIP process is executed by the image processing device 32, in which these processes are executed by the printing device 36 and in which the discount is made for the RIP process by the accounting device 30.

This discount covers the cost for processing the second user system 4 having received the RIP process.

Figure 31:
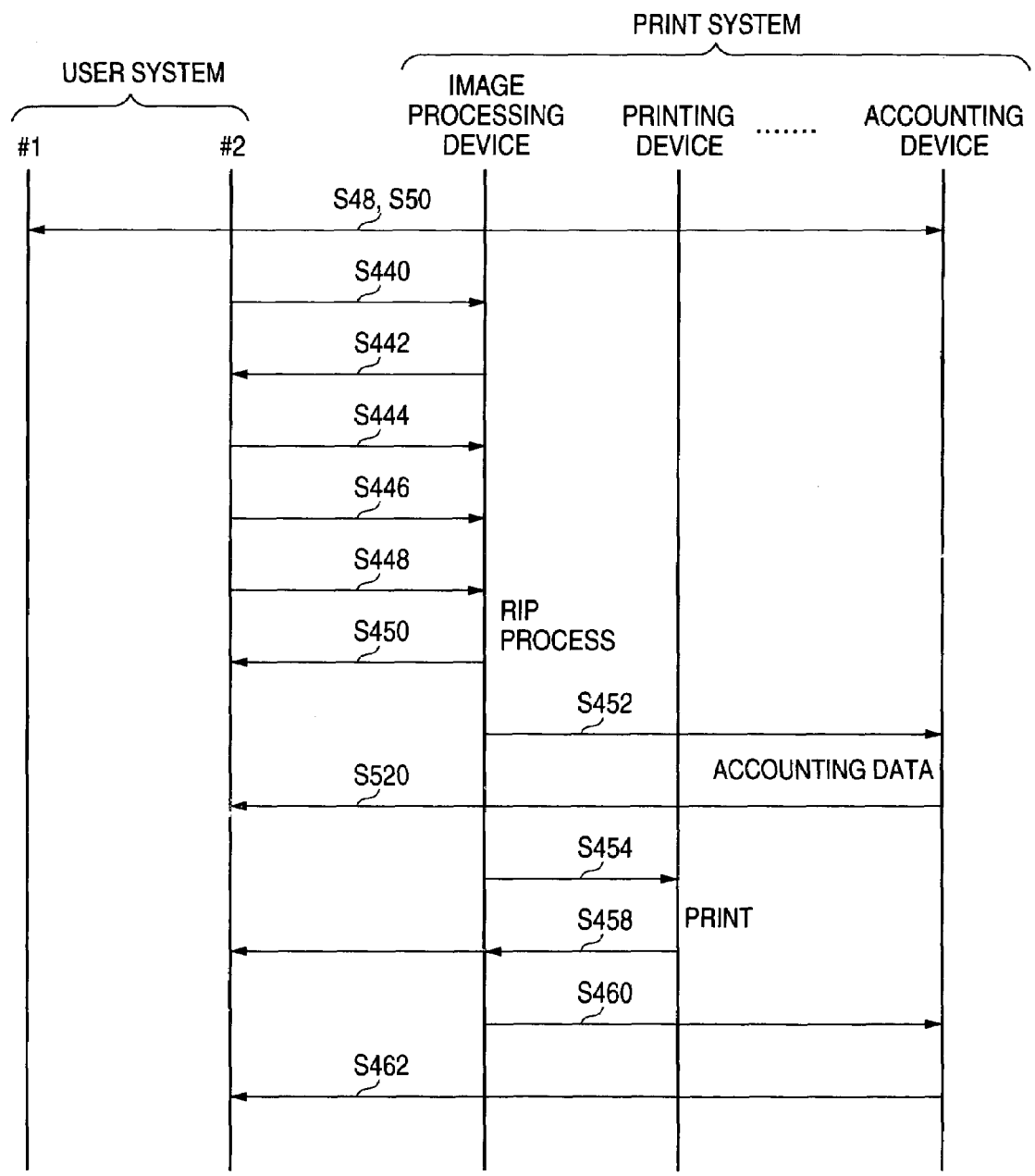
FIG. 31 is a sequence diagram illustrating the decentralized RIP process, the print process and the discount processing (S52) in the print service system.

FIG. 31 is a sequence diagram illustrating the decentralized RIP process, the print process and the discount processing (S52) in the print service system 1.

Of the individual processes shown in FIG. 31, those substantially identical to the individual processes shown in FIG. 28 to FIG. 30 are designated by the common reference numerals.

As shown in FIG. 31, the decentralized RIP processes shown in FIG. 28 and FIG. 29 is executed at first, and the second user system 4 executes the RIP process of the first user system 4.

At Step 440 (S440) to 450 (S450), the processes from the RIP process and the request of the print process to the output of the RIP data are done between the image processing device 32 and the PC 48 of the second user system 4 (e.g., the user system #2).

At Step 452 (S452), the image processing device 32 outputs the accounting data containing the RIP data (FIG. 24) to the accounting device 30.

At Step 520 (S520), the decentralized RIP accounting section 720 of the accounting device 30 calculates the sum by subtracting the cost for another decentralized RIP process from the account sum for the ordinary RIP process.

The accounting process section 702 charges the sum calculated by the decentralized RIP accounting section 720 against the first user system 4 having requested the process.

Here in the foregoing processes, in case the profile data are provided for the user system 4 from the print control system 2 or the print system 3, not only the RIP process but also the provision of the profile data may be charged.

At Step 458 (S458) to 462 (S462), there are done the print process of the image data obtained by the decentralized RIP process and the accounting process for the print process.

[RIP Containing JOBs/Print/Discount]

Next in the print service system 1, here will be described the process of the cases, in which the image processing device 32 (FIG. 2) is requested for the RIP process and the print process including a plurality of JOBs (JOB1 and JOB2), in which the decentralized RIP process is executed by the image processing device 32, in which these processes are executed by the printing device 36, and in which each JOB contained in the RIP process is accounted by the accounting device 30.

Figure 32:
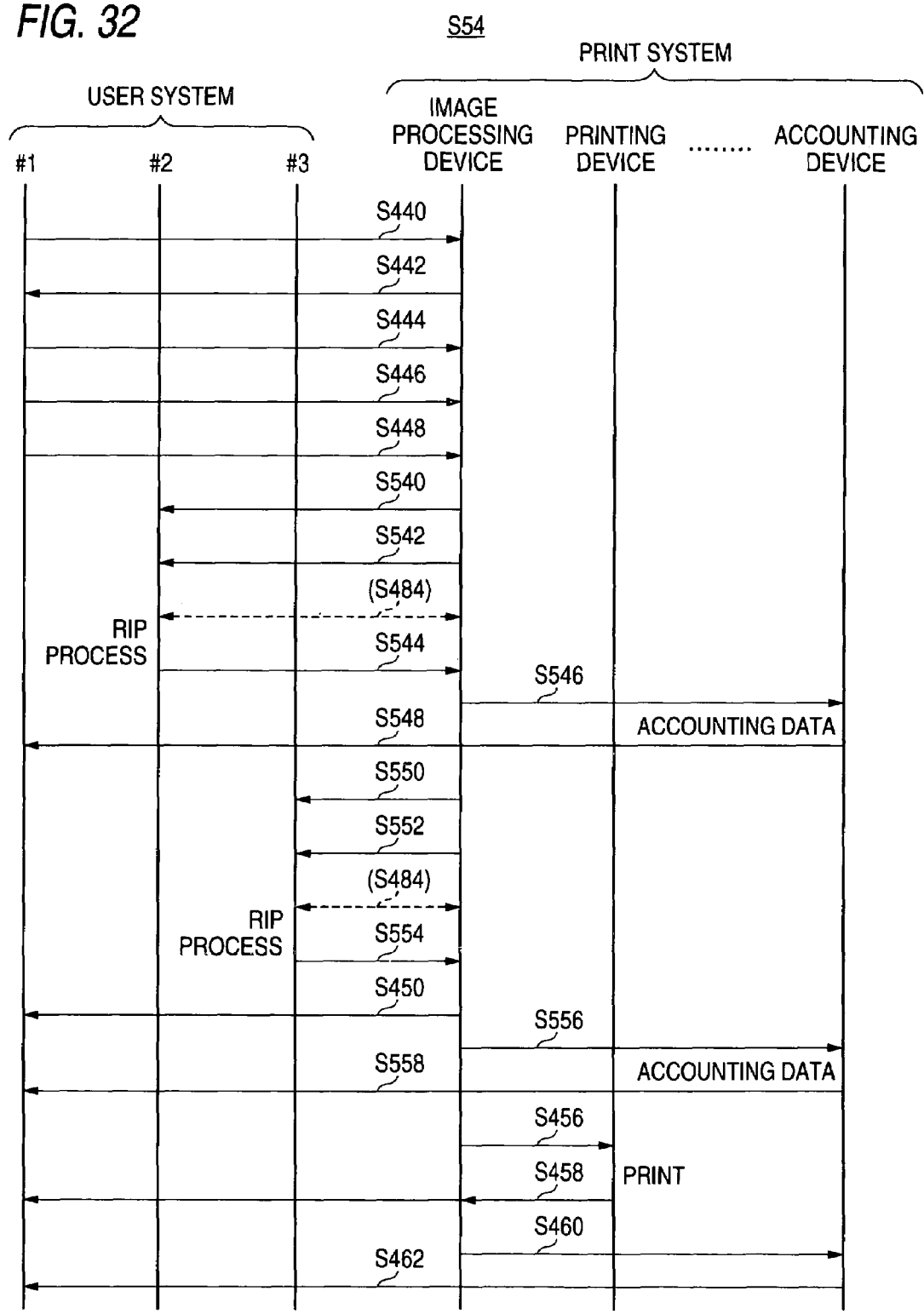
FIG. 32 is a sequence diagram illustrating the RIP process and the print process including a plurality of JOBs and the accounting process (S54) of each JOB in the print service system (FIG. 1)

FIG. 32 is a sequence diagram illustrating the RIP process and the print process including a plurality of JOBs and the accounting process (S54) of each JOB in the print service system 1.

Of the individual processes shown in FIG. 32, those substantially identical to the individual processes shown in FIG. 28 to FIG. 31 are designated by the common reference numerals.

At Steps 440 (S440) to 448 (S448), as shown in FIG. 32, the processes from the RIP process and the request of the print process to the print option output are done between the image processing device 32 and the PC 48 of the first user system 4 (e.g., the user system #1).

At Steps 540 and 542 (S540 and S542), the communication control section 626 (FIG. 18) of the image processing device 32 requests the second user system 4 for the first JOB (JOB1) of the RIP process, and outputs the print option.

At Step 464 (S464), the authentication is made between the second user system 4 and the image processing device 32.

At Step 544 (S544), the second user system 4 executes the requested JOB1, and outputs the image data obtained as the result of the JOB1 to the image processing device 32.

At Step 546 (S546), the image processing device 32 outputs the accounting data containing the RIP data on the JOB1, to the accounting device 30.

At Step 548 (S548), the sequence/accounting control section 700 (FIG. 26) of the accounting device 30 calculates the charge sum of the accounting data on the JOB1 from the image processing device 32, and the accounting process section 702 charges the sum calculated by the sequence/accounting control section 700 against the first user system 4.

Here in the foregoing processes, in case the profile data are provided for the user system 4 from the print control system 2 or the print system 3, there may be done not only the charge for the RIP process but also the accounting process for the provision of the profile data.

At Steps 550 and 552 (S550 and S552), the communication control section 626 (FIG. 18) of the image processing device 32 requests the third user system 4 (e.g., the "user system #3" in FIG. 32) for the second JOB (JOB2) of the RIP process, and outputs the print option.

At Step 464 (S464), the authentication is made between the third user system 4 and the image processing device 32.

At Step 554 (S554), the third user system 4 executes the JOB2 requested, and outputs the image data obtained as a result of the JOB2, i.e., the image data obtained as a result of the RIP process to the image processing device 32.

At Step 450 (S450), the image processing device 32 outputs the RIP data to the first user system 4.

At Step 556 (S556), the image processing device 32 outputs the accounting data containing the RIP data on the JOB2 to the accounting device 30.

Here in the foregoing processes, in case the profile data are provided for the user system 4 from the print control system 2 or the print system 3, there may be done the charge for the RIP process and the charge for the provision of the profile data.

At Step 558 (S558), the sequence/accounting control section 700 (FIG. 26) calculates the sum of charge for the accounting data on the JOB2 from the image processing device 32, and charges the sum calculated by the sequence/accounting control section 700, against the first user system 4.

At Steps 456 (S456) to 462 (S462), the accounting processes are done for the information processing of the print process success to the print process.

Here, in order to account each JOB, the decentralized RIP accounting section 720, the RIP accounting section 722 and the print accounting section 724 of the accounting program 70 (FIG. 26) stores the accounting information of each JOB of the format shown in FIG. 33, in the RIP accounting DB 742 and the print accounting DB 744.

FIG. 33 is a diagram illustrating the form of the accounting information to be stored in the RIP accounting DB 742 and the print accounting DB 744 shown in FIG. 26.

The RIP accounting section 722 and the decentralized RIP accounting section 720 store the accounting information of the items on the ordinary RIP process and the decentralized RIP process of the accounting information shown in FIG. 33, in the RIP accounting DB 742.

On the other hand, the print accounting section 724 stores the accounting information of the items of the print process of the accounting information shown in FIG. 33, in the RIP accounting DB 742.

The accounting calculation section 72 may thus manage the accounting information either by using the DB provided according to the kind of accounting or by using the DB for storing the accounting information for each user system 4.

Fourth Embodiment

The foregoing individual embodiments have been described on the case, in which the accounting device 30 of the print system 3 charges the processes executed by the image processing device 32 and so on of the print system 3 in accordance with the request of the user system 4, against the user system 4 having requested the processes.

In the fourth embodiment, the use of the TP data or the like by the user system 4 is charged, either as has already been described by the dotted lines in the individual sequence diagrams, or as has been described in the individual sequence diagrams to charge the profile data when the charge is made for the processes.

Here, in order to specify and clarify the description, in the specific example, the accounting process for the profile data is not executed in the print system 3 merely by retrieving the profile data but is executed when the profile data are used.

Figure 34:
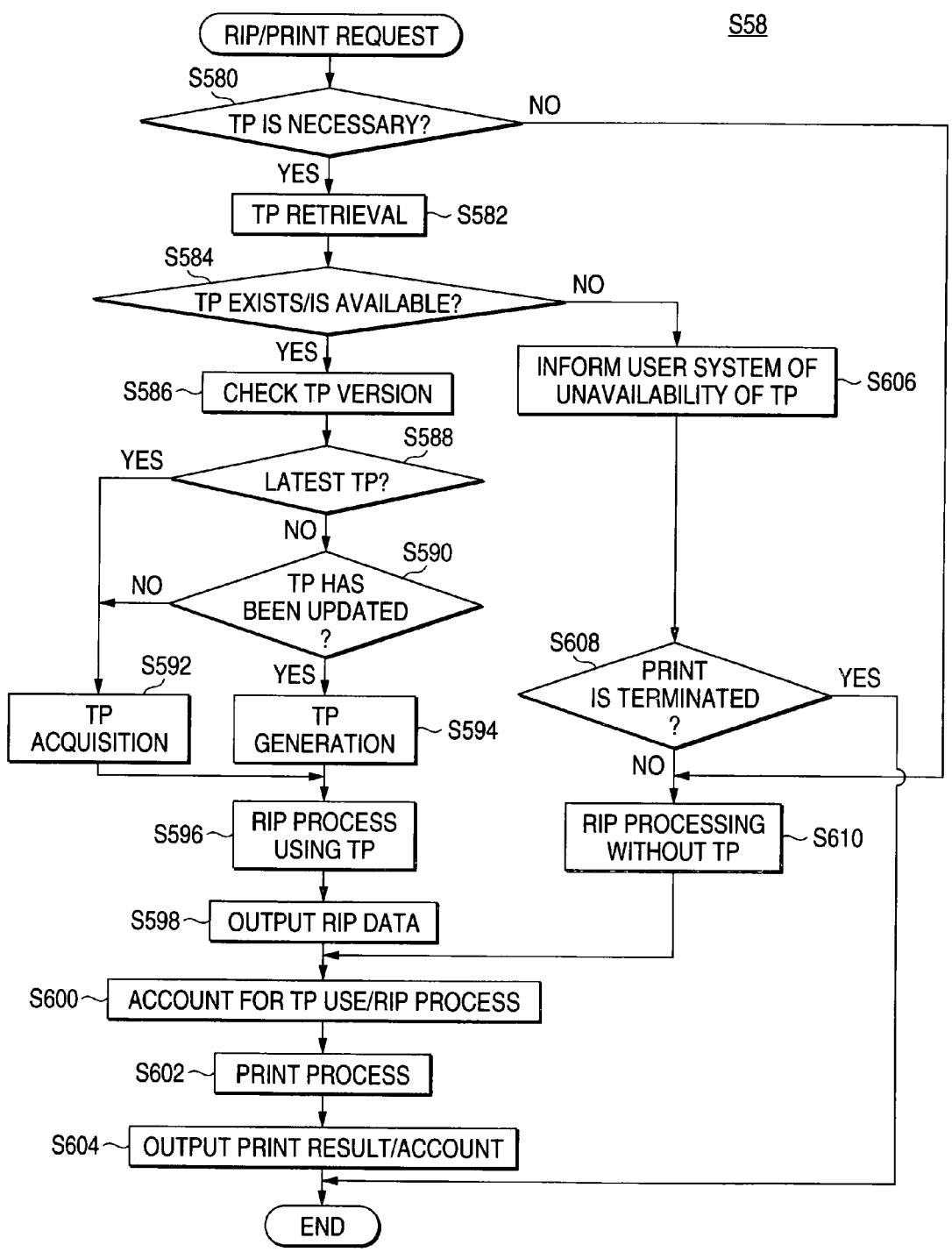
FIG. 34 is a flow chart showing an accounting process (S58) for the use of the TP data.

FIG. 34 is a flow chart showing an accounting process (S58) for the use of the TP data.

As shown in FIG. 34, the PC 48 (FIG. 4) or the like of the user system 4 requests the image processing device 32 (FIG. 2) of the print system 3 for the RIP process and the print process using the TP profile.

At Step 580 (S580), the RIP process section 614 of the image processing program 6 (FIG. 18) to operate over the image processing device 32 analyzes the print option sent at the request for the RIP/print process, and judges whether or not the TP data are needed for the RIP process requested.

At Step 582 (S582), the RIP process section 614 retrieves the TP-DB 600.

At Step 584 (S584), the RIP process section 614 judges whether or not the TP data to be used for the RIP process exist in TP-DB 600.

In the presence of the TP data to be used for the RIP process, on the other hand, the availability decision section 612 judges whether or not the TP data are available.

The image processing program 6 advances to the process of S586, in case the TP data are found by the retrieval and can be used, but to the process to S606 in other cases.

At Step 586 (S586), the availability decision section 612 checks the version of the TP data found by the retrieval of S584, and judges whether or not the TP data are the latest.

At Step 588 (S588), the image processing program 6 advances to the process of S592, in case the TP data are the latest, but to the process of S590 in other cases.

At Step 590 (S590), the availability decision section 612 judges whether or not a reason for updating the TP data after the found TP data were generated.

The image processing program 6 advances to the process of S594, when the TP data are to be updated, but to the process of S592 in other cases.

At Step 592 (S592), the DLP acquisition section 624 acquires the TP data stored in the TP-DB 600.

At Step 594 (S594), the TP acquisition section 620 acquires the latest TP data generated by the calorimeter device 34.

Alternatively, the TP acquisition section 620 processes the colorimetric result to the print output of the printing device 36 by the calorimeter device 34 thereby to generate the latest TP data.

Alternatively, the TP acquisition section 620 requests the calorimeter device 34 to generate the TP data so that the colorimeter device 34 generates the TP data in accordance with the request.

At Step 596 (S596), the RIP process section 614 (FIG. 18) performs the RIP process with the TP data thereby to generate the image data matching the printing device 36 (FIG. 2).

At Step 598 (S598), the RIP process section 614 outputs the RIP data (FIG. 24) to the user system 4, and outputs the accounting data containing the RIP data to the accounting device 30.

At Step 600 (S600), the decentralized RIP accounting section 720 or the RIP accounting section 722 of the accounting program 70 accounts for the RIP process and the use of the TP data.

At Step 602 (S602), the communication control section 626 (FIG. 18) outputs the RIP processed image data and print option to the printing device 36 (FIG. 2), and causes the print process.

At Step 604 (S604), the communication control section 626 outputs, when the print result is informed from the printing device 36, the print result to the user system 4, and the accounting device 30 performs the accounting process for the print process.

At Step 606 (S606), the communication control section 626 (FIG. 18) informs the PC 48 (FIG. 4) or the like of the user system 4 that the TP data necessary for the RIP process are unavailable.

At Step 608 (S608), the information by the process of S606 is displayed in the GUI image on the display/input device 106 of the PC 48 of the user system 4, and the user operates to continue or terminate the print in that GUI image.

The image processing program 6 ends the process, when the user of the user system 4 selects the print termination, but advances to the process of S610 in other cases.

The RIP process section 614 performs the RIP process without the TP data, but advances to the process of S600.

[Operations of Print Service System 1]

A specific example of an operation of the print service system 1 will be described below.

[TP Generation/Registration]

At first, a process of the print system 3 (FIG. 2) will be described, in which the colorimeter device 34 generates the TP data from the calorimetric result of the printing device 36, and registers the generated TP data in the image processing device 32.

Here, the specific example is made such that the print system 3 includes n (n≧1) printing devices 36-1 to 36-n.

Figure 35:
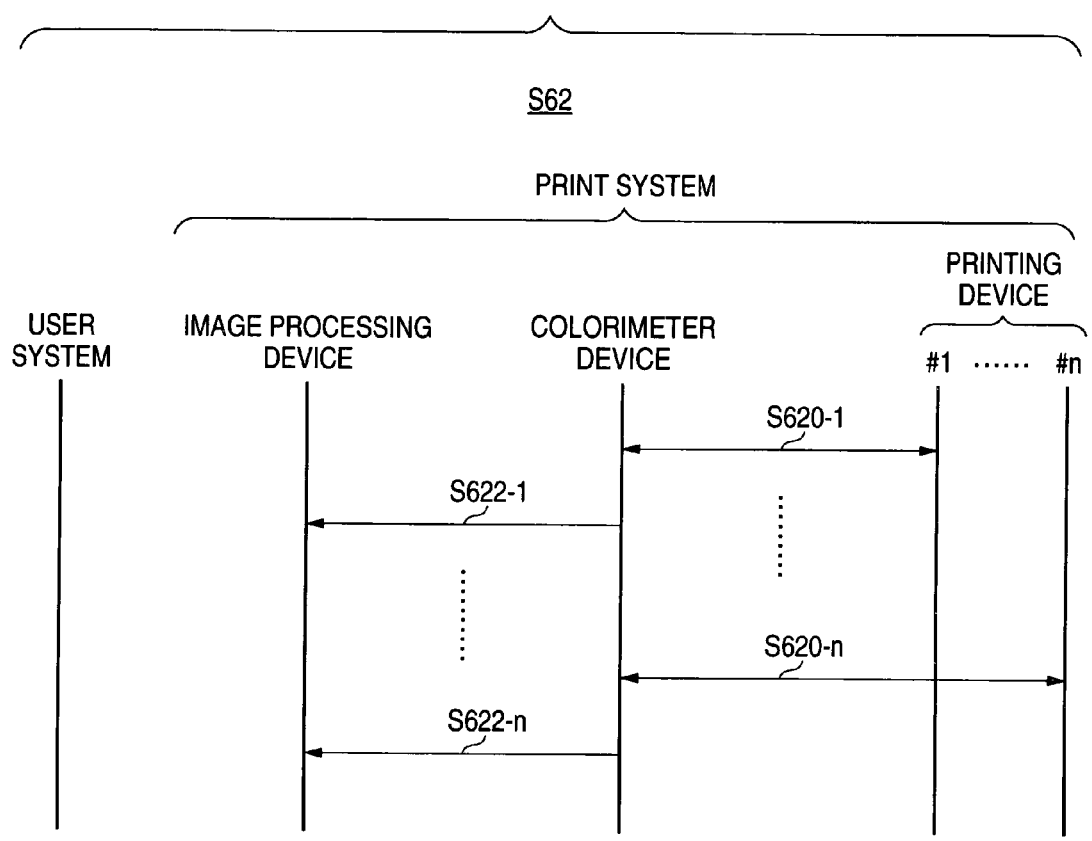
FIG. 35 is a diagram showing the calorimeter processing by the colorimeter device (FIG. 2) of the print system and the generation and registration processing (S62) of the TP data.

FIG. 35 is a diagram showing the colorimeter processing by the calorimeter device 34 (FIG. 2) of the print system 3 and the generation and registration processing (S62) of the TP data.

As shown in FIG. 35, the colorimeter device 34 colorimeters the color print outputs of the individual printing devices 36-1 to 36-n sequentially, thereby to generate the TP data (S620-1 to S620-n).

In response to a request, the colorimeter device 34 outputs the generated TP data of the individual printing devices 36-1 to 36-n sequentially to the TP acquisition section 620 (FIG. 18).

The TP acquisition section 620 acquires the TP data from the calorimeter device 34, and registers them sequentially in the TP-DB 600 (S622-1 to S622-n).

[TP Use/RIP/Print]

The following description will be made on the RIP process and the print process using the latest TP data and the accounting process for the RIP and print processes, in case the latest TP data exist in the TP-DB 600 of the image processing program.

Figure 36:
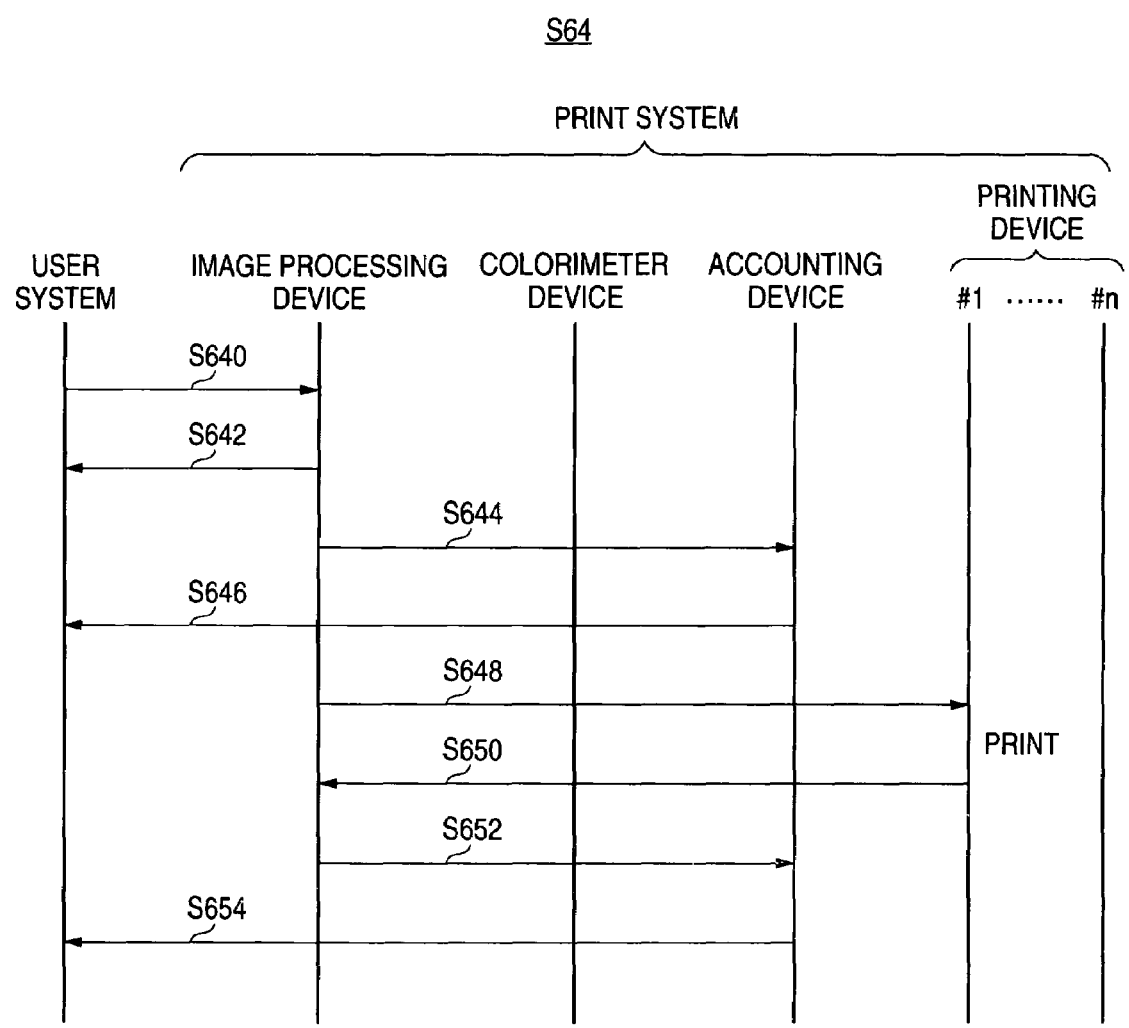
FIG. 36 is a sequence diagram showing the RIP/print process (S64) when the latest TP data exist in the image processing device (FIG. 3)

FIG. 36 is a sequence diagram showing the RIP/print process (S64) when the latest TP data exist in the image processing device 32 (FIG. 3).

At Step 640 (S640), as shown in FIG. 36, the user system 4 outputs the requests for the RIP process and the print process including the print option (FIG. 23) to the image processing device 32.

At Step 642 (S642), the RIP process section 614 of the image processing program 6 to operate over the image processing device 32 acquires the TP data from the TP-DB 600, and the availability decision section 612 decides that the acquired TP data can be used.

The RIP process section 614 performs the RIP process with the TP data, which are decided to be usable.

The communication control section 626 outputs the RIP data (FIG. 24) to the user system 4 when the RIP process is ended.

At Step 644 (S644), the communication control section 626 outputs the accounting data including the information indicating the use of the RIP data (FIG. 24) and the TP data, to the accounting device 30.

At Steps 644 and 646 (S644 and S646), the accounting program 70 (FIG. 26) to operate over the accounting device 30 uses the TP data for the user system 4 and accounts the RIP process, on the basis of the accounting data from the image processing device 32.

At Step 648 (S648), the communication control section 626 outputs the image data and the print option (FIG. 23) obtained by the RIP process, to the printing device 36.

At Step 650 (S650), when the print succeeds, the printing device 36 informs the image processing device 32 of the print success.

At Steps 652 and 654 (S652 and S654), the image processing device 32 outputs the accounting data including the print data (FIG. 25) to the accounting device 30, and this accounting device 30 accounts the print process for the user system 4 by using the accounting data.

[TP Use/RIP/Print]

Here will be described the RIP process and the print process in case the TP data are generated in the image processing device 32.

Figure 37:
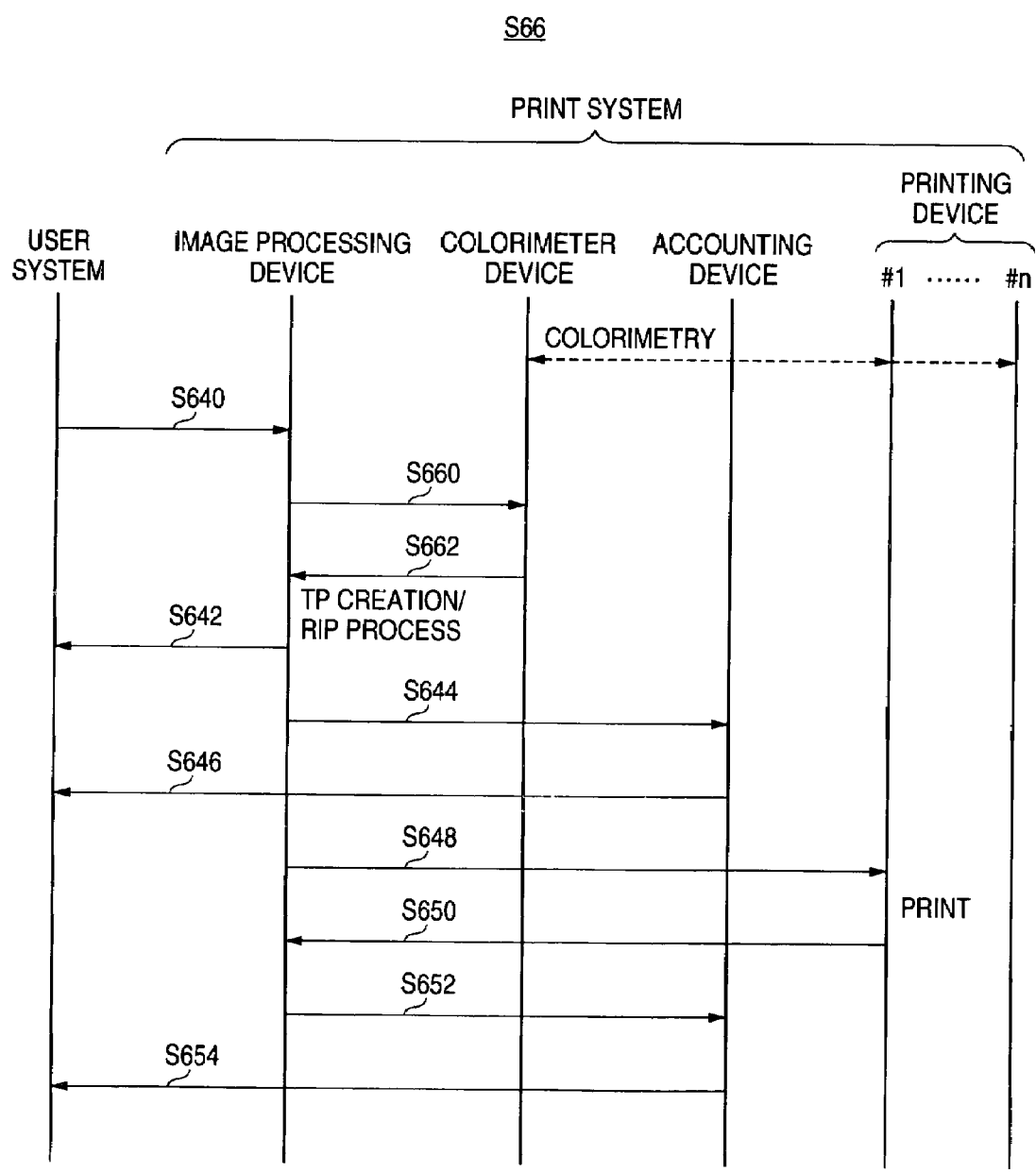
FIG. 37 is a sequence diagram showing the RIP/print process (S66) when the latest TP data do not exist in the image processing device (FIG. 3)

FIG. 37 is a sequence diagram showing the RIP/print process (S66) when the latest TP data do not exist in the image processing device 32 (FIG. 3).

Of the individual processes shown in FIG. 37, those substantially identical to the individual processes shown in FIG. 36 are designated by the common reference numerals.

First of all, the colorimeter device 34 calorimeters the color print results of the individual printing devices 36-1 to 36-n in advance, as indicated by dotted lines in the Figure.

At Step 340 (S340), as shown in FIG. 37, the request for the RIP process and the print process including the print option (FIG. 23) are output from the user system 4 to the image processing device 32.

At Steps 660 and 662 (S660 and S662), in case the RIP process section 614 of the image processing program 6 (FIG. 18) to operate over the image processing device 32 retrieves the TP-DB 600 and finds the TP data to be used for the requested RIP process but in case the fount TP data are not the latest, the communication control section 626 requests the colorimeter device 34 for the calorimetric result of the printing device 36.

In response to this request, the colorimeter device 34 returns the colorimetric result of the printing device 36 to the image processing device 32.

At Step 642 (S642), the TP acquisition section 620 generates the TP data from the calorimetric result from the colorimeter device 34, and the RIP process section 614 performs the RIP process with the generated TP data.

At Steps 644 (S644) to 654 (S654), the use of the TP data and the RIP process are accounted, and the print process and the print process are accounted.

In this case, the image processing device 32 may increase the charge for the TP data use against the user system 4 as the charge for acquiring the color characteristics and the generation of the TP data from the calorimeter device 34.

[RIP without TP/Print]

The RIP process and the print process without using the TP data will be described in connection with the image processing device 32.

Figure 38:
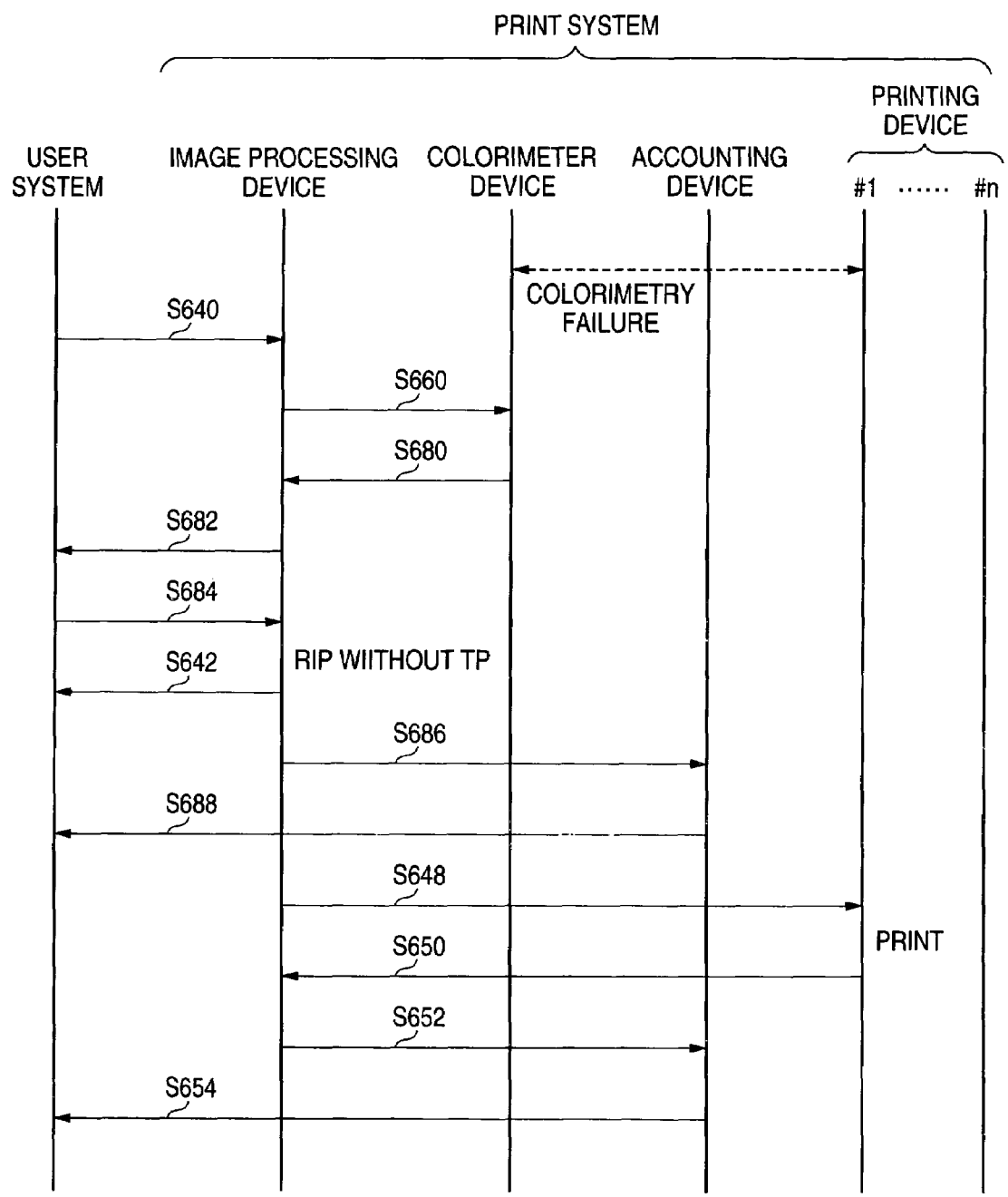
FIG. 38 is a sequence diagram showing the RIP/print process (S68) at the time when the TP data are not present in the image processing device (FIG. 3) and cannot be generated.

FIG. 38 is a sequence diagram showing the RIP/print process (S68) at the time when the TP data are not present in the image processing device 32 (FIG. 3) and cannot be generated.

Of the individual processes shown in FIG. 38, those substantially identical to the individual processes shown in FIG. 36 and FIG. 37 are designated by the common reference numerals.

As indicated by dotted lines, the colorimeter device 34 tried the colorimetry of the color print results of the individual printing devices 36-1 to 36-n in advance, but the colorimetry of the printing device 36-1 failed due to some cause such as a trouble of the LAN 12.

At Step 340 (S340), as shown in FIG. 38, the requests of the RIP process and the print process, as including the print option (FIG. 23), are output from the user system 4 to the image processing device 32.

At Step 660 (S660), the RIP process section 614 of the image processing program 6 (FIG. 18) to operate over the image processing device 32 retrieved the TP-DB 600 and found the TP data to be used for the requested RIP process. In case the found TP data were not the latest, however, the communication control section 626 requests the colorimeter device 34 for the colorimetric result of the printing device 36.

At Step 680 (S680), in response to this request, the colorimeter device 34 returns it to the image processing device 32 that the aforementioned colorimetry of the printing device 36 failed with no colorimetry result.

At Step 682 (S682), the communication control section 626 displays it in the display/input device 106 (FIG. 5) of the PC 48 that the TP is not for the PC 48 of the user system 4, and urges the user of the PC 48 to input for stopping or continuing the print.

At Steps 684 and 686 (S684 and S686), the accounting program 70 (FIG. 26) to operate over the accounting device 30 accounts the user system 4 for the RIP process on the basis of the accounting date from the image processing device 32.

At Step 684 (S684), when the PC 48 of the user system 4 repeats the print continuation, the RIP process section 614 performs the RIP process without the TP data.

In other words, in this case, the RIP process section 614 subjects the drawing data (FIG. 9 and so on) input from the user system 4, to the RIP process other than the color correction processing using the TP data.

At Step 642 (S642), the RIP data are output from the image processing device 32 to the user system 4.

At Steps 686 and 688 (S686 and S688), the image processing device 32 outputs the accounting data including the RIP data (FIG. 24) to the accounting device 30.

In response to these accounting data, the accounting device 30 charges the RIP process against the user system 4.

Here in this case, the TP data are not used in the RIP process so that the accounting device 30 charges the user system 4 only for the RIP process but not for the TP data.

At Steps 648 (S648) to 654 (S654), the print process and the accounting for the print process are done.

Figure 39:
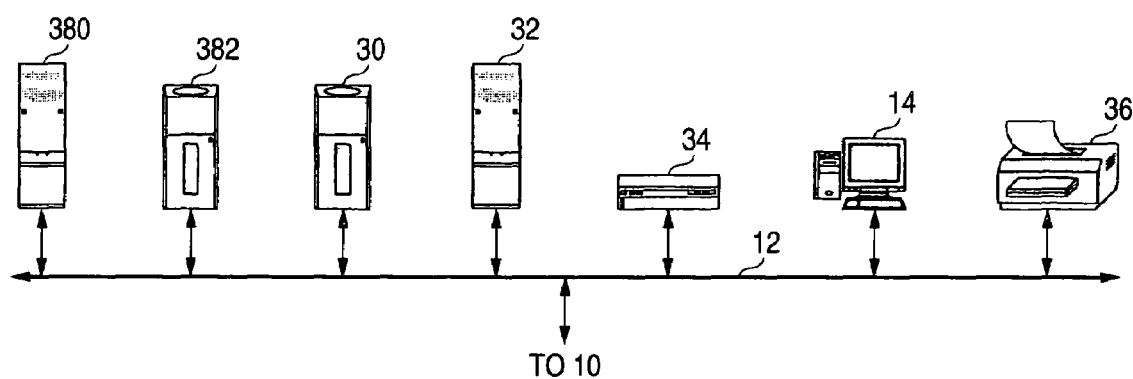
FIG. 39 is a diagram showing a modification of the print system 3 FIG. 2)

FIG. 39 is a diagram showing a modification of the print system 3.

Here, FIG. 4 and FIG. 18 illustrate the case, in which the image processing device 32 includes the various databases. As shown in FIG. 39, however, the print system 3 maybe provided with the profile DB 380 and a profile delivery device 282 for operations similar to those of the profile DB 20 and the profile delivery device 22 of the print control system 2 (FIG. 3), so that the profile data may be stored/managed and delivered.

Fifth Embodiment

The individual embodiments of the invention have been described hereinbefore on the case, in which the user system 4 requests one print system 3 for the RIP process and the print process.

In the fifth embodiment of the invention to be described hereinafter, the image data are delivered from one user system 4 to one or more other user systems 4, or the RIP process and the print process are requested in parallel for a plurality of print systems 3 and are executed.

In the fifth embodiment of the invention, moreover, an arbitrary accounting target is selected by the user system 4, the print system 3, and the print control system 2 so that the selected target is charged.

In the fifth embodiment of the invention, moreover, different sums are charged depending upon whether or not the TP data or the DLP data are added when the image data are delivered from one user system 4 to another user system 4.

From the following individual sequence diagrams, there are suitably omitted the process, which will not exert serious influences on the entire processes such as the output of the RIP data from the print control system 2 to the user system 4, and the information of the process result from the print system 3 to the print control system 2.

From the following individual sequence diagrams and their descriptions, moreover, there are also suitably omitted the exchanges of data between the accounting device 24 and the print control device 26 in the print system 3.

[Data Delivery Processing]

It depends on the approval or disapproval of the accounting whether or not the user system 4 and the print system 3 receive the RIP process and the print process.

If the profile data and the image data were fed before the confirmation of the accounting approval by the user system 4, the business secret information would indiscriminately spread.

Accordingly, the processes shown in FIG. 40 and FIG. 42 to FIG. 44 include the following Steps 1 to 8 basically.

For simple illustrations, however, the processes from Step 1 to the first half (i.e., approval of the estimated sum) of Step 6 are omitted as already executed ones from FIG. 40 and FIG. 42 to FIG. 44.

Step 1:

The request information for the RIP/print (i.e., the print option of FIG. 23 and the RIP data of FIG. 24) is sent from the requester node (or the user system) to the control node (or the print control system 2).

Step 2:

The print control system 2 informs each user system 4/process node (or the print system 3) of the request information and the pay node setting.

Step 3:

On the basis of the request information, each user system 4/print system 3 judges whether or not to accept the process. In case of the acceptance, the estimated RIP/print sum is returned to the print control system 2.

Step 4:

The print control system 2 presents the returned estimated sum to each user system 4 and each print system 3.

Step 5:

Each user system 4 and each print system 3 answers whether or not to approve the estimated sum.

Step 6:

The answer of approval to the estimated sum clarifies it at this stage that the request for this task is accepted. Therefore, the image data and the profile (if necessary) are sent to each user system 4 and each print system 3 thereby to request the task.

Step 7:

The result (or success) on the RIP/print is returned from each user system 4 and each print system 3 to the print control system 2.

Step 8:

On the basis of the result (or success), the print control system 2 accounts each user system 4 and each print system 3.

First of all, here will be described the process to deliver the image data in the print service system 1 (FIG. 1) from the first user system 4 (e.g., the user system #1) to one or more other user systems 4 (e.g., the user systems #2 to #n).

Figure 40:
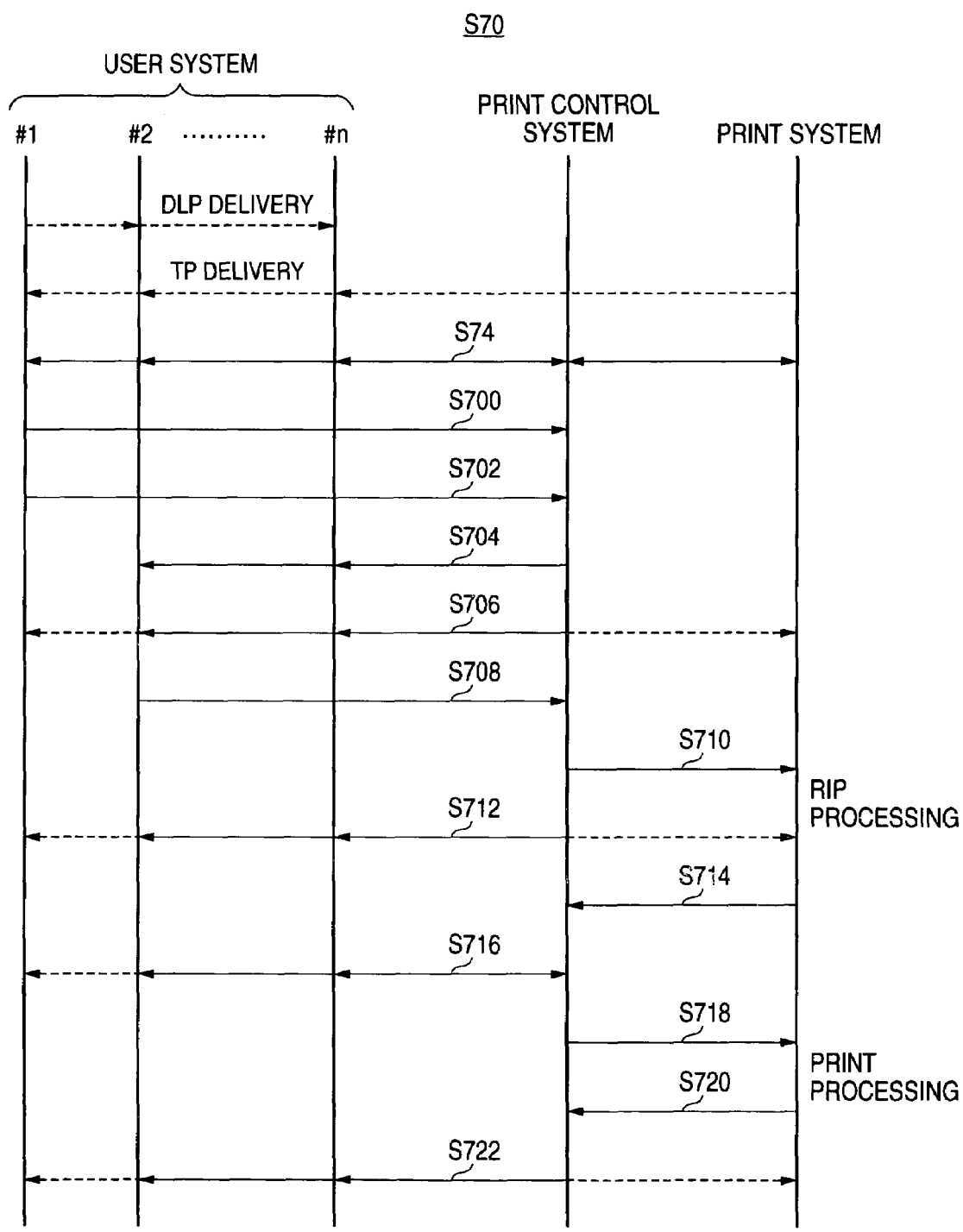
FIG. 40 is a sequence diagram in the print service system (FIG. 1) showing the delivery processing of the image data without the TP data/the DLP data from a user system to one or more other user systems, and the RIP process and the print process (S70) of the delivered image data.

FIG. 40 is a sequence diagram showing the delivery processing of the image data without the TP data/the DLP data from a user system 4 to one or more other user systems 4, and the RIP process and the print process (S70) of the delivered image data.

As shown by dotted lines in FIG. 40, the DLP data are exchanged between the user systems 4 and are stored.

As likewise shown by dotted lines, moreover, the TP data of the printing device 36 (FIG. 2) are output from the print system 3 to the user system 4 and are stored.

At Step 74 (S74, as will be described with reference to FIG. 41), there is set the node (or pay node), which becomes an accounting target of the accounting device 24 of the print control system 2 and pays the sum of charge, between the print control system 2, and the user system 4 and the print system 3.

At Step 700 (S700), the first user system 4 (i.e., the user system #1) designates the delivery destination user system 4 (i.e., the second to n-th user systems 4 in FIG. 40) for the print control device 26 of the print control system 2, and requests the image delivery without the TP data/the DLP data.

At Step 702 (S702), the first user system 4 outputs the image data (the drawing data), which is to be delivered, to the print control device 26.

Here, the image data generally contain the image data such as photography and the code data such as a drawing instruction. Hereinafter, they will also be expressed as the "image data (drawing data)" so as to express both the image data and the code data explicitly.

At Step 704 (S704), the print control device 26 outputs the image data processed at S702, without the TP data/the DLP data to the user system 4 designated by the process of S700.

At Step 706 (S706), the accounting device 24 of the print control system 2 performs the accounting process for the data delivery processing with the TP data/the DLP data for the node (i.e., the second to n-th user systems 4 in FIG. 40), which was set to the pay node at the process of S74.

Here, not only the second to n-th user systems 4 but also the first user system 4 or the print system 3, which have requested the delivery of the image data, can also be set to the pay node in the process of S74.

For example, moreover, the sum of charge for the data delivery without the TP data/the DLP data is set lower than that for the data distribution with the TP data/the DLP data.

At Step 708 (S708), for example, the second user system 4 requests the print control device 26 of the print control system 2 for the RIP process and the print process of the image data delivered to the second user system 4, with the print option (FIG. 23).

At Step 710 (S710), the print control device 26 requests the print system 3 for the RIP process with the print option and the image data to be processed.

In response to this request, the print system 3 performs the RIP process.

At Step 712 (S712), the accounting device 24 of the print control system 2 accounts the pay node (e.g., the second to n-th user systems 4 in FIG. 40).

At Step 714 (S714), the print system 3 outputs the RIP processed image data to the accounting device 24 of the print control system 2 and the accounting estimation for the print process, as accords to the print option, to the print control device 26.

At Step 716 (S716), the print control device 26 outputs the accounting estimations, as received from the print system 3, to the individual second to n-th user systems 4, and approves the accounting estimations.

At Step 718 (S718), the print control device 26 instructs the print system 3 the print.

At Step 720 (S720), the print system 3 prints the image data and returns the print result (success) to the print control device 26.

At Step 722 (S722), the accounting device 24 processes the accounting for the print process against the second to n-th user systems 4.

[Pay Node Setting]

Figure 41:
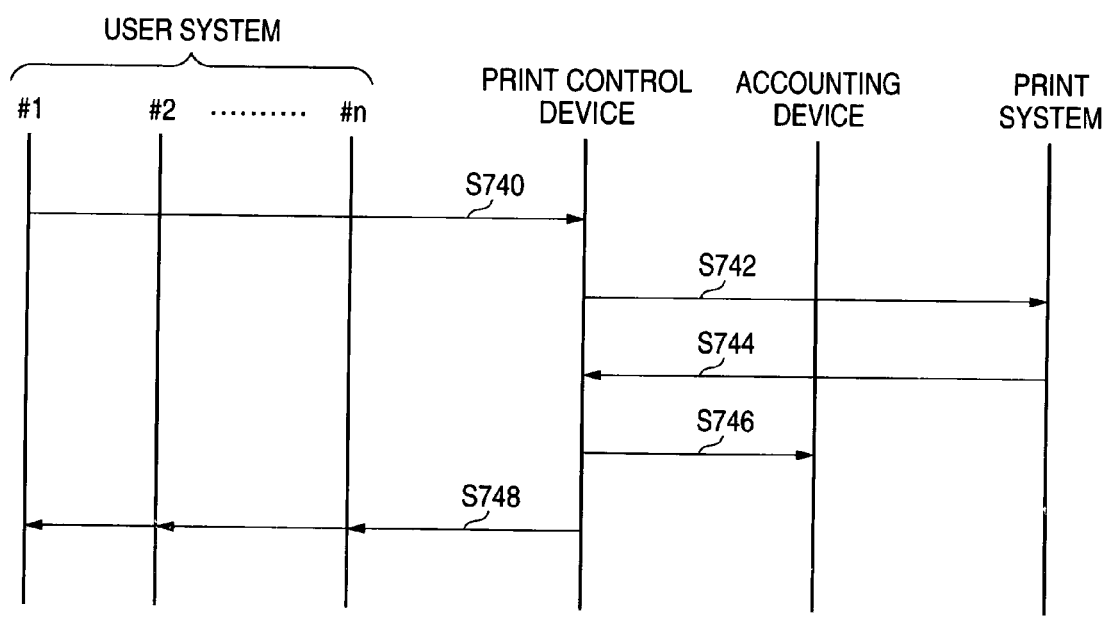
FIG. 41 is a sequence diagram showing the pay node setting processing (S74) shown in FIG. 40.

FIG. 41 is a sequence diagram showing the pay node setting processing (S74) shown in FIG. 40.

However, the processes shown in FIG. 41 illustrates a case different from that shown in FIG. 40.

At Step 740 (S740), for example, as shown in FIG. 41, the first to n-th user systems 4 (FIG. 4) sets the pay node to use the print system 3 for the print control device 26 (FIG. 3), for example.

At Step 742 (S742), the print control device 26 informs the print system 3 that it is set as the pay node.

At Step 744 (S744), the print system 3 returns it to the print control device 26 that it is set as the pay node.

At Step 746 (S746), the print control device 26 informs the accounting device 24 that the print system 3 is set as the pay node.

The accounting device 24 stores this information and performs the accounting processes such as the RIP process on the print system 3.

Here, in absence of the approval from the print system 3, for example, the print control device 26 does not set the print system 3 as the pay node for the accounting device 24.

At Step 748 (S748), the print control device 26 informs that the print system 3 is set as the pay node.

Here, any of the print control device 26, the print system 3 and the user system 4 can request the print control device 26 for the setting of the pay node, and any of these can be set as the pay node.

Even in the case shown in FIG. 40, moreover, the accounting device 24 accepts such various settings for the accounting as to account only the second user system 4 having requested the RIP process or to account the second to n-th user systems 4 equally, and performs the accounting processes according to the settings.

[Image Date Delivery with TP Data/DLP Data]

Here will be described the process to deliver the image data from one user system 4 to another user system 4 by attaching the TP data/the DLP data.

Figure 42:
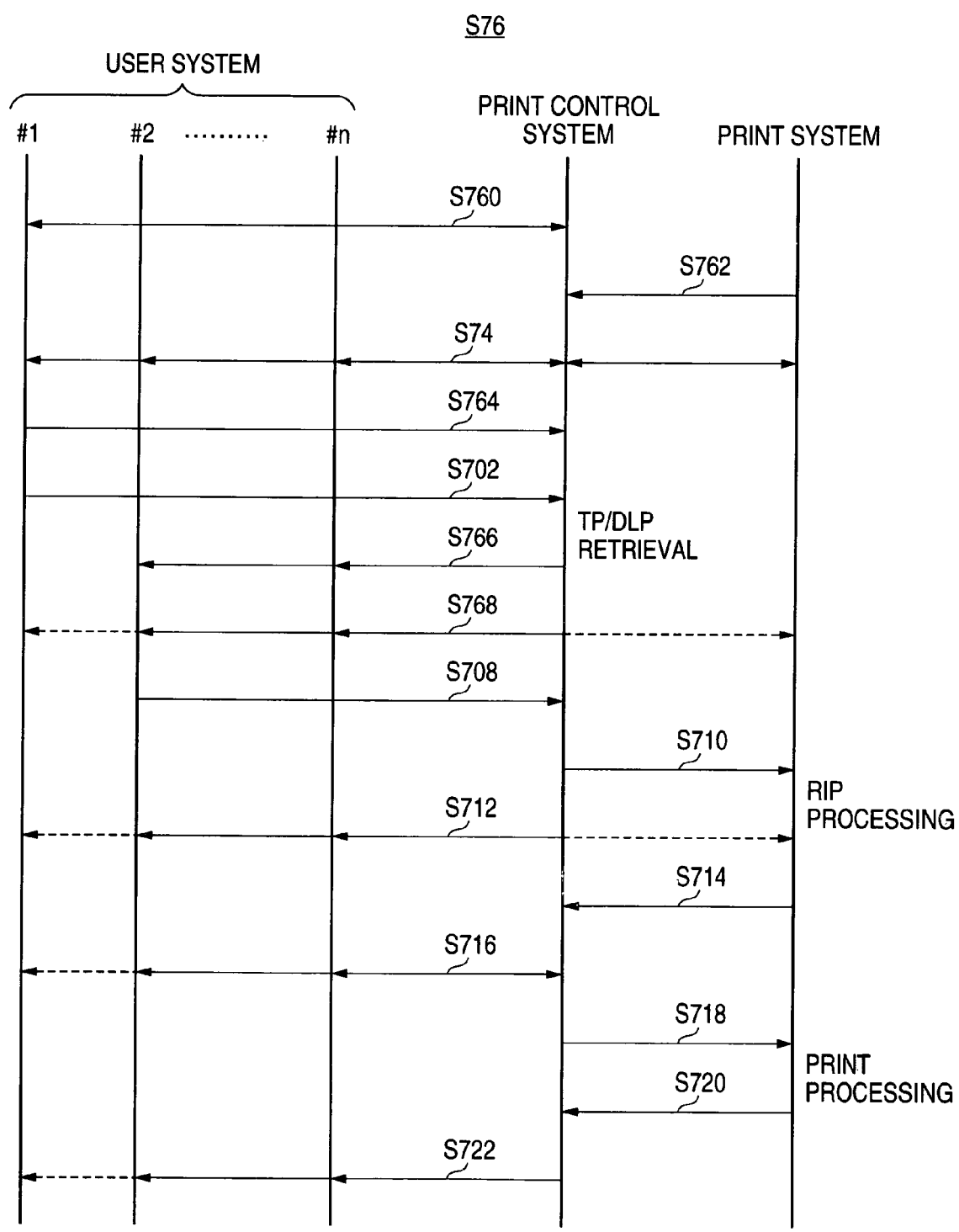
FIG. 42 is a sequence diagram in the print service system (FIG. 1) showing the delivering processing of the image data with the DP data/the DLP data from one user system to one or more other user systems, and the RIP process and the print process (S76) for the delivered image data.

FIG. 42 is a sequence diagram in the print service system 1 showing the delivering processing of the image data with the DP data/the DLP data from one user system 4 to one or more other user systems 4, and the RIP process and the print process (S76) for the delivered image data.

Of the individual processes shown in FIG. 42, those substantially identical to the individual processes shown in FIG. 40 and FIG. 41 are designated by the common reference numerals.

At Step 760 (S760), as shown in FIG. 42, each user system 4 (FIG. 4) registers the DLP data in the profile DB 20 of the print control system 2.

At Step 762 (S762), the print system 3 registers the TP data in the profile DB 20.

At Step 74 (S74), the process is done to set the pay node shown in FIG. 41.

At Step 764 (S764), the first print service system 1 (e.g., the user system #1) is requested for the delivery of the image data having the TP data/the DLP data added thereto.

At Step 702 (S702), the first user system 4 outputs the image data to the print control device 26.

At Step 766 (S766), the print control device 26 delivers the image data with the TP data/the DLP data to the second to n-th user systems 4.

At Steps 768 (S768), the accounting device 24 processes the accounting for the delivery of the image data with the TP data/the DLP data against the second to n-th user systems 4.

At Steps 708 to 722 (S708 to S722), the second to n-th user systems 4 requests the print control system 2 for the RIP process and the print process, and the print system 3 performs these requested processes to do the accounting processes against the second to n-th user systems 4.

[Priority Setting]

Next, here will be described the processes to set a plurality of print systems 3, if any in the print service system 1, with the priority and to cause the print system 3 of the highest priority to execute the requested processing in case a plurality of print systems 3 can execute the RIP process and the print process requested.

Figure 43:
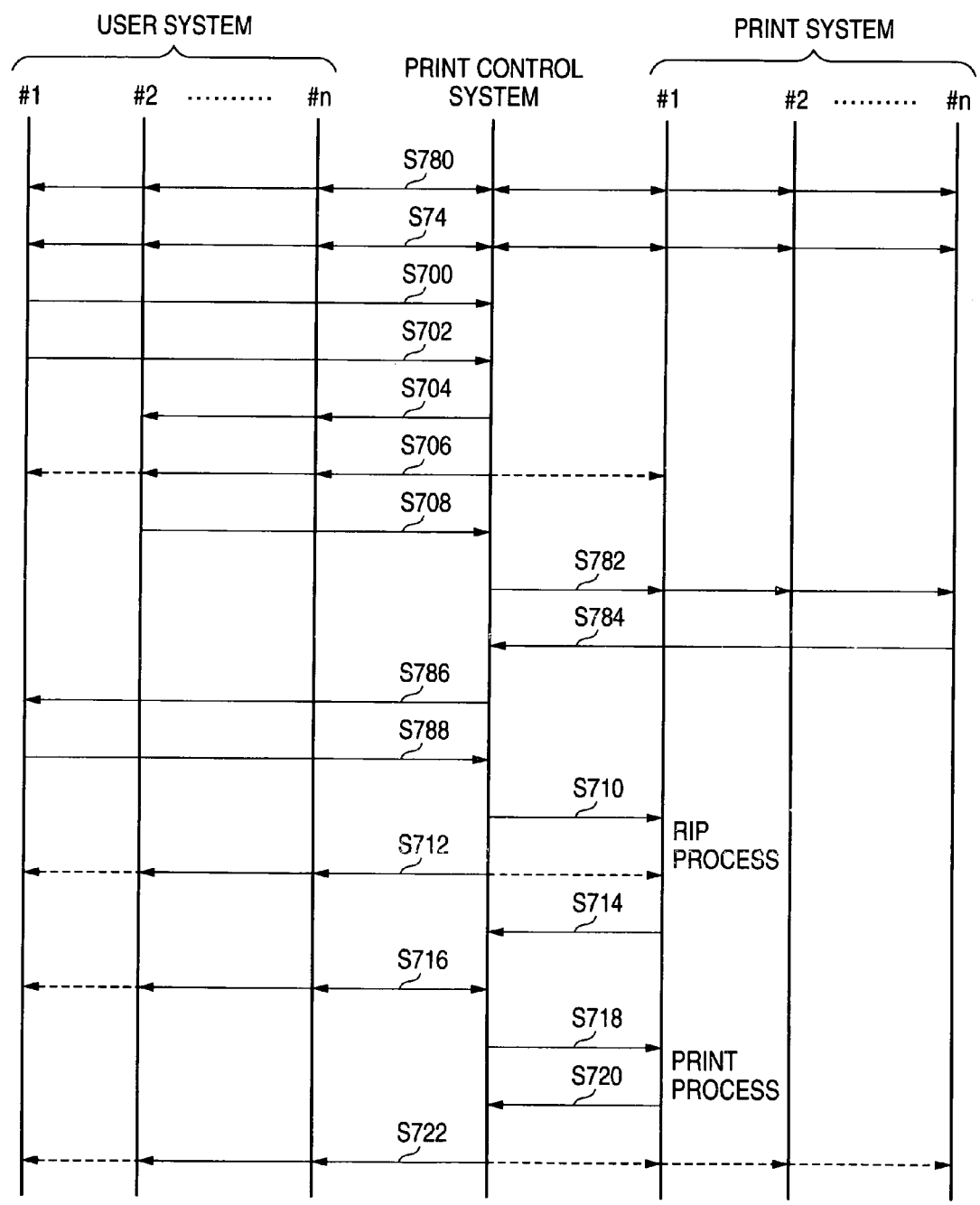
FIG. 43 is a sequence diagram in the print service system (FIG. 1) showing the delivery processing of image data without the TP data/the DLP data from one user system to one or more other user systems, and the RIP process and the print process (S78) by the print system given the priority.

FIG. 43 is a sequence diagram in the print service system 1 showing the delivery processing of image data without the TP data/the DLP data from one user system 4 to one or more other user systems 4, and the RIP process and the print process (S78) by the print system 3 given the priority.

Of the individual processes shown in FIG. 43, those substantially identical to the individual processes shown in FIG. 40 to FIG. 42 are designated by the common reference numerals.

At Step 780 (S780), as shown in FIG. 43, it is set (priority) what print system 3 is subjected in priority to the RIP process and the print process between the user system 4, and the print control system 2 and the print system 3.

In the example shown in FIG. 43, the highest priority is set to the first print system 3 (i.e., the print system #1).

At Step 74 (S74), the pay node is set between the user system 4, and the print control system 2 and the print system 3.

At Steps 700 to 708 (S700 to S708), the first user system 4 requests the print control system 2 for the delivery of the image data without the TP data/the DLP data, and the print control system 2 performs the requested delivery of the image data and accounts the delivery of the image data.

Moreover, the second to n-th user systems 4 requests the print control system 2 for the RIP process and the print process.

At Step 782 (S782), the print control device 26 (FIG. 3) of the print control system 2 inquires the first to m-th print systems 3 (i.e., the print systems #1 to #m) individually for their states with the print option (FIG. 23).

At Step 784 (S784), each print system 3 analyzes the print option included in the state inquiry, and judges whether or not it can execute the RIP process and the print process indicating the print option and returns the judgment result to the print control device 26.

At Step 786 (S786), the print control device 26 informs the second to n-th user systems 4 that the RIP process and the print process requested by the first print system 3 of the highest priority of those 3 capable of the RIP process and the print process are to be performed.

At Step 788 (S788), the second to n-th user systems 4 approve the execution of the process by the first print system 3, as informed at the process of S786.

At Steps 710 to 722 (S710 to S722), the print control system 2 requests the first print system 3 for the RIP process and the print process, and the first print system 3 executes those processes.

Moreover, the print control system 2 accounts for those processes.

[Print System Designate]

Next, here will be described the processes, in which the user system 4 designates, in which the print service system 1 has a plurality of print systems 3, the print system 3 to execute the process thereby to execute the RIP process and the print process.

Figure 44:
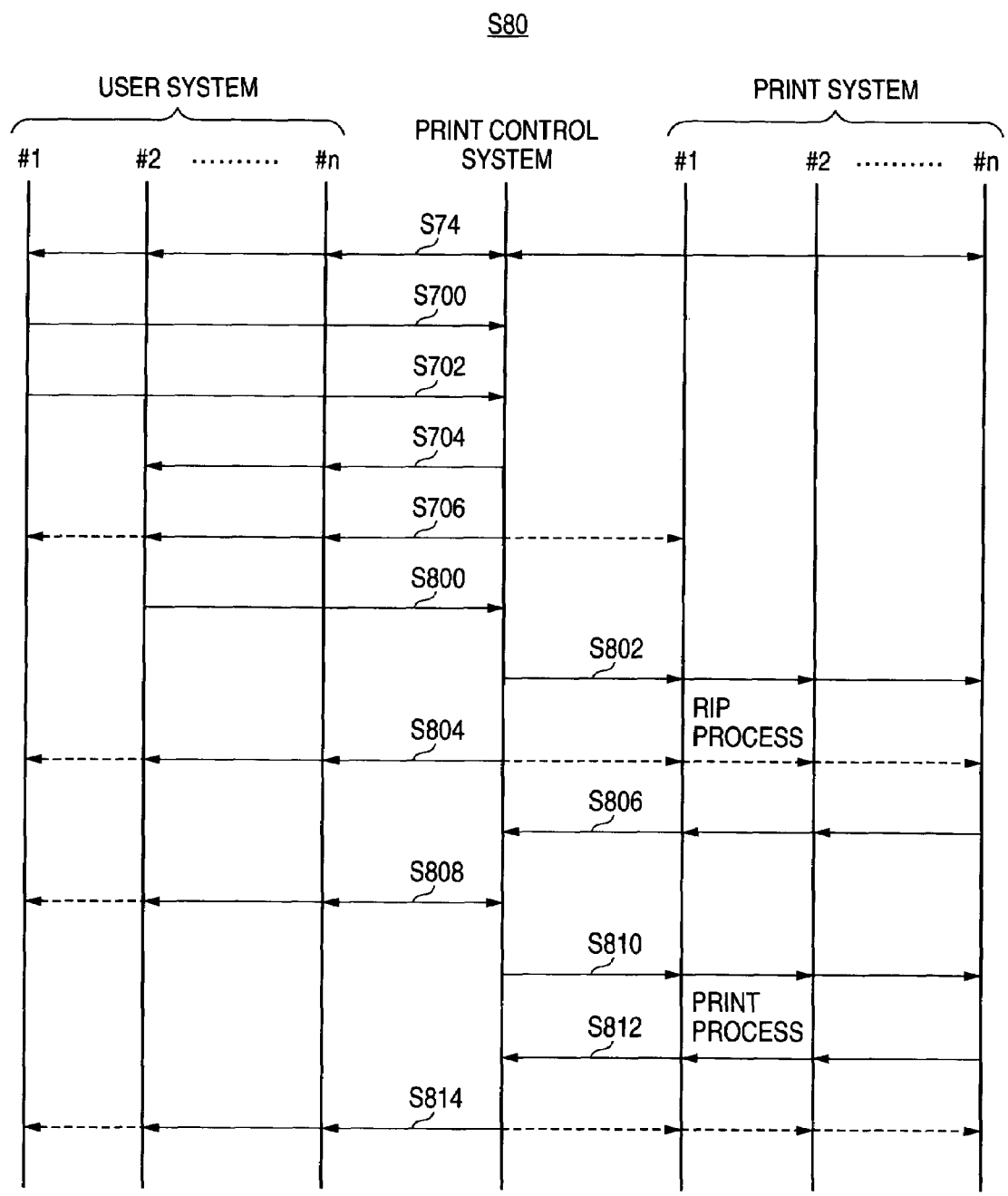
FIG. 44 is a sequence diagram in the print service system (FIG. 1) showing the delivery processing of image data without the TP data/the DLP data from one user system to one or more other user systems, and the RIP process and the print process (S80) by the print system designated.

FIG. 44 is a sequence diagram in the print service system 1 showing the delivery processing of image data without the TP data/the DLP data from one user system 4 to one or more other user systems 4, and the RIP process and the print process (S80) by the print system 3 designated.

Of the individual processes shown in FIG. 44, those substantially identical to the individual processes shown in FIG. 40 to FIG. 43 are designated by the common reference numerals.

At Step 74 (S74), as shown in FIG. 44, the pay node is set between the user system 4, and the print control system 2 and the print system 3.

At Steps 700 to 706 (S700 to S706), there are done the delivery processing of the image data without the TP data/the DLP data, and their accounting process.

At Step 800 (S800), the second to n-th user systems 4 (i.e., the user systems #2 to #n) request the print control system 2 for the RIP process and the print process including the designation of the print option (FIG. 23) and the print system 3.

At Step 802 (S802), the print control system 2 request one or more first to m-th print systems 3 designated at the process of S800 for the RIP process including the image data and the print option.

At Step 804 (S804), the print control system 2 accounts the RIP process against the second to n-th user systems 4.

At Step 806 (S806), each of the first to m-th print systems 3 outputs the accounting estimation of the print process to the print control system 2.

At Step 808 (S808), the print control system 2 the accounting estimation of the print process to the second to n-th user systems 4.

Each of the second to n-th user systems 4 designates the print process by the print system 3 of the lowest estimated sum, and requests the print control system 2 for the print process.

At Step 810 (S810), the print control system 2 requests the designated print system 3 for the print process.

At Step 812 (S812), each print system 3 executes the requested print process, and informs the print control system 2, when the print process is ended, of the result (success) of the print process.

At Step 814 (S814), the print control system 2 accounts the printing against the second to n-th user systems 4.

[State Notification]

Here will be described the process for the print control system 2 to inform, in response to the inquiry from the user system 4, the states of another user system 4 and the print system 3 and the accounting information of the accounting device 24.

Figure 45:
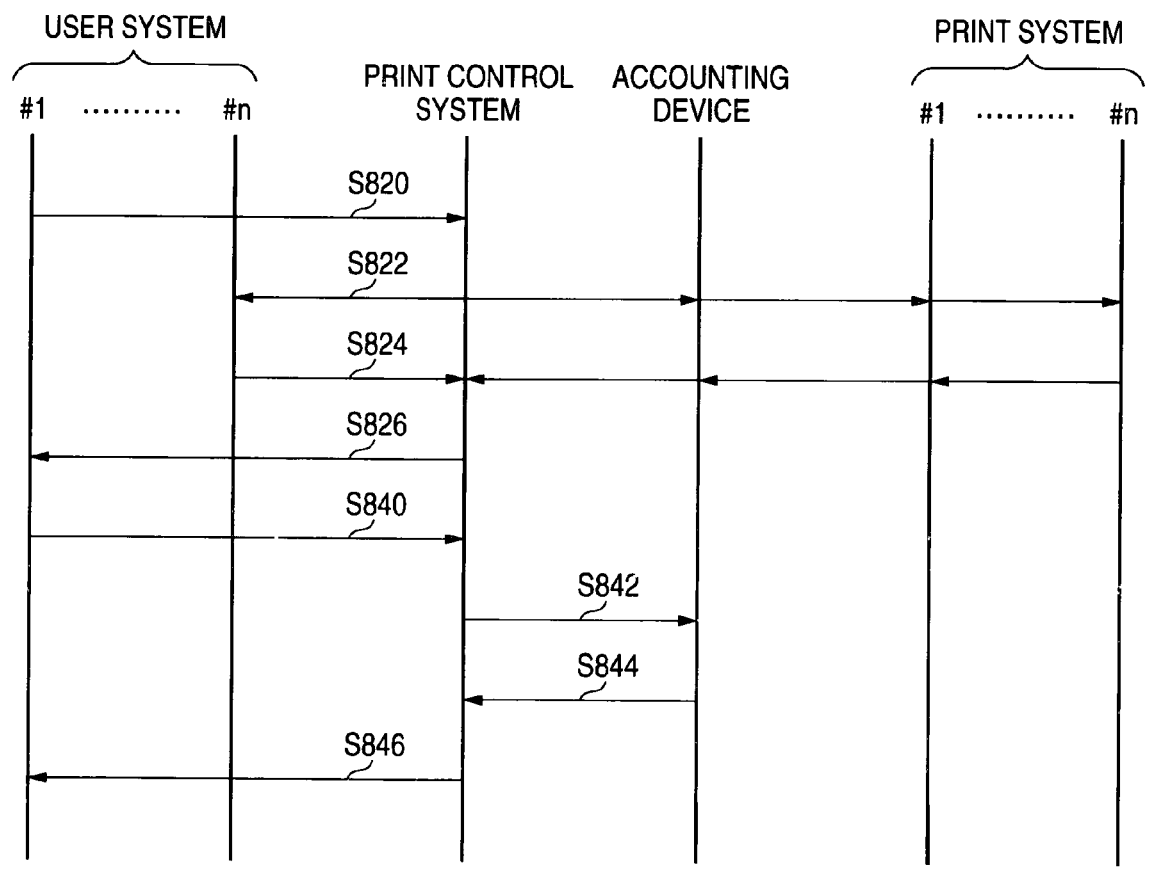
FIG. 45 is a diagram showing the processes (S82 and S84) for the print control system (FIG. 1) to inform the operating state of the print system and the state of the accounting information of the accounting device in response to an inquiry from the user system.

FIG. 45 is a diagram showing the processes (S82 and S84) for the print control system 2 to inform the operating state of the print system 3 and the state of the accounting information of the accounting device 24 in response to an inquiry from the user system 4.

At Step 820 (S820), as shown in FIG. 45, for example, the first user system 4 inquires the print control system 2 the states (e.g., the existence of troubles, what kind of drawing data the RIP process can be made, or the kind of the printing device 36) of the individual user systems 4 and print systems 3.

At Step 822 (S822), the print control system 2 inquires the second to n-th user systems 4 and the first to m-th print systems 3 the process contents and the operating states requested.

At Step 824 (S824), each of the user system 4 and the print system 3 inquired informs the print control system 2 of the contents of the process and the operating state.

At Step 826 (S826), the print control system 2 outputs the contents of the process and the operating state notification at S824 to the first user system 4.

At Step 840 (S840), the first user system 4 inquires the print control device 26 the accounting setting.

At Step 842 (S842), the print control device 26 inquires the accounting device 24 the aforementioned accounting setting.

At Step 844 (S844), the accounting device 24 informs the print control device 26 of the setting of the accounting.

At Step 846 (S846), the print control system 2 informs the first user system 4 of the accounting setting obtained at the process of S844.

Sixth Embodiment

The sixth embodiment of the invention will be described below.

When the line between the user system 4 and the network 10 is disconnected in the print service system 1 (FIG. 1), for example, the image processing device 42 (FIG. 4) of the user system 4 cannot receive the provision of the TP data from the print control system 2 or the print system 3.

The image processing device 42 had better not do the color correction processing while being provided with no TP data.

Even if the generation of the DLP data and the RIP process of the image data in the image processing device 42 are not executed in the least because it is unknown whether or not the TP data stored in the image processing device 42 are coincide with the latest TP data of the printing device 36 (FIG. 2 of the print system 3 to print the image data, the works in the user system 4 do not proceed inconveniently.

In this case, therefore, considering the aging of the profile data, the image processing device 42 may perform the process needing the color characteristic processing of a predetermined period or a predetermined sheet number.

Even in case the communication between the user system 4 and the network 10 is interrupted due to the line disconnection so that the user system 4 cannot obtain the TP data from the print control system 2, according to the sixth embodiment, the RIP process using the TP data stored in the image processing device 42 can be executed with the approval of the user.

Here, the following individual sequence diagrams can be more easily understood by comparing the sequence diagrams of other Figures such as FIG. 9 or FIG. 11.

From the following individual sequence diagrams, moreover, the processes having no serious influence are suitably omitted.

[RIP Process/Print Process of Image Data with No Color Correction Request]

Figure 46:
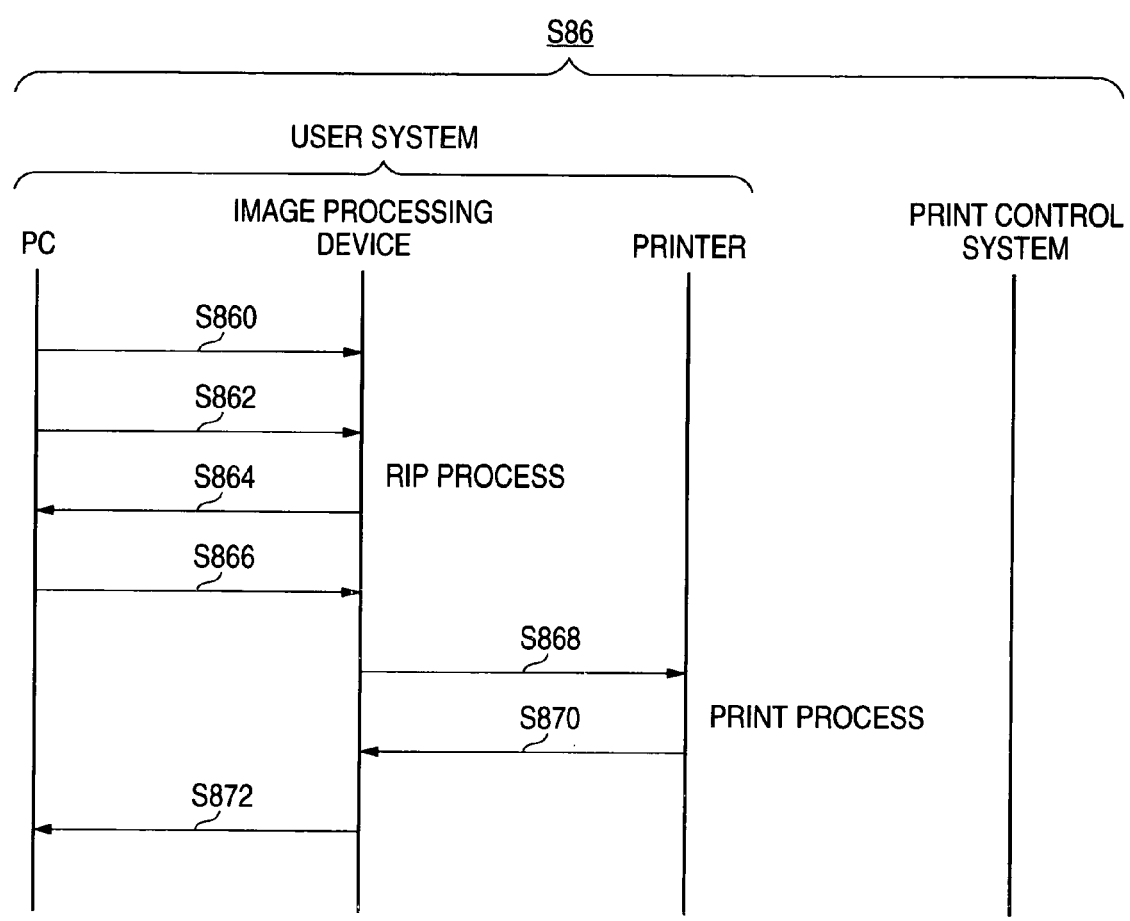
FIG. 46 is a sequence diagram showing the RIP process and the print process (S86) of the image data having no color correction request in the print service system 1 (FIG. 1)

FIG. 46 is a sequence diagram showing the RIP process and the print process (S86) of the image data having no color correction request in the print service system 1 (FIG. 1).

At Steps 860 and 862 (S860 and S862), as shown in FIG. 46, the PC 48 of the user system 4 requests the image processing device 42 for the RIP process of the image data having no color correction request, and outputs the drawing data.

The image processing device 42 judges it from the RIP process request or the drawing data at the process of S860 and S862, and does not request the print control system 2 or the print system 3 for the TP data unlike the processes shown in FIG. 9 and so on.

The image processing device 42 develops the drawing data by the RIP process, and generates the image data without any color correction.

At Step 864 (S864), the image processing device 42 causes the display/input device 106 (FIG. 5) of the PC 48 to display the image data obtained by the RIP process.

At Step 866 (S866), the PC 48 requests the image processing device 42 to print the image data having no color correction request, as obtained by the RIP process.

At Step 868 (S868), the image processing device 42 issues the print request to the printer 44, and outputs the image data.

At Step 870 (S870), the printer 44 prints the image data and returns the print result (success) to the image processing device 42.

At Step 872 (S872), the image processing device 42 informs the PC 48 of the print success.

Thus, in the user system 4, the image data having no color correction request can be printed out from the PC 48 in the printer 44 no matter whether the line to the network 10 could be ordinarily communicated or not.

[RIP process/Print process of Color Image Data]

Figure 47:
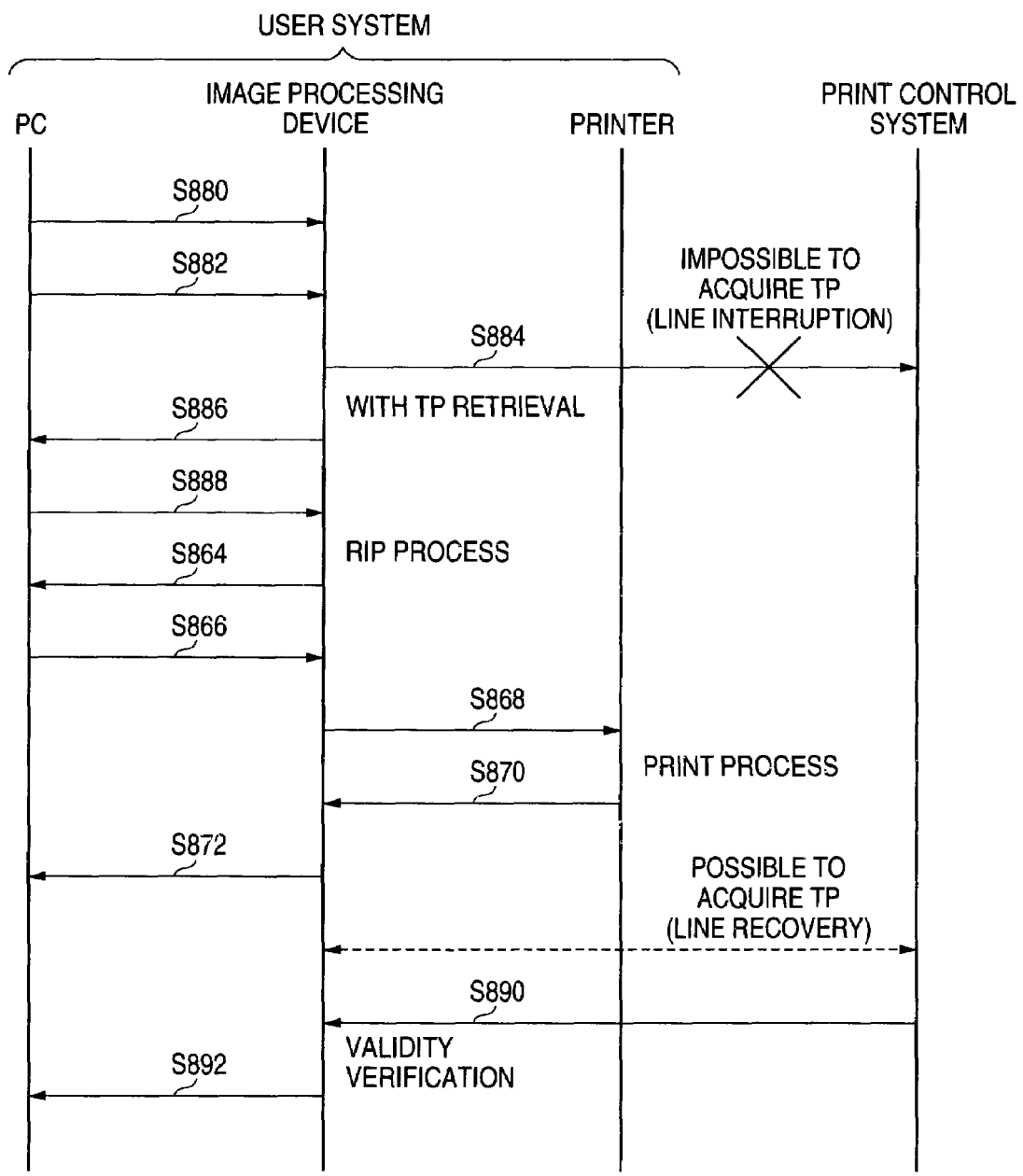
FIG. 47 is a sequence diagram showing a first process (S88) in the print service system (FIG. 1) for the RIP process and the print process of the image data (or the color image data) having the color correction request in the interrupted state of the communications with the network.

FIG. 47 is a sequence diagram showing a first process (S88) in the print service system 1 (FIG. 1) for the RIP process and the print process of the image data (or the color image data) having the color correction request in the interrupted state of the communications with the network 10.

Of the individual processes shown in FIG. 47, those substantially identical to the individual processes shown in FIG. 46 are designated by the common reference numerals.

In the following individual Figures, moreover, the color image data are exemplified as the image data having the color correction request.

At Steps 880 and 882 (S880 and S882), as shown in FIG. 47, the image processing device 42 is requested for the RIP process of the color image data by the PC 48, and the color drawing data are output.

At Step 884 (S884), the image processing device 42 requests the print control system 2 or the print system 3 for the latest TP data, but the TP acquisition fails due to the line interruption between the user system 4 and the network 10.

At Step 886 (S886), the image processing device 42 acquires the target TP data by retrieving the TP-DB 600, as shown in FIG. 18.

The image processing device 42 informs the PC 48 that the latest TP data cannot be acquired from the print control system 2 or the print system 3, and asks for the approval on whether or not the RIP process is to be continued.

At Step 888 (S888), the PC 48 instructs the image processing device 42 to continue the RIP process.

Here, the following processes are not executed in case the PC 48 instructs the image processing device 42 to terminate the RIP process.

At Steps 864 to 872 (S864 to S872), the image processing device 42 generates the DLP data from the DP data and the TP data stored in the TP-DB 600, and performs the RIP process.

Moreover, the image processing device 42 confirms the RIP processed image data acquired, requests the print, prints and informs the print result.

After this, the communications between the user system 4 and the print control system 2 or the print system 3 are recovered, and the image processing device 42 can acquire the latest TP data from them.

In response to the information of the communication recover from the print control system 2 or the print system 3, for example, the image processing device 42 requests the print control system 2 or the print system 3 for the TP data used in the RIP process, which has been executed while the latest TP data could not be acquired due to the line disconnection between the user system 4 and the network 10.

At Step 890 (S890), the image processing device 42 acquires the latest TP data from the print control system 2 or the print system 3.

At Step 892 (S892), the image processing device 42 verifies the validity of the RIP process done already.

It is decided that the RIP process done already was valid, when the version of the TP data read from the TB-DB 600 (FIG. 18) and the version of the TP data acquired at the process of S890 are compared and found identical.

In case the TP data read from the TP-DB 600 (FIG. 18) and the TP data acquired at the process of S890 are not identical, on the contrary, it is decided that the RIP process done already was invalid.

Moreover, the image processing device 42 informs the PC 48 of the validity of the RIP process done already.

In response to this information, the user of the PC 48 takes proper counter measures by requesting the PC 48 for another RIP process.

Figure 48:
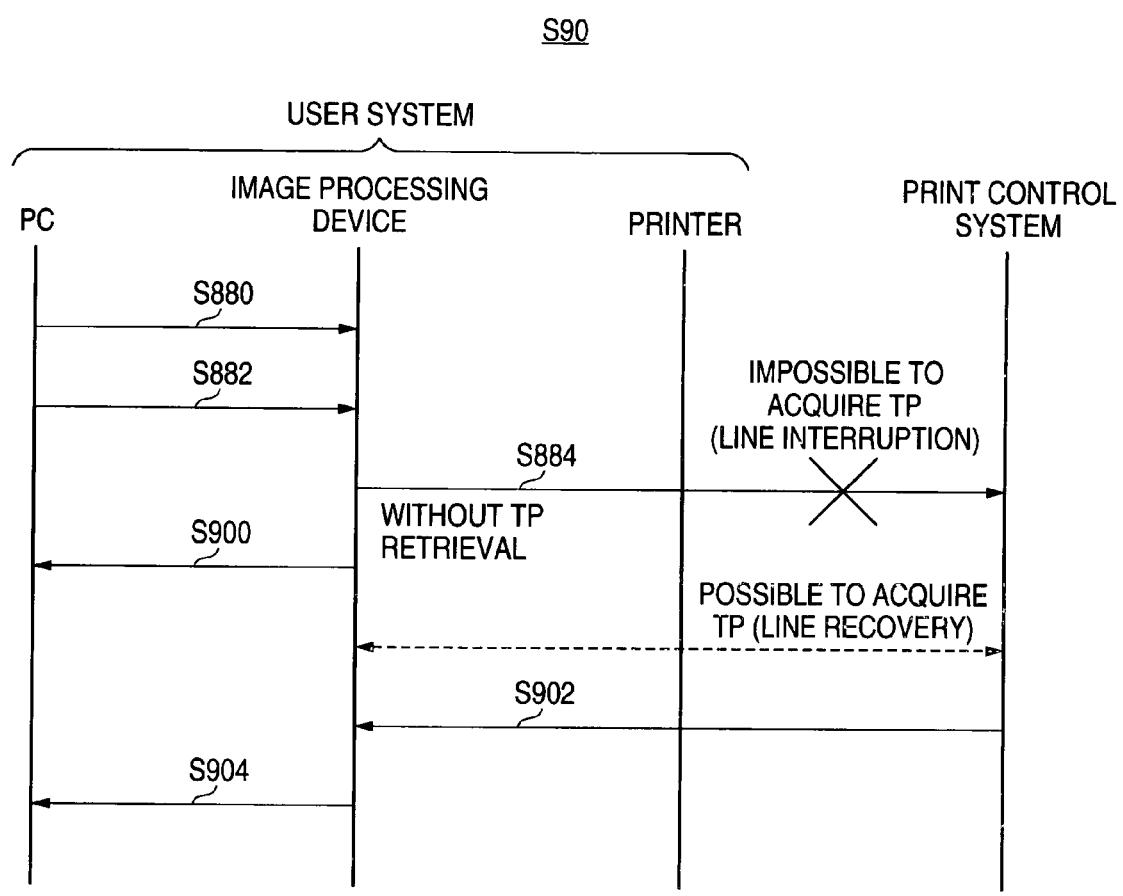
FIG. 48 is a sequence diagram showing a second process (S90) of the print service system (FIG. 1), in which the image data (or the color image data) having the color correction request is subjected to the RIP process and the print process while the communication with the network is being interrupted.

FIG. 48 is a sequence diagram showing a second process (S90) of the print service system 1 (FIG. 1), in which the image data (or the color image data) having the color correction request is subjected to the RIP process and the print process while the communication with the network 10 is being interrupted.

At Steps 880 and 882 (S880 and S882), as shown in FIG. 48, the image processing device 42 is requested for the RIP process of the color image data by the PC 48, and the color drawing data are output.

At S884 (S884), the image processing device 42 requests the print control system 2 or the print system 3 for the latest TP data, but is caused to fail in the acquisition of the TP data by the line disconnection between the user system 4 and the network 10.

At Step 900 (S900), the image processing device 42 retrieves the TP-DB 600 shown in FIG. 18 but fails in the acquisition of the target TP data.

In this case, in the absence of the TP data, the image processing device 42 cannot generate the DLP data so that it cannot perform the RIP process with the DLP data.

In this case, the process is ended by indicating it in the PC 48 that the latest TP data cannot be acquired from the print control system 2 or the print system 3 so that the RIP process is impossible.

After this, the communication between the user system 4 and the print control system 2 or the print system 3 is recovered, so that the image processing device 42 can acquire their latest TP data.

In accordance with the information of the communication recover from the print control system 2 or the print system 3, for example, the image processing device 42 requests the print control system 2 or the print system 3 for the TP data used in the RIP process, which has been executed while the latest TP data could not be acquired due to the line disconnection between the user system 4 and the network 10.

At Step 902 (S902), the image processing device 42 acquires the latest TP data from the print control system 2 or the print system 3.

At Step 904 (S904), the image processing device 42 informs the PC 48 that the terminated RIP process can be executed.

In response to this information, the user of the PC 48 takes proper counter measures by requesting the PC 48 for another RIP process.

Figure 49:
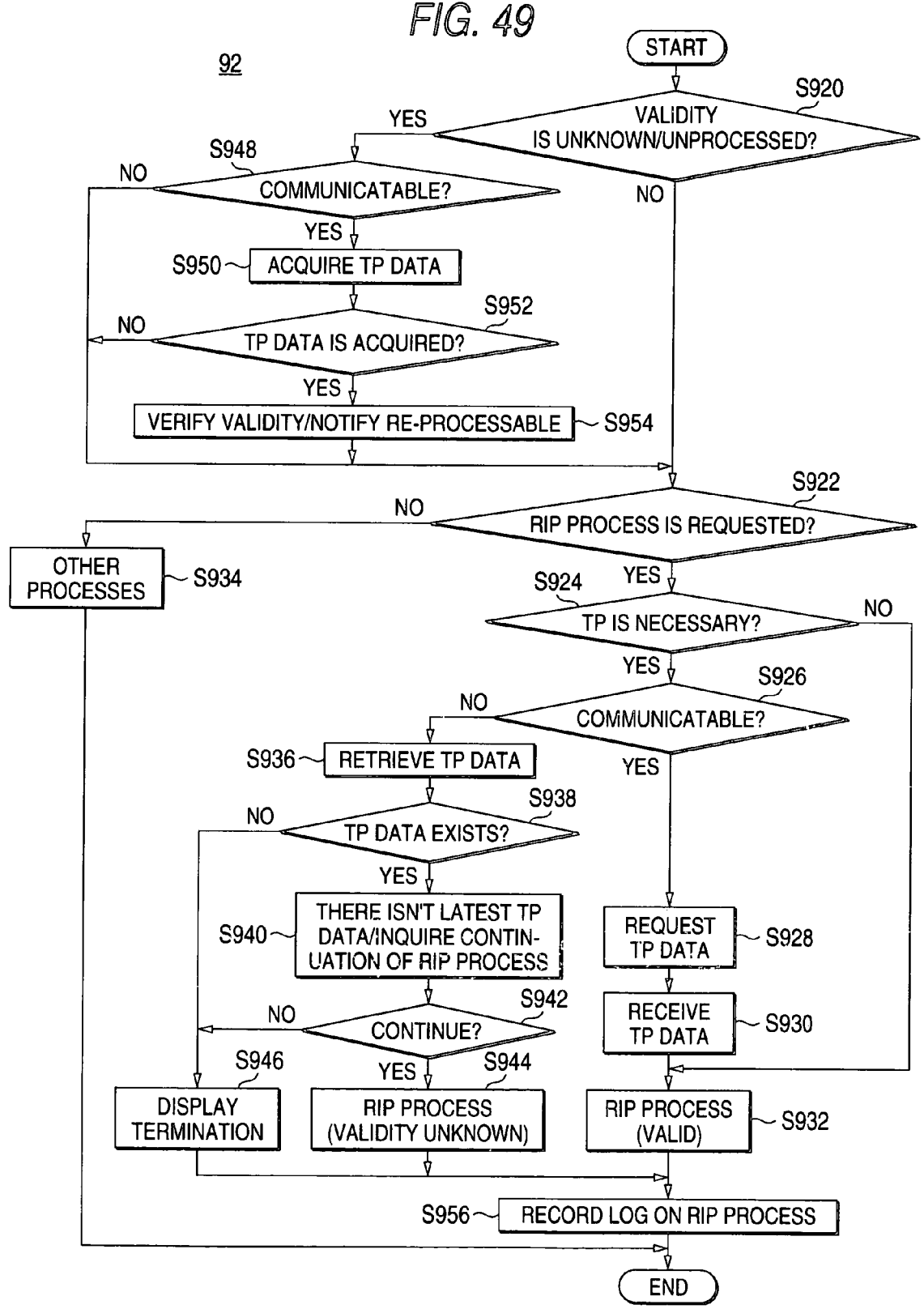
FIG. 49 is a flow chart showing the process (S92) of the print service system (FIG. 1) considering the case, in which the TP data cannot be acquired at the time of the RIP process.

With reference to FIG. 49, here will be further described the process of the print service system 1 considering the case win which the TP data cannot be acquired at the time of the RIP process.

FIG. 49 is a flow chart showing the process (S92) of the print service system 1 considering the case, in which the TP data cannot be acquired at the time of the RIP process.

At Step 920 (S920), as shown in FIG. 49, the image processing device 42 judges whether or not the RIP process having no warrant of using the latest TP data and an unknown validity has been executed, and whether or not an RIP process has not been executed because of no TP data.

The image processing device 42 advances to the process of S948, in case there is a RIP process having an unknown validity or a RIP process not executed without TP data, but to the process of S922 in other cases.

At Step 922 (S922), the image processing device 42 judges whether or not the RIP process has been requested by the PC 48.

The image processing device 42 advances to the process of S924, in case the RIP process has been requested, but to the process of S934 in other cases.

At Step 924 (S924), the image processing device 42 judges whether or not the TP data are necessary for the RIP process requested.

The image processing device 42 advances to the process of S926, in case the TP data are necessary, but to the process of S932.

At Step 926 (S926), the image processing device 42 judges whether or not the communication with the print control system 2 or the print system 3 can be made.

The image processing device 42 advances to the process of S928, in case the communication is possible, but to the process of S936 in other cases.

At Steps 928 and 930 (S928 and S930), the image processing device 42 requests the print control system 2 or the print system 3 for the TP data necessary for the RIP process, and receives the TP data provided by them.

At Step 932 (S932), the image processing device 42 generates the DLP data from the DP data of the printer 44 and the latest TP data received at the process of S930.

Moreover, the image processing device 42 executes the RIP process warranted in validity, by using the DLP data generated.

At Step 934 (S934), the image processing device 42 performs the process other than the RIP process.

At Step 936 (S936), the image processing device 42 retrieves the TP-DB 600 (FIG. 18) and determined the TP data, which can be used for the RIP process.

A Step 938 (S938), the image processing device 42 judges whether or not the TP data has been found by the retrieval.

The image processing device 42 advances to the process of S940, in case the TP data has been found, but to the process of S946 in other cases.

At Step 940 (S940), the image processing device 42 inquires the PC 48 whether or not the RIP process is to be continued with the TP data having no warrant of the latest state, although the latest TP data are not obtained.

At Step 942 (S942), in response to the inquiry of the S940, the image processing device 42 judges whether or not the user of the PC 48 has selected the continuation of the RIP process.

The image processing device 42 advances to the process of S944, in case the continuation of the RIP process is selected, but to the process of S946 in other cases.

At Step 944 (S944), the image processing device 42 performs the RIP process (i.e., the RIP process of unknown validity) with the TP data having no warrant of the latest state.

Here, this RIP process is executed within the range of the limit to preset period and sheet number.

When the image processing device 42 performs the RIP process with a plurality of kinds of profile data, moreover, this limit is set according to the kind of the profile data so that this RIP process is executed within the range of limit set according to the kind of the profile data.

At Step 946 (S946), the image processing device 42 informs the PC 48 that the RIP process is terminated, with reasons.

At Step 948 (S948), the image processing device 42 judges whether or not the communication with the print control system 2 or the print system 3 can be made.

The image processing device 42 advances to the process of S950, in case the communication with the print control system 2 or the print system 3 can be made, but to the process of S922 in other cases.

At Step 950 (S950), the image processing device 42 requests the print control system 2 or the print system 3 for both the latest TP data needed at the process of S944 and the TP data needed for the RIP process, which has not been executed because the latest TP data could not be acquired.

At Step 952 (S952), the image processing device 42 judges whether or not the TP data having been requested at S950 could be acquired.

The image processing device 42 advances to the process of S954, in case the TP data could be acquired, but to the process of S922 in other cases.

At Step 954 (S954), the image processing device 42 verifies the validity of the RIP process of S944, and informs the PC 48 of the verification result.

Alternatively, the image processing device 42 informs the PC 48 that the failed RIP process can be executed.

Seventh Embodiment

Here will be described a seventh embodiment of the invention.

When the user of the user system 4 (FIG. 4) utilizes for the first time in the print service system 1 (FIG. 1), the user may desire to try the services provided by the print system 3, before the user receives the services by paying the fare actually.

The seventh embodiment of the invention has been presented to satisfy that desire.

In the print service system 1 to be described, the user to try the services of the print system 3 registers at first the trial of the print system 3 of that user system 4 in the print system 3.

When the trial of the print system 3 by the user system 4 is authorized and registered, in response to the request of the registered user system 4 for the process, for example, the print system 3 provides the RIP process or the print process free or at a discount sum to the user system 4 within the range set for the trial.

This set range (or the trial range) is exemplified in the following (7-1) to (7-8).

(7-1) When the print system 3 can provide the user system 4 authorized for the normal use, with the RIP process and the print process, the print system 3 provides the user system 4 authorized only for the trial, with only the RIP process function.

(7-2) When the print system 3 provides the user system 4 authorized only for the trial, with the printing function, the print system 3 limits the size of paper sheet and performs only the print process of A4 or smaller, for example, in accordance with the request from the user system 4.

(7-3) Likewise the print system 3 limits the user system 4 authorized only for the trial, to predetermined or less numbers of the total print number, the print number per day, the print number per parameters contained in the print option (FIG. 23).

(7-4) When the print system 3 can provide the user system 4 authorized for the normal use, with the RIP process and the print process of the black-and-white image data and the color image data, the print system 3 provides the user system 4 authorized only for the trial, only with the RIP process/print process functions of the black-and-white data.

(7-5) The print system 3 provides the user system 4 authorized only for the trial, with the functions for a limited constant period.

(7-6) The print system 3 performs nothing but the processes requested for the image data to be processed, for the user system 4 authorized for the normal use, but displays an additional image indicating the trial for the image data to be processed, for the user system 4 authorized only for the trail.

Here, the print system 3 may add the additional image to a fixed position of the image data to be processed, and may add the same to the position, which is explicitly designated by the user, and automatically select and add the optimum position for the addition of the added image in the image data.

(7-7) Each user system 4 is set with a point for the trial process, and each trial process is set with a consumption point.

The consumption point is reduced from the trial process point each time the user system 4 performs the trial process. When the point is exhausted, the print system 3 interrupts the provision of the trial process function for the user system 4.

In other words, the print system 3 authorizes the user system 4 the trial process within the range of the point of the trial process.

(7-8) The foregoing examples (7-1) to (7-7) are arbitrarily combined within an uncontradictory range or with a proper modification.

Here, the print system 3 can also provide the user system 4 with the trial process function without such trial range.

Moreover, these trial ranges can be set individually for every operation modes of the printers 44-1 and 44-2 of the user system 4.

Here, the operation modes are the output modes such as the "black-and-white", the "color" or the like.

The trial ranges for every operation modes are set to the trial number of X in the "black-and-white" output or the trial number of Y in the "color" output.

In the case of these settings, the ordinary accounting process of the individual output modes are started at the instant when the trial output of X is exceeded for the "black-and-white" output or when the trial output of Y is exceeded for the "color" output.

Moreover, these trial ranges can also be individually set for every target profiles or every drive link profiles.

The trial ranges for every target profiles are explicitly set by the user at the download time or automatically set on the basis of the attributes added to the target profile, for example.

Moreover, the trial range of the device link profiles are set when these link profiles are generated.

[Trial Process]

Here will be described the trial process in the print service system 1.

Here, the trial processes shown in the following individual Figures are realized by the trial control section 634 (FIG. 18) of the image processing program 6 to operate over the image processing device 42 of the print system 3 and the image processing device 42 of the user system 4 and by the registration DB 606.

Figure 50:
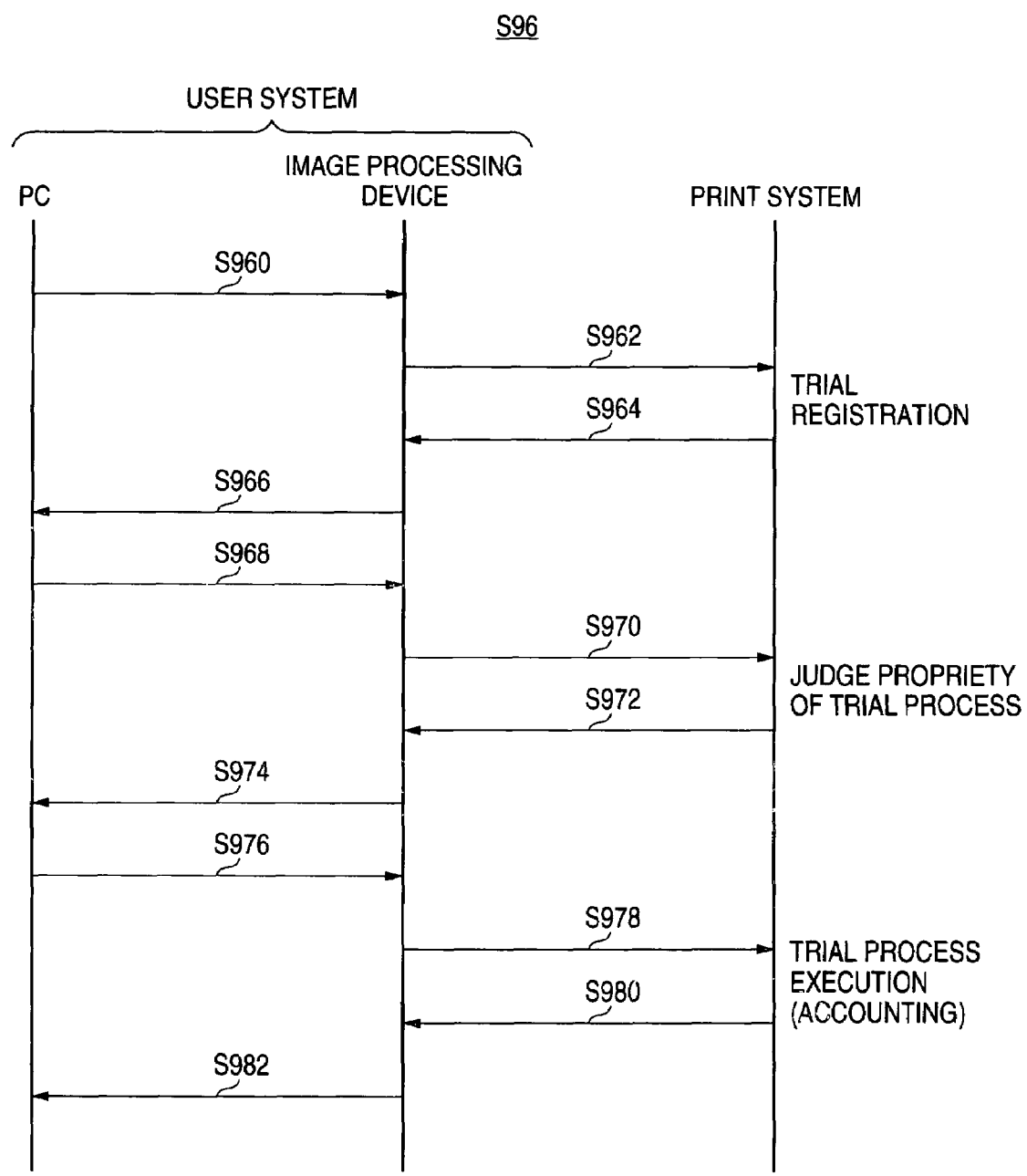
FIG. 50 is a sequence diagram showing a process (S96) for the user system (FIG. 4) to try the print system (FIG. 2) in the print service system (FIG. 1)

FIG. 50 is a sequence diagram showing a process (S96) for the user system 4 (FIG. 4) to try the print system 3 (FIG. 2) in the print service system 1 (FIG. 1).

At Step 960 (S960), as shown in FIG. 50, the user operates the PC 28 of the user system 4 to request the image processing device 42 for the registration to try the user system 4.

At Step 962 (S962), the image processing device 42 requests the print system 3 for the trial registration.

At Step 964 (S964), the print system 3 informs the image processing device 42 of the trial registration acceptance when it accepts and allows the trial registration request from the image processing device 42.

The image processing device 32 of the print system 3 registers the user system 4 authorized for the trial, in the registration DB 606, stores the trial range and point (as will be described with reference to FIG. 54 and FIG. 55) set for that user system 4, and retains the region for the history (or job log) of the process function provided for the user system 4.

Here, this region is held during the trial period set for the user system 4.

At Step 966 (S966), the image processing device 42 informs the PC 28 of the trial registration acceptance from the print system 3.

At Step 968 (S968), the PC 28 requests the print system 3, for example, for the print process containing the print option (FIG. 23) as the trial process.

At Step 970 (S970), the image processing device 42 outputs this request of the trial process to the print system 3.

At Step 972 (S972), on the basis of the trial range stored in the registration DB 606 (FIG. 18) of the image processing program 6, the image processing device 32 of the print system 3 analyzes the print option contained in the trial process request, thereby to judge whether or not the trial process can be executed.

The print system 3 judges that the print option is within the trial range so that the trial process for the user system 4 can be done, and returns the trial process response that the trial process can be done, to the image processing device 42.

At Step 974 (S974), the image processing device 42 returns a response that the trial process can be done, to the PC 28.

At Step 976(S976), user who looks at this response operates the PC 28 and confirms that the trial process is to be executed.

At Step 978 (S978), the image processing device 42 outputs an execution confirmation to the print system 3.

At Step 980 (S980), the print system 3 executes the requested print process as the trial process. The print system 3 returns, if it succeeds in the execution, the trial process result (success) to the image processing device 42, and retains the history of these processes as a job log in the registration DB 606 (FIG. 18).

When the trial process is set for the discount accounting, for example, the image processing device 42 and the accounting device 30 in the print system 3 cooperate properly for the further accounting processes.

At Step 982 (S982), the image processing device 42 informs the PC 28 of the success in the trial process.

In case it is judged at the process of S972 that the trial process is impossible, this impossible state is naturally returned from the print system 3 to the PC 28 by the process of S982 and S974, and the individual processes at and subsequent to S976 are not done.

[Trial Range Setting]

Here will be described the trial process of the case, in which it is judged in the user system 4 that the requested trial process is within the set trial range.

Figure 51:
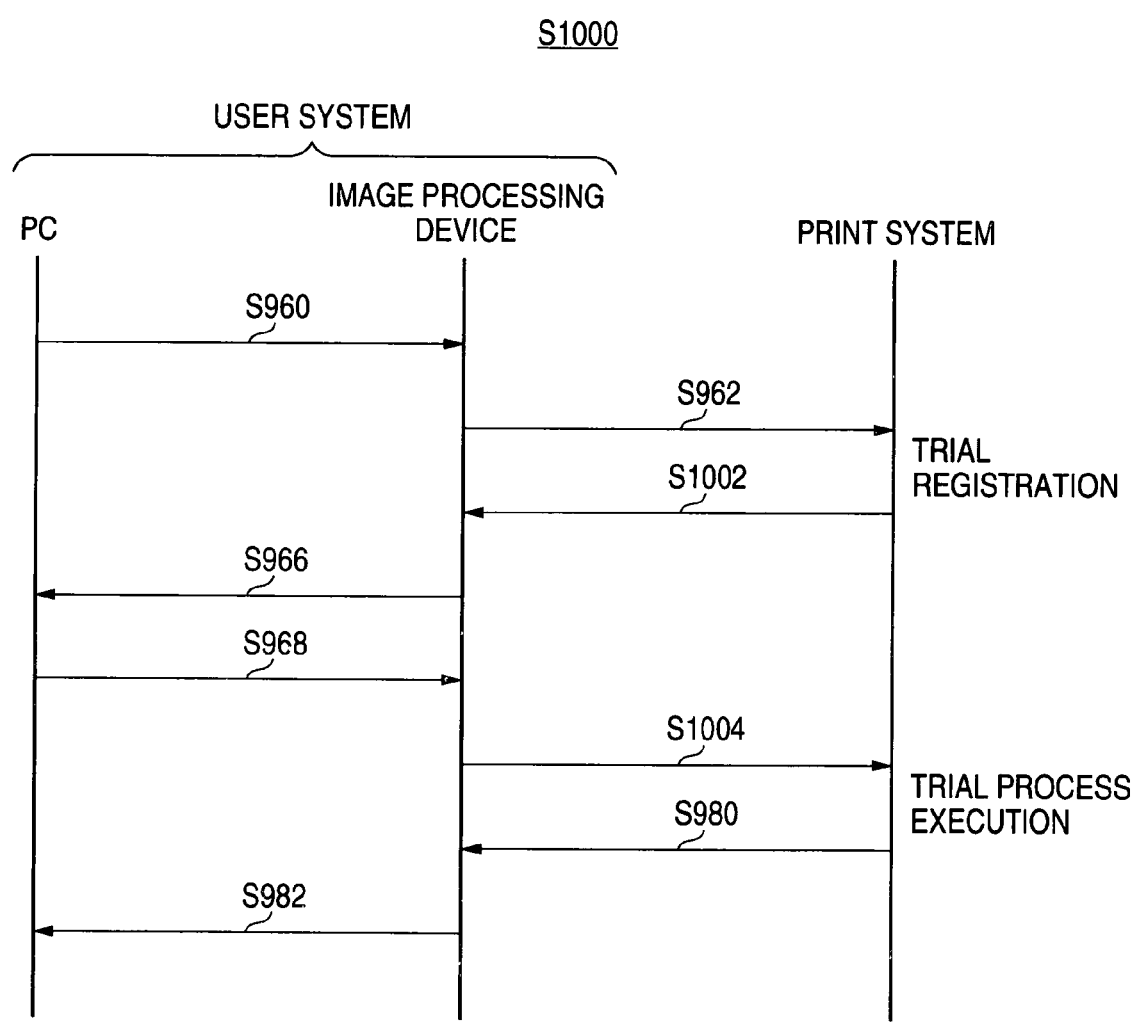
FIG. 51 is a normal sequence diagram showing the trial process (S1000), which has been so judged by the image processing device of the user system (FIG. 4) that the requested trial process is within the authorized range.

FIG. 51 is a normal sequence diagram showing the trial process (S1000), which has been so judged by the image processing device 42 of the user system 4 (FIG. 4) that the requested trial process is within the authorized range.

Figure 52:
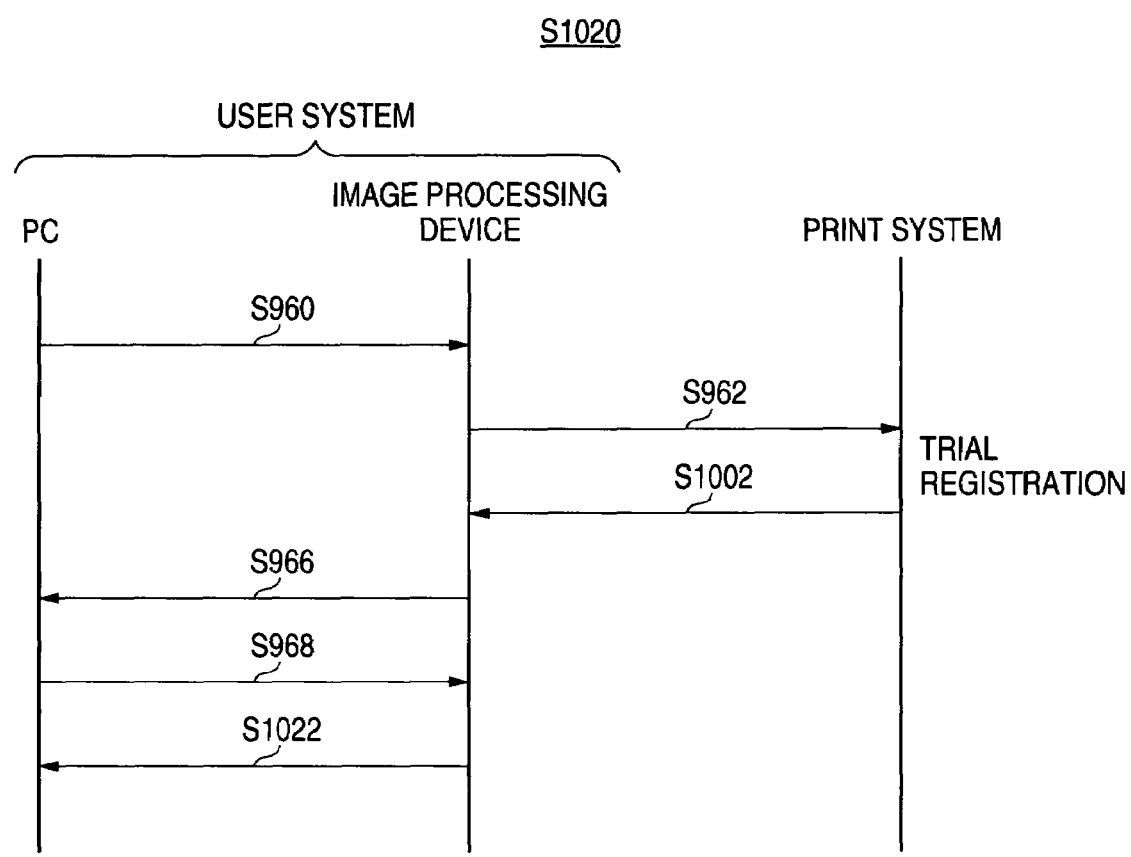
FIG. 52 is a sequence diagram showing the trial process (S1020), which has been so judged by the image processing device of the user system (FIG. 4) that the requested trial process is outside the authorized range.

FIG. 52 is a sequence diagram showing the trial process (S1020), which has been so judged by the image processing device 42 of the user system 4 (FIG. 4) that the requested trial process is outside the authorized range.

Of the individual processes shown in FIG. 50 to FIG. 52, substantially identical ones are designated by the common reference numerals (as in the following).

As shown in FIG. 51, at Steps 960 and 962 (S960 and S962), a trial registration request is issued from the PC 28 through the image processing device 42 to the print system 3.

At Step 1002 (S1002), the print system 3 outputs the trial range to the image processing device 42 while acknowledging the trial registration.

In the image processing device 42 having received them, the trial control section 634 of the image processing program 6 (FIG. 18) to operate over the image processing device 42 stores and retains the trial range in the registration DB 606 for the trial period.

At Step 966 (S966), the image processing device 42 informs the PC 28 of the trial registration acceptance.

At Step 968 (S968), the PC 28 requests the image processing device 42 for the trial process.

At Step 1004 (S1004), on the basis of the trial range stored in the registration DB 606 (FIG. 18), the image processing device 42 analyzes the print option contained in the trial process request from the PC 28, thereby to judge whether or not the print system 3 can be requested for the trial process of the PC 28.

The image processing device 42 outputs, when it judges that the trial process of the PC 28 can be requested, the trial process request to the print system 3.

At Step 980 (S980), the print system 3 executes the trial process the trial process. The print system 3 returns, if it succeeds, the trial process result (success) to the image processing device 42, and retains the history of these processes as a job log in the registration DB 606 (FIG. 18).

At Step 982 (S982), the image processing device 42 informs the PC 28 of the success in the trial process.

At Steps 960 and 962 (S960 and S962), as shown in FIG. 52, the trial process request is issued from the PC 28 through the image processing device 42 to the print system 3.

At Step 1002 (S1002), the print system 3 outputs the trial range together with the trial registration acceptance to the image processing device 42.

In the image processing device 42 having received them, the trial control section 634 of the image processing program 6 (FIG. 18) to operate over the image processing device 42 stores and retains the trial range in the registration DB 606 for the trial period.

At Step 966 (S966), the image processing device 42 informs the PC 28 of the trial registration acceptance.

At Step 968 (S968), the PC 28 requests the image processing device 42 for the trial process.

At Step 1004 (S1004), on the basis of the trial range stored in the registration DB 606 (FIG. 18), the image processing device 42 analyzes the print option contained in the trial process request from the PC 28, thereby to judge whether or not the print system 3 can be requested for the trial process of the PC 28.

When the image processing device 42 judges that the trial process of the PC 28 cannot be requested, the image processing device 42 does not request the trial process of the print system 3 but informs the PC 28 at Step 1022 (S1022) that the requested trial process is outside the range of authorization.

In view of this information, the user of the PC 28 re-examines the contents of the trial process request so that it can take counter measures to request the matching trial process again in the trial range.

[Advertisement Insertion]

Here will be described a trial process for inserting the advertising image of the advertiser system or another advertiser into the image data obtained by the trial process.

Figure 53:
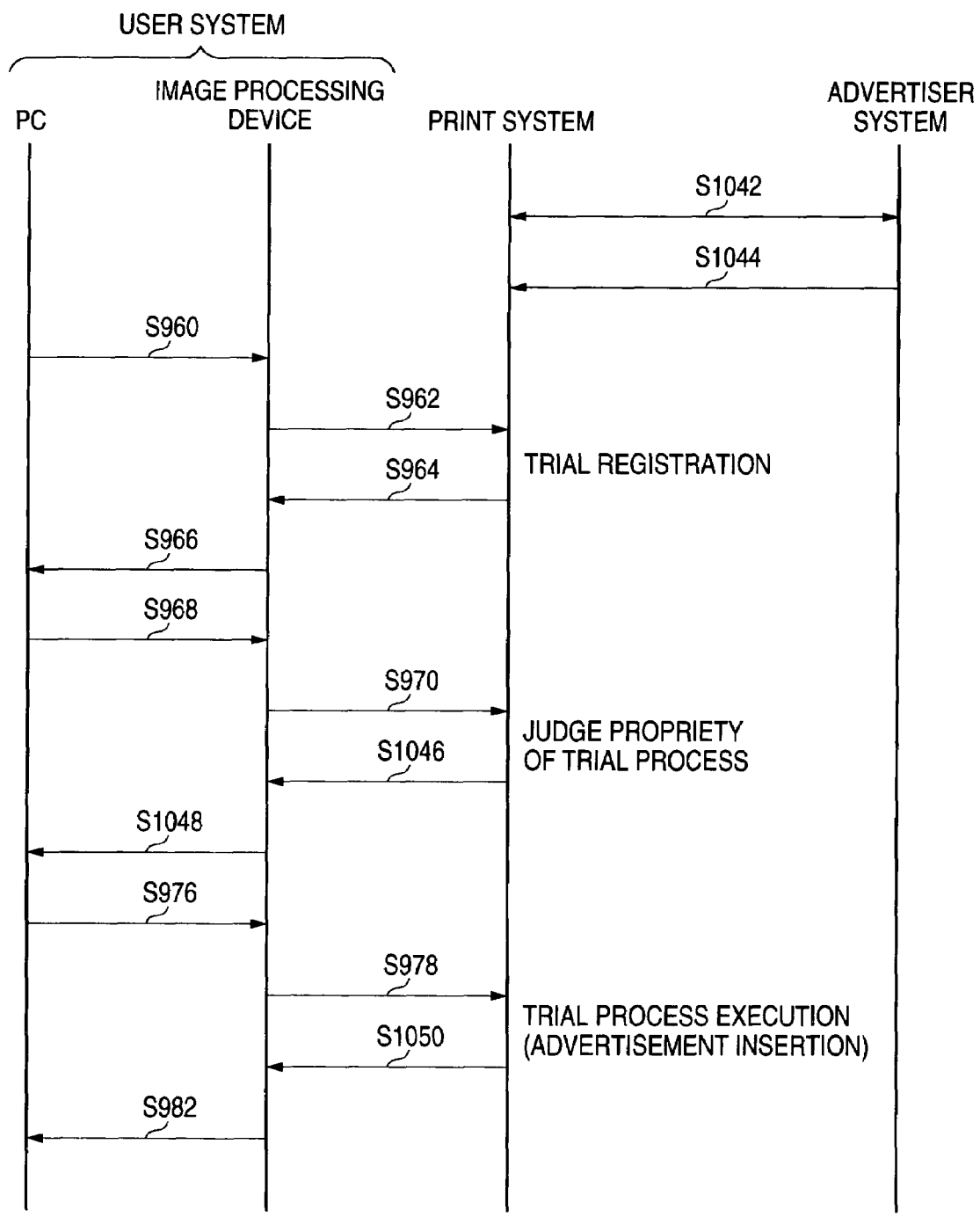
FIG. 53 is a sequence diagram showing a trial process (S1040) for inserting an advertising image into the image data obtained as a process result.

FIG. 53 is a sequence diagram showing a trial process (S1040) for inserting an advertising image into the image data obtained as a process result.

At Steps 1042 and 1044 (S1042 and S1044), as shown in FIG. 53, under the condition that the cost for the trial process of the print system 3 is paid between the advertiser system 16 (FIG. 1) and the print system 3 in place of the user of the user system 4, for example, the using condition is set to merge the advertising image into the image data obtained as a result of the trial process.

Moreover, the advertising image is output to the advertiser system 16.

At Steps 960 to 970 (S960 to S970), the trial registration is done from the PC 28 through the image processing device 42, and the trial process is requested.

At Step 1046 (S1046), on the basis of the trial range stored in the registration DB 606 of the image processing program 6, the image processing device 32 of the print system 3 analyzes the print option contained in the trial process request thereby to judge the propriety of execution of the trial process.

When the print system 3 judges that the trial process for the user system 4 is possible, the print system 3 returns it to the image processing device 42 that the trial process is possible and that the advertising image subjected to the process of S1044 is merged according to the setting made at the process of S1042.

At Step 1046 (S1046), the image processing device 42 returns to the PC the responses that the trial process is possible and that the advertising image is merged.

At Steps 976 to 982 (S976 to S982), the execution of the trial process is confirmed, and the trial process is executed so that the PC 28 is informed of the result.

[Point System]

Here will be described the trial process of a point system, in which a consumption point is set for each trial process and in which a provision point is set for providing the user system 4 with the trial process so that the trial process is provided within the provision point.

Figure 54:
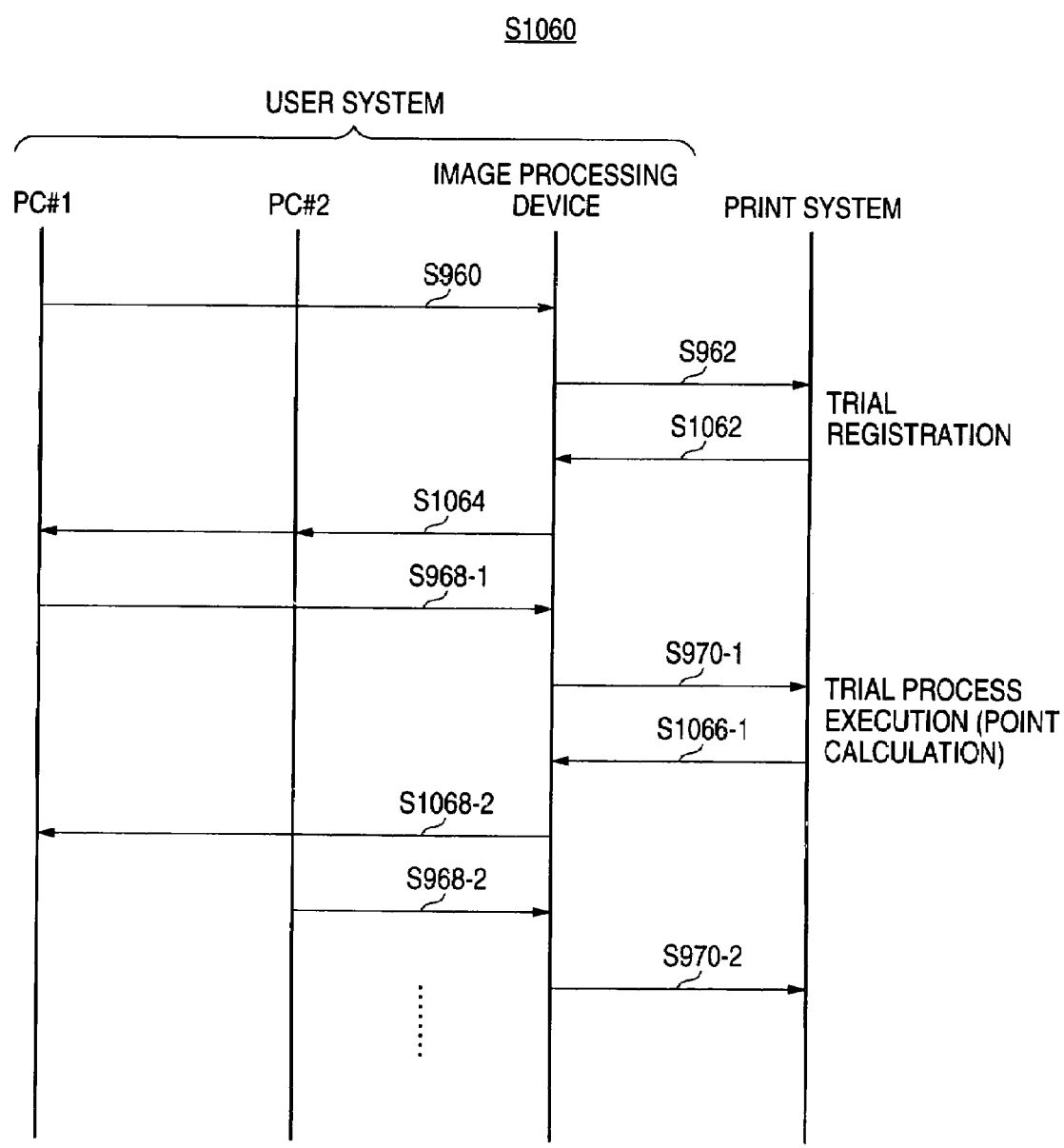
FIG. 54 is a diagram showing a trial process (S1060) of the point system of the case in which the point set in the user system is sufficient.

FIG. 54 is a diagram showing a trial process (S1060) of the point system of the case in which the point set in the user system 4 is sufficient.

At first, here will be described the trial process of the point system of the case the provision point is sufficient.

At Steps 960 and 962 (S960 and 962), as shown in FIG. 54, the print system 3 is requested for the trial registration through the image processing device 42 from the first one PC 28 of a plurality of (or two) first and second PCs 28 #1 and #2 in the user system 4.

At Step 1062 (S1062), the print system 3 informs, when it accepts and authorizes the trial registration request from the image processing device 42, the image processing device 42 of the trial registration acceptance and the provision point set for the user system 4.

This provision point is stored in the registration DB 606 of the image processing program 6 (FIG. 18) to operate over the image processing device 32.

At Step 1064 (S1064), the image processing device 42 informs the first and second PCs 28 that the trial process of point system has been registered.

At Steps 968-1 and 970-1 (S968-1 and S970-1), the first PC 28 requests the print system 3 for the trial process through the image processing device 42.

At Step 1086-1 (S1086-1), the print system 3 subtracts the consumption point set for the trial process requested, from the provision point set for the user system 4.

The print system 3 executes the requested trial process in case the remaining provision point is 0 or more.

When the execution of the requested trial process succeeds, the print system 3 informs the image processing device 42 of the success in the trial process of point system.

At Step 1088-1 (S1088-1), the image processing device 42 informs the first PC 28 of the success in the trial process of point system.

Likewise in the following, the first or second PC 28 receives the provision of the trial process of point system sequentially from the print system 3 in accordance with a similar process sequence (S968-2 and so on).

Here is exemplified the case in which the provision point is set for the user system 4. However, the processes shown in FIG. 54 may be so properly modified that the provision point is set for each of the first and second PCs 28 so that the first or second PC 28 may receive the provision of the trial process within that provision point.

Figure 55:
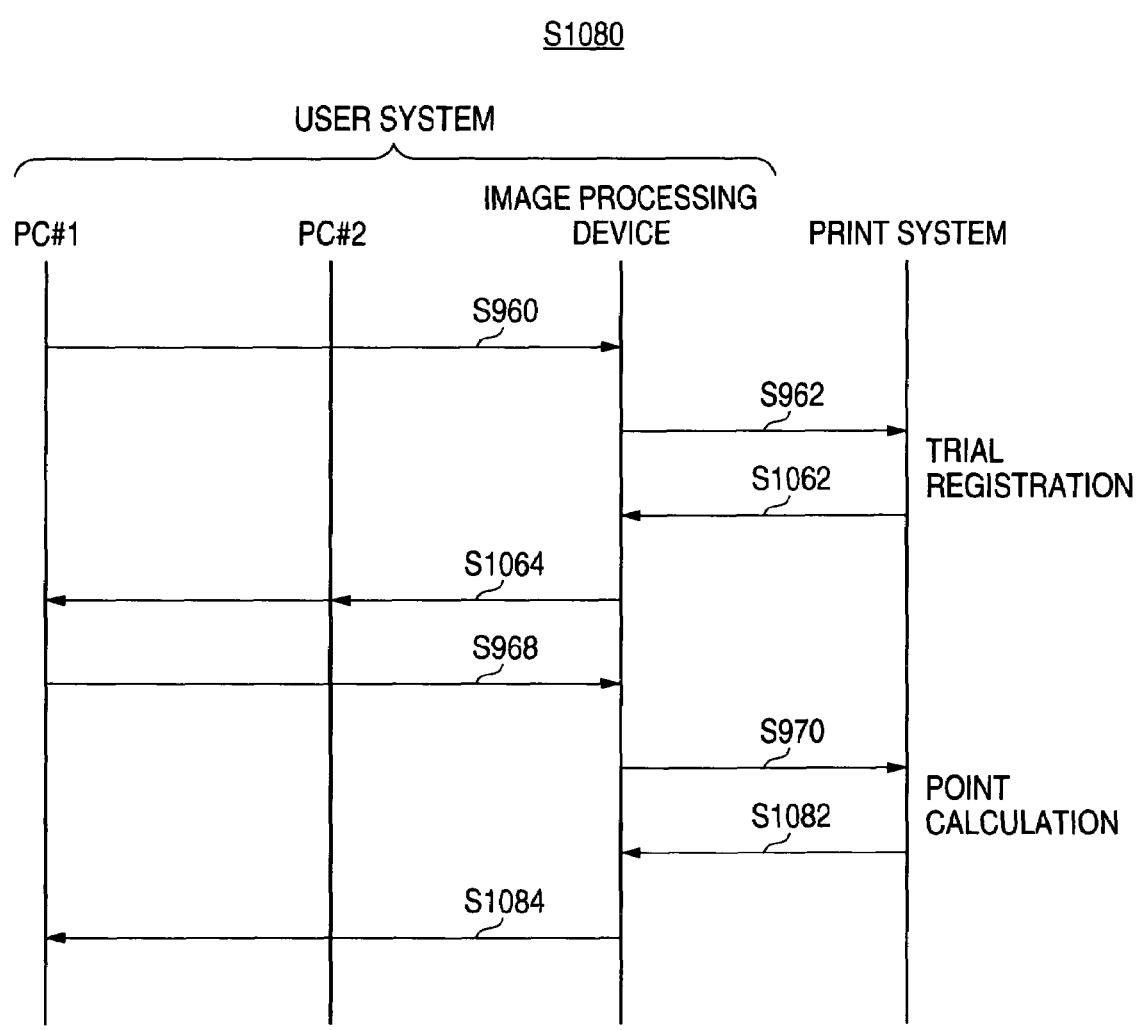
FIG. 55 is a diagram showing the trial process of point system of the case in which the point set for the user system is insufficient.

FIG. 55 is a diagram showing the trial process of point system of the case in which the point set for the user system 4 is insufficient.

At Steps 960 and 962 (S960 and 962), as shown in FIG. 55, the print system 3 is requested for the trial registration through the image processing device 42 from the first one PC 28 of a plurality of (or two) first and second PCs 28 #1 and #2 in the user system 4.

At Step 1062 (S1062), the print system 3 informs, when it accepts and authorizes the trial registration request from the image processing device 42, the image processing device 42 of the trial registration acceptance and the provision point set for the user system 4.

This provision point is stored in the registration DB 606 of the image processing program 6 (FIG. 18) to operate over the image processing device 32.

At Step 1064 (S1064), the image processing device 42 informs the first and second PCs 28 that the trial process of point system has been registered.

At Steps 968-1 and 970-1 (S968-1 and S970-1), the first PC 28 requests the print system 3 for the trial process through the image processing device 42.

At Step 1082 (S1082), the print system 3 subtracts the consumption point set for the trial process requested, from the provision point set for the user system 4.

In case the residual provision point of the subtraction of the consumption point is less than 0, the print system 3 does not execute the requested trial process because of the shortage of the provision point, but informs the image processing device 42 of it.

At Step 1084 (S1084), the image processing device 42 informs the first PC 28 that the trial process has not been executed due to the shortage of the provision point.

[Modification]

FIG. 52 exemplifies the case, in which the print system 3 does not execute the trial process when the PC 28 requests the trial process outside of the trial range, but this processing can be modified in the following manner.

If the print process for the printing paper of A3 is requested as the trial process in case the size of the printing paper in the print process contained in the trial process is limited to A4 or smaller, it is convenient for the user that the print system 3 automatically selects the printing paper (A4) of the size the closest to A3 within the using range and performs the print process after confirmation of the user.

Figure 56:
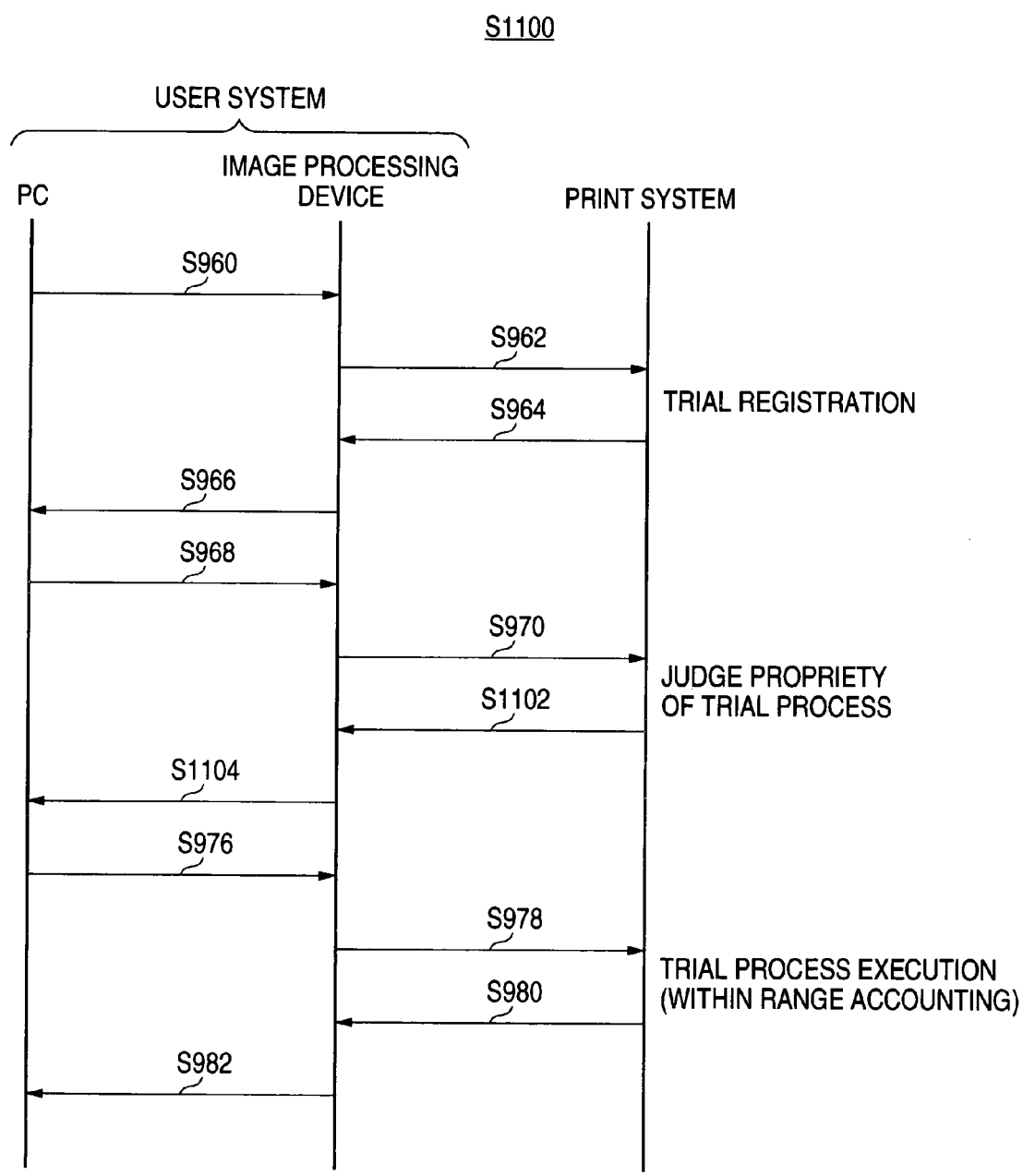
FIG. 56 is a sequence diagram showing a process (S1100) for the print system to automatically execute the trial process outside the using range when the trial process outside of the trial range is requested.

FIG. 56 is a sequence diagram showing a process (S1100) for the print system 3 to automatically execute the trial process outside the using range when the trial process outside of the trial range is requested.

At Step 960 (S960), as shown in FIG. 56, the user operates the PC 28 of the user system 4 to request the image processing device 42 for the registration to try the user system 4.

At Step 962 (S962), the image processing device 42 requests the print system 3 for the trial registration.

At Step 964 (S964), the print system 3 informs the image processing device 42 of the trial registration acceptance when it accepts and allows the trial registration request from the image processing device 42.

At Step 966 (S966), the image processing device 42 informs the PC 28 of the trial registration acceptance from the print system 3.

At Step 968 (S968), the PC 28 requests the print system 3, for example, for the print process containing the print option (FIG. 23) as the trial process.

At Step 970 (S970), the image processing device 42 outputs this request of the trial process to the print system 3.

At Step 1102 (S1102), the image processing device 32 of the print system 3 compares the trial range stored in the registration DB 606 (FIG. 18) of the image processing program 6 and the print option contained in the trial process request, and selects the parameter for the trial process so that the parameter may come the closest to the print option.

Thus, the print system 3 informs the image processing device 42 that the trial process is to be done within the trial range.

At Step 1104 (S1104), the image processing device 42 informs the PC 28 that the trial process is done within the trial range.

At Step 976 (S976), in response to that response, the user operates the PC 28 to confirm that the trial processes should be executed within the trial range.

At Step 978 (S978), the image processing device 42 outputs the execution confirmation to the print system 3.

At Step 980 (S980), the print system 3 executes the trial process within the trial range in accordance with the parameter obtained by the process of S1102.

When this trial process ends in success, the print system 3 returns the trial process result (success) to the image processing device 42, and retains the history of the foregoing processes as the job log in the registration DB 606 (FIG. 18).

At Step 982 (S982), the image processing device 42 informs the PC 28 of the success in the trial process.

By performing the processes thus far described, the user can be provided softly and finely with the chances of trial of the print system 3 in accordance with the circumstances/desires.

Moreover, the foregoing processes can be applied not only to the trials of the print system 3 by the user but also to the volume discount of the process of the print system 3 for the user.

As described above, in an image processing system and a method according to the embodiments of the invention, even if different printer and printing device print image data, the same print result can be obtained.

What is claimed is:

1. A print control apparatus comprising:
a parameter acceptance unit for accepting, from a print system having a first printer, a parameter used for trial processing for each mode of the first printer using a second, different printer at a user system, the parameter including a device link profile (DLP) based on a target profile (TP) of the first printer of the print system and a device profile (DP) of the user system;
a trial print instruction unit for judging, based on the parameters, as to whether or not a request for the trial processing at the user system is acceptable, wherein if the request is acceptable, the trial print instruction unit instructs the print system to execute raster image processing for image data in accordance with the parameters to obtain processed image data that enables image output from the second printer to be identical with that output by the first printer;
a reception unit for receiving the processed image data from the print system; and
a transmission unit for transmitting the received image data to a user terminal at the user system.

2. The print control apparatus according to claim 1, wherein:
the parameter acceptance unit accepts a trial print parameter for a color mode and a trial print parameter for a monochrome mode;
if the trial print instruction unit judges based on the test parameter for the color mode that the request designating the color mode is acceptable, the trial print instruction unit instructs the print system to execute the raster image processing in the color mode; and
if the trail print instruction unit judges based on the test print parameter for the monochrome mode that the request designating the monochrome mode is acceptable, the trial instruction unit instructs the print system to execute the raster image processing in the monochrome mode.

3. A print system comprising:
a parameter retention unit for retaining a trial print parameter for a color mode and a trial print parameter for a monochrome mode of a first printer of a print system, the trial print parameters each including a device link profile (DLP) based on a target profile (TP) of the first printer and a device profile (DP) of a second printer of a user system;
a trial print instruction unit that executes raster image processing for image data in accordance with the trial print parameter for at least one of the color mode and the monochrome mode that enables image output from the second printer to be identical with that output by the first printer; and
an accounting unit, wherein:
the accounting unit performs an accounting processing on the basis of the trial print parameter for the color mode when raster image processing is executed for image data in the color mode; and
the accounting unit performs the accounting processing on the basis of the trial print parameter for the monochrome mode when the raster image processing is executed for the image data in the monochrome mode.

4. A print control method comprising:
accepting, from a print system having a first printer, a parameter used for trial processing for each mode of the first printer using a second, different printer at a user system, the parameter including a device link profile (DLP) based on a target profile (TP) of the first printer of the print system and a device profile (DP) of a user system; and
judging, based on the parameters, as to whether or not a request for trial processing at the user system is acceptable, wherein if the request is acceptable, instructing the print system to execute raster image processing for image data in accordance with the parameters to obtain processed image data that enables image output from the second printer to be identical with that output by the first printer.

5. The print control method according to claim 4, further comprising:
in the accepting of the parameter, a trial print parameter for a color print mode and a trial print parameter for a monochrome print mode are accepted;
in the judging of the parameter, if based on the test parameter for a color mode that the request designating the color mode is acceptable, then instructing the print system to execute the raster image processing in the color mode; and
in the judging of the parameter, if based on the test print parameter for a monochrome mode that the request designating the monochrome mode is acceptable, then instructing the print system to execute the raster image processing in the monochrome mode.

6. A printing method comprising:
accepting, from a print system having a first printer, a trial print parameter for a color mode and a trial print parameter for a monochrome mode used for trial processing of the color mode and the monochrome mode of the first printer using a second, different printer at a user system, each trial print parameter including a device link profile (DLP) based on a target profile (TP) of the first printer of the print system and a device profile (DP) of the user system;
judging, based on the parameters, as to whether or not a request for trial processing at the user system is acceptable, wherein if the request is acceptable, instructing execution of raster image processing for image data in accordance with at least one of the trial print parameters to obtain processed image data that enables image output from the second printer to be identical with that output by the first printer;
executing an accounting processing on the basis of the trial print parameter for the color print mode when raster image processing is executed for image data in the color mode; and executing the accounting processing on the basis of the trial print parameter for the monochrome print mode when raster image processing is executed for image data in the monochrome mode.

7. An image processing system comprising:

a processing requesting device for requesting raster image processing; and a processing execution device for executing the requested raster image processing for image data, wherein:

the processing requesting device includes:

a registration requesting unit for requesting the processing execution device to register the processing requesting device for trial processing for testing the raster image processing of the processing execution device; and a processing requesting unit for requesting the processing execution device to perform the trial processing; and the processing execution device includes:

a registration unit for executing the requested registration; and a trial processing execution unit for executing the trial processing, requested by the registered processing requesting device, that obtains a target profile (TP) of a first printer of a print system, obtains a device profile (DP) of a second printer, different from the first printer, of a user system, generates a device link profile (DLP) based on the target profile (TP) of the first printer and the device profile (DP) of the second printer, and performs the raster image processing based on the device link profile (DLP), wherein the target profile (TP) defines a relationship between print results from the first printer of the print system and print target image data, the device profile (DP) defines a relationship between print results from the second printer of the user system and print target image data, and the device link profile (DLP) is generated based on the target profile (TP) acquired and the device profile (DP) acquired so that requested raster image processing for image data provides processed image data that enables the second printer of the user system to output an image that is identical with that output by the first printer for trial purposes.

8. The image processing system according to claim 7, wherein:

the trial processing is set to have the same processing range as that of the image processing;

the processing execution device further includes a trial processing range setting unit for setting the processing range of the trial processing; and the processing requesting unit of the processing requesting device requests the processing execution device to perform the trial processing included in the set processing range.

9. The image processing system according to claim 7, wherein:

the trial processing is set to have a different processing range from that of the image processing;

the processing execution device further includes a trial processing range setting unit for setting the processing range of the trial processing; and the processing requesting unit of the processing requesting device requests the processing execution device to perform the trial processing included in the set processing range.

10. The image processing system according to claim 8, wherein the processing requesting device further includes a display unit;

if the requested trial processing is beyond the processing range the display unit displays a message indicating that the requested trial processing is beyond the processing range.

11. The image processing system according to claim 8, wherein the trial processing execution unit of the processing execution device executes the requested trial processing within the set processing range.

12. The image processing system according to claim 7 wherein:

the trial processing execution unit of the processing execution device adds advertisement image data to the processed image data, and the trial processing execution unit outputs image data obtained by adding the advertisement image data to the processed image data.

13. The image processing system according to claim 12 further comprising:

a position designation unit for accepting designation of a position of an image represented by the advertisement image data, wherein:

the trial processing execution unit adds the image represented by the advertisement image data to an image represented by the processed image data at the designated position.

14. The image processing system according to claim 12 further comprising:

a search unit for searching for an optimum position of an image represented by the advertisement image data, wherein:

the trial processing execution unit adds the image represented by the advertisement image data to an image represented by the processed image data provided at the position found as a result of the searching.

15. The image processing system according to claim 7, wherein:

first points are set to the trial processing;

second points are set to the registered processing requesting device;

the processing execution device further includes a subtraction unit for subtracting the first points set to the executed trial processing from the second points set to the registered processing requesting device every time the requested trial processing is executed; and the processing execution unit executes the trial processing requested by the processing requesting device corresponding to the second point during the second points are left.

16. A processing requesting device in an image processing system including the processing requesting device for requesting raster image processing and a processing execution device for executing the requested raster image processing, the processing requesting device comprising:

a registration requesting unit for requesting the processing execution device to register the processing requesting device for a trial processing for testing the raster image processing of the processing execution device; and a processing requesting unit for requesting the processing execution device to perform the trial processing by obtaining a target profile (TP) of a first printer of a print system, obtaining a device profile (DP) of a second printer, different from the first printer, of a user system, generating a device link profile (DLP) based on the target profile (TP) of the first printer and the device profile (DP) of the second printer, and performing raster image processing based on the device link profile (DLP) to obtain processed image data that enables image output from the second printer to be identical with that output by the first printer.

17. The processing requesting device according to claim 16, wherein:
the trial processing is set to have the same processing range as that of the image processing; and
the processing requesting unit of the processing requesting device requests the processing execution device to perform the trial processing included in the set processing range.

18. The processing requesting device according to claim 16, wherein;
the trial processing is set to have a different processing range from that of the image processing; and
the processing requesting unit of the processing requesting device requests the processing execution device to perform the trial processing included in the set processing range.

19. The processing requesting device according to claim 17, further comprising:
a display unit for displaying a message indicating that the requested trial processing is beyond the processing range.

20. A processing execution device in an image processing system including a processing requesting unit for requesting raster image processing and the processing execution device for executing the requested raster image processing, the processing execution device comprising:
a registration unit for registering the processing requesting device for trial processing of the raster image processing; and
a trial processing execution unit for executing the trial processing, requested by the registered processing requesting device, that obtains a target profile (TP) of a first printer of a print system, obtains a device profile (DP) of a second printer, different from the first printer, of a user system, generates a device link profile (DLP) based on the target profile (TP) of the first printer and the device profile (DP) of the second printer, and performs the raster image processing based on the device link profile (DLP),
wherein the target profile (TP) defines a relationship between print results from the first printer of the print system and print target image data,
the device profile (DP) defines a relationship between print results from the second printer of the user system and print target image data, and
the device link profile (DLP) is generated based on the target profile (TP) acquired and the device profile (DP) acquired so that requested raster image processing for image data provides processed image data that enables the first printer to output an image that is identical with that output by the second printer.

21. The processing execution device according to claim 20, wherein:
the trial processing is set to have the same processing range as that of the image processing; and
the trial processing execution unit executes the requested trial processing within the set processing range.

22. The processing execution device according to claim 20, wherein:
the trial processing is set to have a different processing range from that of the image processing; and the trial processing execution unit executes the requested trial processing within the set processing range.

23. The processing execution device according to claim 20, wherein:
the trial processing execution unit adds advertisement image data to the processed image data, and
the trial processing execution unit outputs image data obtained by adding the advertisement image data to the processed image data.

24. The processing execution device according to claim 23, further comprising:
a position designation unit for accepting designation of a position of an image represented by the advertisement image data, wherein
the trial processing execution unit adds the image represented by the advertisement image data to an image represented by the processed image data at the designated position.

25. The processing execution device according to claim 23, further comprising:
a search unit for searching for an optimum position of an image represented by the advertisement image data, wherein:
the trial processing execution unit adds the image represented by the advertisement image data to an image represented by the processed image data provided at a position found as the result of the searching.

26. The processing execution device according to claim 20, further comprising:
a subtraction unit, wherein:
first points are set to the trial processing;
second points are set to the registered processing requesting device;
the subtraction unit subtracts the first points set to the executed trial processing from the second points set to the registered processing requesting device every time the requested trial processing is executed; and
the trial processing execution unit executes the trial processing requested by the processing requesting device corresponding to the second points during the second points are left.

27. An image processing method comprising:
requesting to register a user system for a trial processing for trying raster image processing of a print system having a first printer;
requesting to execute the trial processing using a second printer, different from the first printer, of the user system;
registering the requested user system; and
executing the requested trial processing by obtaining a target profile (TP) of the first printer of the print system, obtaining a device profile (DP) of the second printer of the user system, generating a device link profile (DLP) based on the target profile (TP) of the first printer and the device profile (DP) of the second printer, and performing the raster image processing based on the device link profile (DLP),
wherein the target profile (TP) defines a relationship between print results from the first printer of the print system and print target image data,
the device profile (DP) defines a relationship between print results from the second printer of the user system and print target image data, and
the device link profile (DLP) is generated based on the target profile (TP) acquired and the device profile (DP) acquired so that requested raster image processing for image data provides processed image data that enables the second printer of the user system to output an image that is identical with that output by the first printer for trial purposes.

28. The print control apparatus according to claim 1, wherein if the request is acceptable, the trial print instruction unit instructs the print system to execute the raster image processing of the image data so that the processed image data enables a user's printer to output an image that is identical with that output by the print system.

29. The print control method according to claim 4, further comprising:
in the judging of the parameter, if based on the test print parameter the request is acceptable then instructing the print system to execute the raster image processing of the image data so that the processed image data enables a user's printer to output an image that is identical with that output by the print system.

30. The print system according to claim 3, wherein the raster image processing is executed for the image data so that the processing image data enables a user's printer to output an image that is identical with that output by the print system.

31. The printing method according to claim 6, wherein the raster image processing is executed for the image data so that the processing image data enables a user's printer to output an image that is identical with that output by the print system.

32. The print system according to claim 3, further comprising:
a control unit, wherein
the control unit judges, based on the trial print parameter for the color mode, as to whether or not a request, for a trial print, designating the color mode is acceptable, and
the control unit judges, based on the trial print parameter for the monochrome mode, as to whether or not a request, for the trial print, designating the monochrome mode is acceptable; and
a raster image processing unit for performing rater image processing, wherein
if the request designating the color mode is acceptable, the control unit allows the raster image processing unit to perform the raster image processing in the color mode in accordance with the request, and
if the request designating the monochrome mode is acceptable, the control unit allows the raster image processing unit to perform the raster image processing in the monochrome mode in accordance with the request.

33. The printing method according to claim 6, further comprising:
judging, based on the trial print parameter for the color mode, as to whether or not a request, for a trial print, designating the color mode is acceptable;
judging, based on the trial print parameter for the monochrome mode, as to whether or not a request, for the trial print, designating the monochrome mode is acceptable; and
performing raster image processing, wherein
if the request designating the color mode is acceptable, instructing the print system to execute the raster image processing in the color mode in accordance with the request, and
if the request designating the monochrome mode is acceptable, instructing the print system to execute the raster image processing in the monochrome mode in accordance with the request.

34. The processing execution device according to claim 20, wherein the trial processing execution unit outputs the processed image data.

\* \* \* \* \*